United States Patent
Maertens et al.

(10) Patent No.: US 10,323,670 B2
(45) Date of Patent: Jun. 18, 2019

(54) COMPOSED ELEMENT, MULTI-LAYERED BOARD AND PANEL-SHAPED ELEMENT FOR FORMING THIS COMPOSED ELEMENT

(71) Applicant: UNILIN, BVBA, Wielsbeke (BE)

(72) Inventors: Luc Maertens, Lichtervelde (BE); Mark Cappelle, Staden (BE); Luc Vanhastel, Tielt (BE); Luc Deman, Izegem (BE); Guy Van Hooydonck, Schoten (BE)

(73) Assignee: UNILIN, BVBA, Wielsbeke (BE)

( * ) Notice: Subject to any disclaimer, the term of this patent is extended or adjusted under 35 U.S.C. 154(b) by 0 days.

(21) Appl. No.: 15/700,958

(22) Filed: Sep. 11, 2017

(65) Prior Publication Data
US 2017/0370392 A1     Dec. 28, 2017

Related U.S. Application Data

(63) Continuation of application No. 15/145,324, filed on May 3, 2016, now Pat. No. 9,797,427, which is a (Continued)

(30) Foreign Application Priority Data

Dec. 17, 2008 (BE) .................................. 2008/0677
Jun. 26, 2009 (DE) .................... 20 2009 008 825 U

(51) Int. Cl.
*E04B 2/08*       (2006.01)
*F16B 12/26*      (2006.01)
(Continued)

(52) U.S. Cl.
CPC ............ *F16B 12/26* (2013.01); *A47B 47/042* (2013.01); *A47B 96/201* (2013.01);
(Continued)

(58) Field of Classification Search
CPC .......... E04F 2201/023; E04F 15/02038; E04F 19/061; E04F 19/06; E04F 19/02;
(Continued)

(56) References Cited

U.S. PATENT DOCUMENTS 242,026 A     5/1881   O'Connor
316,176 A     4/1885   Ransom
(Continued)

FOREIGN PATENT DOCUMENTS

BE     465593 A     5/1946
BE     740 678 A    4/1970
(Continued)

OTHER PUBLICATIONS

EP opposition case against European Patent No. 2 378 921 B1, Dec. 19, 2014.
(Continued)

*Primary Examiner* — Gisele D Ford
(74) *Attorney, Agent, or Firm* — Workman Nydegger

(57) ABSTRACT

Composed element including at least two panel-shaped elements, which each have an edge zone in which coupling means are present in the form of a profiled part respectively extending in the longitudinal direction of the respective edge zone, as well as each including an end face extending transversely to the respective edge zone, wherein said profiled parts allow coupling the panel-shaped elements together in an interlocking manner, wherein at least one of the panel-shaped elements includes an arrangement which hides from view at least a portion of the profiled part formed at the pertaining edge zone at the location of the end face.

7 Claims, 30 Drawing Sheets

Related U.S. Application Data continuation of application No. 14/324,504, filed on Jul. 7, 2014, now Pat. No. 9,347,470, which is a continuation of application No. 13/140,590, filed as application No. PCT/IB2009/054812 on Oct. 29, 2009, now Pat. No. 9,175,703.

(60) Provisional application No. 61/175,596, filed on May 5, 2009.

(51) Int. Cl.

| | | |
|---|---|---|
| *A47B 47/04* | (2006.01) | |
| *A47B 96/20* | (2006.01) | |
| *B32B 3/06* | (2006.01) | |
| *B32B 21/02* | (2006.01) | |
| *B32B 21/04* | (2006.01) | |
| *E04F 13/08* | (2006.01) | |
| *E04F 15/02* | (2006.01) | |
| *F16B 12/46* | (2006.01) | |
| *F16B 5/00* | (2006.01) | |
| *E04F 13/10* | (2006.01) | |
| *E04F 15/04* | (2006.01) | |

(52) U.S. Cl.
CPC .............. *A47B 96/206* (2013.01); *B32B 3/06* (2013.01); *B32B 21/02* (2013.01); *B32B 21/04* (2013.01); *E04F 13/08* (2013.01); *E04F 13/0894* (2013.01); *E04F 13/10* (2013.01); *E04F 15/02* (2013.01); *E04F 15/02038* (2013.01); *E04F 15/045* (2013.01); *F16B 5/0056* (2013.01); *F16B 12/46* (2013.01); *B32B 2471/00* (2013.01); *E04F 2201/0115* (2013.01); *E04F 2201/0153* (2013.01); *E04F 2201/041* (2013.01); *E04F 2201/0523* (2013.01); *F16B 2012/463* (2013.01); *F16B 2012/466* (2013.01); *Y10T 403/7005* (2015.01); *Y10T 403/7073* (2015.01); *Y10T 428/13* (2015.01); *Y10T 428/19* (2015.01); *Y10T 428/24008* (2015.01); *Y10T 428/24488* (2015.01); *Y10T 428/24942* (2015.01); *Y10T 428/31591* (2015.04); *Y10T 428/31982* (2015.04)

(58) Field of Classification Search
CPC ... E04F 13/0871; E04F 11/163; E04F 19/022; F16B 5/0056; F16B 5/00; F16B 5/0012; F16B 5/0004; E04B 2001/3276; E04B 1/34321; E04B 2002/7483; E04B 2001/3252; E04B 1/6804; E04B 1/6809; B27M 3/08; A47B 47/0075; A47B 2230/0096
See application file for complete search history.

(56) References Cited

U.S. PATENT DOCUMENTS

| | | |
|---|---|---|
| 325,049 A | 8/1885 | Brolaski |
| 372,694 A | 11/1887 | Mergott |
| 443,271 A | 12/1890 | Dumas |
| 517,348 A | 3/1894 | Linderman |
| 634,581 A | 10/1899 | Miller |
| 637,212 A | 11/1899 | McCune |
| 653,514 A | 7/1900 | Kasschau |
| 671,954 A | 4/1901 | Eaton |
| 786,940 A | 4/1905 | Amsden |
| 861,911 A | 7/1907 | Stewart |
| 873,496 A | 12/1907 | Bryant |
| 881,673 A | 3/1908 | Ellison |
| 1,032,674 A | 7/1912 | Holland |
| 1,070,572 A | 8/1913 | Wyckoff |
| 1,159,229 A | 11/1915 | Keith |
| 1,194,636 A | 8/1916 | Joy |
| 1,436,858 A | 11/1922 | Burhen |
| 1,468,786 A | 9/1923 | Knechtel |
| 1,533,099 A | 4/1925 | Carroll |
| 1,534,468 A | 4/1925 | Shea, Jr. |
| 1,743,492 A | 1/1930 | Sipe |
| 1,922,994 A | 8/1933 | Voigt |
| 1,954,242 A | 4/1934 | Heppenstall |
| 2,002,228 A | 5/1935 | Meyercord et al. |
| 2,065,133 A | 12/1936 | Heppenstall |
| 2,116,584 A | 5/1938 | Shelby |
| 2,362,904 A | 11/1944 | Kramer |
| 2,453,918 A | 11/1948 | Jansen |
| 2,496,184 A | 1/1950 | Von Canon |
| 2,551,775 A | 5/1951 | Von Canon |
| 2,607,375 A | 8/1952 | Gillespie et al. |
| 2,681,483 A | 6/1954 | Morawetz |
| 2,732,706 A | 1/1956 | Friedman |
| 2,801,895 A | 8/1957 | Gass |
| 2,863,185 A | 12/1958 | Riedi |
| 2,872,712 A | 2/1959 | Brown et al. |
| 2,981,669 A | 4/1961 | Brand et al. |
| 3,021,187 A | 2/1962 | Mitchell |
| 3,078,888 A | 2/1963 | Bruemmer |
| 3,090,086 A | 5/1963 | Fata |
| 3,195,968 A | 7/1965 | Freeman |
| 3,284,152 A | 11/1966 | Schorghuber |
| 3,325,585 A | 6/1967 | Brenneman |
| 3,347,610 A | 10/1967 | Pilliod |
| 3,378,958 A | 4/1968 | Parks et al. |
| 3,410,441 A | 11/1968 | Rhyne |
| 3,526,071 A | 9/1970 | Watanabe |
| 3,539,425 A | 11/1970 | Marburg |
| 3,547,171 A | 12/1970 | Jacumin |
| 3,664,011 A | 5/1972 | Labastrou |
| 3,722,971 A | 3/1973 | Zeischegg |
| 3,745,736 A | 7/1973 | Fischer et al. |
| 3,760,547 A | 9/1973 | Brenneman |
| 3,885,845 A | 5/1975 | Krieks |
| 3,902,291 A | 9/1975 | Zucht |
| 3,933,401 A | 1/1976 | Lampe et al. |
| 3,950,915 A | 4/1976 | Cole |
| 4,012,090 A | 3/1977 | Pfeifer et al. |
| 4,012,155 A | 3/1977 | Morris |
| 4,019,298 A | 4/1977 | Johnson, IV |
| 4,025,216 A | 5/1977 | Hives |
| 4,037,380 A | 7/1977 | Pollock |
| 4,047,777 A | 9/1977 | Pfeifer et al. |
| 4,089,614 A | 5/1978 | Harley |
| 4,099,887 A | 7/1978 | Mackenroth |
| 4,110,946 A | 9/1978 | Louther, Jr. |
| 4,112,986 A | 9/1978 | Strange et al. |
| 4,116,513 A | 9/1978 | Ullman, Jr. |
| RE30,154 E | 11/1979 | Jarvis |
| 4,195,462 A | 4/1980 | Keller et al. |
| 4,206,956 A | 6/1980 | Lydmar |
| 4,279,455 A | 7/1981 | Santo |
| 4,391,008 A | 7/1983 | Yamaoka et al. |
| 4,416,097 A | 11/1983 | Weir |
| 4,422,488 A | 12/1983 | Lacroix et al. |
| 4,456,497 A * | 6/1984 | Eberle .................. B27M 3/0026 144/352 |
| 4,462,647 A | 7/1984 | Key |
| 4,466,675 A | 8/1984 | Ferdinand et al. |
| 4,471,822 A | 9/1984 | Griganavicius |
| 4,514,104 A | 4/1985 | Taylor et al. |
| 4,640,437 A | 2/1987 | Weingartner |
| 4,651,651 A | 3/1987 | Sheffer |
| 4,750,794 A | 6/1988 | Vegh |
| 4,758,056 A | 7/1988 | Buck et al. |
| 4,800,821 A | 1/1989 | Nook et al. |
| 4,832,421 A | 5/1989 | Shoffner |
| 4,884,854 A | 12/1989 | Joffe |
| 4,886,326 A | 12/1989 | Kuzyk |
| 4,888,933 A | 12/1989 | Guomundsson et al. |
| 4,909,581 A | 3/1990 | Haheeb |
| 4,966,421 A | 10/1990 | Mengel |

(56) References Cited

U.S. PATENT DOCUMENTS

| | | | |
|---|---|---|---|
| 4,974,389 A | 12/1990 | Onysko et al. | |
| 4,984,929 A | 1/1991 | Rock et al. | |
| 4,996,817 A | 3/1991 | Nelson | |
| 5,148,850 A | 9/1992 | Urbanick | |
| 5,247,773 A | 9/1993 | Weir | |
| 5,267,425 A | 12/1993 | Onysko et al. | |
| 5,295,341 A | 3/1994 | Kajiwara | |
| 5,323,584 A | 6/1994 | Scarlett | |
| 5,348,778 A | 9/1994 | Knipp et al. | |
| 5,368,380 A | 11/1994 | Mottmiller et al. | |
| 5,454,331 A | 10/1995 | Green | |
| 5,475,960 A | 12/1995 | Lindal | |
| 5,499,886 A | 3/1996 | Short et al. | |
| 5,527,103 A | 6/1996 | Pittman | |
| 5,548,937 A | 8/1996 | Shimonohara | |
| 5,555,980 A | 9/1996 | Johnston et al. | |
| 5,597,221 A | 1/1997 | Grieser et al. | |
| 5,605,389 A | 2/1997 | Kelly et al. | |
| 5,611,637 A | 3/1997 | Brustle et al. | |
| 5,647,181 A | 7/1997 | Hunts | |
| 5,658,086 A | 8/1997 | Brokaw et al. | |
| 5,662,399 A | 9/1997 | Henkel et al. | |
| 5,803,561 A | 9/1998 | Puehlhorn | |
| 5,893,617 A | 4/1999 | Lee | |
| 5,899,251 A | 5/1999 | Turner | |
| 5,911,180 A | 6/1999 | Mullens | |
| 5,970,675 A | 10/1999 | Schray | |
| 6,045,290 A | 4/2000 | Nocievski | |
| 6,086,995 A | 7/2000 | Smith | |
| 6,309,039 B1 | 10/2001 | Park et al. | |
| 6,314,701 B1* | 11/2001 | Meyerson | E04C 2/292 52/309.9 |
| 6,357,194 B1 | 3/2002 | Jones, Jr. | |
| 6,413,007 B1 | 7/2002 | Lambright | |
| 6,502,002 B2 | 12/2002 | Susnjara et al. | |
| 6,553,724 B1 | 4/2003 | Bigler | |
| 6,820,950 B1 | 11/2004 | Sun | |
| 6,827,028 B1 | 12/2004 | Callaway | |
| 6,874,291 B1 | 4/2005 | Weber | |
| 7,021,019 B2 | 4/2006 | Knauseder | |
| 7,152,383 B1 | 12/2006 | Wilkinson, Jr. et al. | |
| 7,255,236 B1 | 8/2007 | Sauder et al. | |
| 7,451,535 B2 | 11/2008 | Wells et al. | |
| 7,484,337 B2 | 2/2009 | Hecht | |
| 7,634,884 B2 | 12/2009 | Pervan et al. | |
| 7,637,068 B2 | 12/2009 | Pervan | |
| 7,641,414 B1 | 1/2010 | Joyce | |
| 7,654,055 B2 | 2/2010 | Ricker | |
| 7,726,088 B2 | 6/2010 | Muehlebach | |
| 7,841,145 B2 | 11/2010 | Pervan et al. | |
| 7,866,110 B2 | 1/2011 | Pervan | |
| 7,950,755 B2 | 5/2011 | Vardon | |
| 7,980,039 B2 | 7/2011 | Groeke et al. | |
| 7,997,044 B2 | 8/2011 | Green et al. | |
| 8,001,910 B2 | 8/2011 | Yee et al. | |
| 8,042,311 B2 | 10/2011 | Pervan et al. | |
| 8,079,196 B2 | 12/2011 | Pervan | |
| 8,092,112 B2 | 1/2012 | Borgman et al. | |
| 8,206,054 B1 | 6/2012 | Burnett et al. | |
| 8,220,217 B2 | 7/2012 | Muehlebach | |
| 8,231,301 B1 | 7/2012 | Joyce | |
| 8,302,361 B2 | 11/2012 | Braun et al. | |
| 8,381,476 B2 | 2/2013 | Hannig | |
| 8,387,327 B2 | 3/2013 | Pervan | |
| 8,398,905 B2 | 3/2013 | Nilsson | |
| 8,511,040 B2 | 8/2013 | Braun et al. | |
| 8,621,814 B2 | 1/2014 | Cappelle | |
| 8,622,489 B2 | 1/2014 | Crabtree, II | |
| 8,641,155 B2 | 2/2014 | Lee | |
| 8,707,650 B2 | 4/2014 | Pervan et al. | |
| 8,757,917 B2 | 6/2014 | Andersson | |
| 8,966,853 B2 | 3/2015 | Hannig | |
| 8,991,055 B2 | 3/2015 | Cappelle | |
| 2002/0093272 A1 | 7/2002 | Saravis | |
| 2003/0066813 A1 | 4/2003 | Taylor | |
| 2003/0155847 A1 | 8/2003 | Henkel | |
| 2004/0049999 A1 | 3/2004 | Krieger | |
| 2004/0060255 A1* | 4/2004 | Knauseder | E04F 13/10 52/582.2 |
| 2004/0090156 A1 | 5/2004 | Kunanantakul | |
| 2004/0128934 A1 | 7/2004 | Hecht | |
| 2004/0168392 A1 | 9/2004 | Konzelmann et al. | |
| 2004/0222722 A1 | 11/2004 | Yang | |
| 2004/0253051 A1 | 12/2004 | Napp | |
| 2005/0225216 A1 | 10/2005 | Kim | |
| 2006/0010820 A1 | 1/2006 | Schwitte et al. | |
| 2006/0064940 A1 | 3/2006 | Cappelle | |
| 2006/0080927 A1* | 4/2006 | Schulte | E04F 15/02161 52/592.1 |
| 2006/0101769 A1 | 5/2006 | Pervan et al. | |
| 2006/0236642 A1 | 10/2006 | Pervan | |
| 2006/0260254 A1 | 11/2006 | Pervan | |
| 2007/0006543 A1 | 1/2007 | Engstrom | |
| 2007/0028547 A1 | 2/2007 | Grafenauer et al. | |
| 2007/0134613 A1 | 6/2007 | Kuo et al. | |
| 2007/0175143 A1 | 8/2007 | Pervan et al. | |
| 2007/0175156 A1 | 8/2007 | Pervan et al. | |
| 2007/0193178 A1 | 8/2007 | Groeke et al. | |
| 2008/0010937 A1 | 1/2008 | Pervan et al. | |
| 2008/0034708 A1 | 2/2008 | Pervan | |
| 2008/0053029 A1 | 3/2008 | Ricker | |
| 2008/0066415 A1 | 5/2008 | Pervan et al. | |
| 2008/0104921 A1 | 5/2008 | Pervan et al. | |
| 2008/0110125 A1 | 5/2008 | Pervan | |
| 2008/0134614 A1 | 6/2008 | Pervan et al. | |
| 2008/0155930 A1 | 7/2008 | Pervan et al. | |
| 2008/0236088 A1 | 10/2008 | Hannig | |
| 2008/0302051 A1 | 12/2008 | Bearinger et al. | |
| 2009/0019806 A1 | 1/2009 | Muehlebach | |
| 2009/0042019 A1 | 2/2009 | Nilsson | |
| 2009/0100782 A1 | 4/2009 | Groeke et al. | |
| 2009/0129859 A1 | 5/2009 | Andersson | |
| 2009/0193748 A1 | 8/2009 | Boo et al. | |
| 2009/0249723 A1 | 10/2009 | Clark et al. | |
| 2010/0009115 A1 | 1/2010 | Ruhdorfer | |
| 2010/0021699 A1 | 1/2010 | Engstrom et al. | |
| 2010/0043333 A1 | 2/2010 | Hannig | |
| 2010/0173122 A1 | 7/2010 | Susnjara | |
| 2010/0189492 A1 | 7/2010 | Green | |
| 2010/0205888 A1 | 8/2010 | Krige | |
| 2010/0290831 A1 | 11/2010 | Burnett et al. | |
| 2011/0126487 A1 | 6/2011 | Browning et al. | |
| 2011/0206448 A1 | 8/2011 | Clinch et al. | |
| 2011/0271632 A1 | 11/2011 | Cappelle et al. | |
| 2011/0280655 A1 | 11/2011 | Maertens et al. | |
| 2012/0027967 A1 | 2/2012 | Maertens et al. | |
| 2012/0036804 A1 | 2/2012 | Pervan | |
| 2012/0073235 A1 | 3/2012 | Hannig | |
| 2012/0133259 A1 | 5/2012 | Babucke-Runte et al. | |
| 2012/0217671 A1 | 8/2012 | Nilsson | |
| 2013/0051905 A1 | 2/2013 | Andersson | |
| 2013/0071172 A1 | 3/2013 | Maertens et al. | |
| 2013/0170904 A1 | 7/2013 | Cappelle et al. | |
| 2013/0241103 A1 | 9/2013 | Engstrom | |
| 2014/0033630 A1 | 2/2014 | Engstrom | |
| 2014/0042115 A1 | 2/2014 | Lee | |
| 2014/0130437 A1 | 5/2014 | Cappelle | |
| 2014/0190112 A1 | 7/2014 | Pervan et al. | |
| 2014/0255092 A1 | 9/2014 | Andersson | |

FOREIGN PATENT DOCUMENTS

| | | |
|---|---|---|
| CA | 1 065 944 A1 | 11/1979 |
| CA | 1 240 914 A1 | 8/1988 |
| CA | 1 279 814 C | 2/1991 |
| CA | 1 296 611 C | 3/1992 |
| CA | 1 297 525 C | 3/1992 |
| CH | 83681 A | 1/1920 |
| CH | 616 617 A5 | 4/1980 |
| CN | 2404402 Y | 11/2000 |
| CN | 2492701 Y | 5/2002 |
| CN | 101099618 A | 1/2008 |
| DE | 808 626 C | 7/1951 |
| DE | 1 812 390 U | 6/1960 |

(56) References Cited

FOREIGN PATENT DOCUMENTS

| | | |
|---|---|---|
| DE | 1 484 108 A1 | 4/1969 |
| DE | 1 298 440 B | 6/1969 |
| DE | 6909680 U | 9/1969 |
| DE | 6923049 U | 10/1969 |
| DE | 1 935 283 A1 | 1/1971 |
| DE | 1 654 545 A1 | 5/1971 |
| DE | 1 955 922 A1 | 6/1971 |
| DE | 2 008 785 A1 | 9/1971 |
| DE | 2153713 A1 | 5/1973 |
| DE | 2 300 675 A1 | 7/1974 |
| DE | 24 26 722 A1 | 12/1975 |
| DE | 23 30 532 B2 | 9/1978 |
| DE | 30 41 781 A1 | 6/1982 |
| DE | 32 44 398 C2 | 5/1985 |
| DE | 87 08 112 U1 | 9/1987 |
| DE | 42 24 250 A1 | 1/1994 |
| DE | 19 503 948 A1 | 8/1996 |
| DE | 197 06 651 A1 | 8/1998 |
| DE | 198 27 597 A1 | 12/1999 |
| DE | 200 09 333 U1 | 9/2000 |
| DE | 39 37 231 C2 | 1/2001 |
| DE | 20 2004 010 897 U1 | 11/2004 |
| DE | 20 2004 013 651 U1 | 11/2004 |
| DE | 20 2005 005 498 U1 | 6/2005 |
| DE | 10 2004 055 951 A1 | 7/2005 |
| DE | 103 44 161 B4 | 9/2005 |
| DE | 202005010758 U1 | 9/2005 |
| DE | 20 2004 019 882 U1 | 4/2006 |
| DE | 2007007832.5 | * 2/2007 |
| DE | 10 2008 005 067 A1 | 7/2009 |
| DE | 20 2008 004 145 U1 | 8/2009 |
| DE | 20 2008 004 148 U1 | 8/2009 |
| DE | 20 2009 008 825 U1 | 10/2009 |
| DE | 20 2009 010 381 U1 | 11/2009 |
| DE | 20 2009 018 418 U1 | 8/2011 |
| DE | 10 2006 007 522 B4 | 1/2013 |
| EP | 0 077 092 A1 | 4/1983 |
| EP | 0 274 683 A1 | 7/1988 |
| EP | 0 330 748 A2 | 9/1989 |
| EP | 0 479 767 A1 | 4/1992 |
| EP | 0 423 596 B1 | 4/1993 |
| EP | 0 698 357 A1 | 2/1996 |
| EP | 0 543 589 B1 | 4/1996 |
| EP | 0 871 156 A2 | 10/1998 |
| EP | 1 035 334 A1 | 9/2000 |
| EP | 1 344 950 A1 | 9/2003 |
| EP | 1 374 737 A1 | 1/2004 |
| EP | 1 420 125 A2 | 5/2004 |
| EP | 1 554 951 A1 | 7/2005 |
| EP | 1 574 633 A3 | 10/2005 |
| EP | 0 756 044 B1 | 11/2005 |
| EP | 1343943 B1 | 2/2006 |
| EP | 1671562 A1 | 6/2006 |
| EP | 2 065 526 A2 | 6/2009 |
| EP | 2 105 063 A1 | 9/2009 |
| EP | 2 105 064 A1 | 9/2009 |
| EP | 2 250 926 A2 | 11/2010 |
| EP | 2 348 222 A1 | 7/2011 |
| EP | 2378921 A2 | 10/2011 |
| EP | 1 647 205 B1 | 12/2011 |
| EP | 2 015 652 B1 | 3/2012 |
| EP | 1 855 854 B1 | 4/2012 |
| EP | 2 260 742 B1 | 9/2012 |
| FR | 1 016 352 A | 11/1952 |
| FR | 1 103 169 A | 10/1955 |
| FR | 1318585 A | 2/1963 |
| FR | 1 345 888 A | 12/1963 |
| FR | 1 557 100 A | 2/1969 |
| FR | 2 143 136 B1 | 7/1973 |
| FR | 2 186 076 A5 | 1/1974 |
| FR | 2 313 629 B1 | 9/1978 |
| FR | 2 597 173 B1 | 10/1988 |
| FR | 2826391 A1 | 12/2002 |
| FR | 2 949 046 A1 | 2/2011 |
| GB | 598 687 A | 2/1948 |
| GB | 794 401 A | 5/1958 |
| GB | 1 004 008 A | 9/1965 |
| GB | 1 046 810 A | 10/1966 |
| GB | 2041146 A | 9/1980 |
| GB | 2 051 916 A | 1/1981 |
| GB | 2256023 A | 11/1992 |
| GB | 2 281 950 A | 3/1995 |
| GB | 2 408 554 A | 6/2005 |
| GB | 2 428 078 B | 8/2008 |
| GB | 2 460 856 A | 12/2009 |
| JP | S58-41251 U | 3/1983 |
| JP | S58-149709 A | 9/1983 |
| JP | H04-50633 U | 4/1992 |
| JP | 2006-020979 A | 1/2006 |
| JP | 4854248 B2 | 1/2012 |
| JP | 3176020 U | 6/2012 |
| JP | 5574316 B2 | 8/2014 |
| NL | 6912630 A | 2/1971 |
| NL | 8502524 A | 4/1987 |
| NL | 1034336 C2 | 3/2009 |
| RU | 2 063 158 C1 | 7/1996 |
| WO | 87/00406 A1 | 1/1987 |
| WO | 94/10462 A1 | 5/1994 |
| WO | 9747834 A1 | 12/1997 |
| WO | 99/22150 A1 | 5/1999 |
| WO | 02/33271 A1 | 4/2002 |
| WO | 03/016654 A1 | 2/2003 |
| WO | 2004/052150 A1 | 6/2004 |
| WO | 2004085765 A1 | 10/2004 |
| WO | 2005/020754 A1 | 3/2005 |
| WO | 2005046950 A1 | 5/2005 |
| WO | 2006/008393 A1 | 1/2006 |
| WO | WO2008098783 | * 2/2007 |
| WO | 2007/079845 A1 | 7/2007 |
| WO | 2007/131903 A2 | 11/2007 |
| WO | 2007145572 A1 | 12/2007 |
| WO | 2008021044 A2 | 2/2008 |
| WO | 2008/068245 A1 | 6/2008 |
| WO | 2008/083662 A1 | 7/2008 |
| WO | 2008098783 A1 | 8/2008 |
| WO | 2008/150234 A1 | 12/2008 |
| WO | 2009/066153 A2 | 5/2009 |
| WO | 2010070605 A2 | 6/2010 |
| WO | 2010/078509 A1 | 7/2010 |
| WO | 2009/044235 A8 | 9/2010 |
| WO | 2011/000751 A1 | 1/2011 |
| WO | 2011/070307 A1 | 6/2011 |

OTHER PUBLICATIONS

International Search Report and Written Opinion from International Application No. PCT/IB2009/055816, dated Dec. 2, 2010.
International Search Report and Written Opinion of Application No. PCT/IB2009/054812, dated Dec. 2, 2010.
Search Report and Written Opinion of EPO regarding Belgium Patent Application 2008/0677, dated Oct. 28, 2009.
Binsch et al., "Specialist for Carpentry", Europe Directory, Wood Technology, 14th Edition, Publishing Europe Training, Nourney, Vollmer GmbH & Co, 1990, 7 Pages.
Further Submission of Opponent in European Patent No. EP 2378921, Jan. 25, 2017, 3 Pages.
Opposition to European Patent No. EP 2378921, Dec. 19, 2014, 39 Pages.
Response to the Preliminary Opinion of the Opposition Division, EP Patent 2378921, Dec. 22, 2016.
Response to Opposition against EP Patent No. 2378921, Jun. 3, 2015, 9 Pages.
Result of Oral Proceedings regarding Opposition against Application No. 09807461.0, Feb. 7, 2017, 1 Page.
Submission of Opponent against EP Patent No. 2378921 Sep. 7, 2015, 7 Pages.
Summons to Attend Oral Proceedings for EP Application No. 09807461.0, Jun. 2, 2016, 10 Pages.
International Search Report and Written Opinion from PCT Application No. PCT/IB2011/052240, dated Apr. 10, 2014.

(56) References Cited

OTHER PUBLICATIONS

International Search Report and Written Opinion from PCT Application No. PCT/IB2011/051276, dated Nov. 21, 2011.
Belgian Search Report and Written Opinion from BE 201000341, dated Mar. 8, 2011.
Belgian Search Report and Written Opinion from BE 201100106, dated Jan. 13, 2012.
Submission of Opponent against EP Patent No. 2378921 Jul. 17, 2015, 16 Pages.

\* cited by examiner

COMPOSED ELEMENT, MULTI-LAYERED BOARD AND PANEL-SHAPED ELEMENT FOR FORMING THIS COMPOSED ELEMENT

This application is a continuation of U.S. Ser. No. 15/145,324 filed May 3, 2016, which is a continuation of Ser. No. 14/324,504 filed Jul. 7, 2014, now U.S. Pat. No. 9,347,470, which is a continuation of Ser. No. 13/140,590, filed Jun. 17, 2011, now U.S. Pat. No. 9,175,703, which claims the benefit under 35 U.S.C. 119 (e) to the U.S. provisional application No. 61/175,596 filed on May 5, 2009.

BACKGROUND OF THE INVENTION

1. Field of the Invention

This invention relates to a composed element, a multi-layered board and a panel-shaped element for forming such composed element.

More particularly, the invention aims at a composed element comprising at least two panel-shaped elements which are coupled to each other, can be coupled to each other, respectively. Herein, the invention relates to any form of composed element comprising at least two or more panel-shaped elements, irrespective of the field of application, and irrespective of the fact whether the composed element substantially consists exclusively of the panel-shaped elements or whether these panel-shaped elements solely form a part thereof.

Although the invention can be applied in any application, it is intended in particular for being applied in the fields of furniture, walls and wall coverings. Herein, the invention in particular aims at connections between panel-shaped elements, as well as multi-layered boards, which are particularly suited for application for such panel-shaped elements.

More particularly, the invention aims at connections between panel-shaped elements, which can be realized in a smooth manner and are suitable for being applied with furniture that is sold in dismantled condition and has to be assembled by the buyer himself. Herein, this relates in particular to so-called flat-pack furniture.

2. Related Art

It is known that furniture panels are coupled to each other in various manners. A classical technique consists in connecting them with dowels driven into openings and also fixed by gluing, which, however, is a technique which is not very suitable for do-it-yourselfers.

It is also known to supply connection accessories with the furniture in the form of a large number of pins, screws, clamping pins and so on. On the one hand, this large number of accessories makes it difficult for the user to keep track of how he has to assemble a piece of furniture, and, on the other hand, the manufacturer has to package all these accessories along with the furniture parts, which requires extra costs and work. In particular with so-called flat-pack furniture, wherein all parts are delivered in a flat package, it is desired to keep the package to be sold as simple as possible, both in respect to a simple production and composition in a flat-pack and in respect to user-friendliness towards the buyer who has to assemble the furniture by himself.

Also, it has already been proposed to connect furniture panels by means of coupling means which allow turning two or more furniture panels at their edges into each other. However, the proposed solutions show certain disadvantages, as a consequence of which up to now no functional solution has been offered for composing furniture panels and such to a larger whole in a simple manner.

SUMMARY OF THE DISCLOSURE

Thus, the present invention relates to a composed element, the composing parts of which can be coupled together in a functional manner, and wherein the coupling means applied therewith moreover preferably are of such kind that they can be produced easily, as well as provide in a coupling which technically is developed such that it interferes with the esthetical appearance of a piece of furniture only minimally or not at all.

To this aim, the invention, according to a first aspect, relates to a composed element comprising at least two panel-shaped elements, which each have an edge zone in which coupling means are present in the form of a profiled part respectively extending in the longitudinal direction of the edge zone concerned, as well as each comprise an end face extending transversely to the respective edge zone, wherein said profiled parts allow coupling the panel-shaped elements together in an interlocking manner, with the characteristic that at least one of the panel-shaped elements comprises means which, at the location of the end face, hide from view at least a portion of the profiled part formed at the pertaining edge zone.

Due to these means, the design of the profiled parts no longer has an influence on the exterior of the composed element, and the exterior surface can be finished in an optimum manner. As, when realizing the profiled parts, it is no longer necessary to consider the effect thereof on the exterior, the manufacturer moreover has the possibility of optimizing the profiled part in an unlimited manner in respect to good connection characteristics.

According to a first possibility, said means consist in that at the end face a strip of covering material is provided having next to said edge zone a contour course which differs from the contour course of said profiled part.

In a preferred embodiment, the strip of covering material has a rectilinear contour course next to said edge zone. It is clear that in this manner a classical straight covering strip can be used.

Further, it is preferred that the strip of covering material at the height of said edge zone has a contour course which, in the case that the edge zone is situated at a panel surface, is situated in the plane of this panel surface, and that, in the case that the edge zone is situated at a side edge, extends between the corner edges of this side edge.

The strip of covering material preferably consists of an adhered edge strip, more particularly a laminate strip or an ABS strip (synthetic material strip of acrylonitrile butadiene styrene). This latter offers the advantage that it is stronger than a laminate strip, thereby having a better damage-resistance.

According to a second possibility, said profiled part shows at least a recessed portion in the first edge zone, and said means consist of a filling material filling at least a part of the recessed portion next to said end face edge. Here, the filling material may consist of a filling compound as well as of an insertion piece.

According to a third possibility, the profiled part at said edge zone is performed up to a distance from said narrow edge only, such that at the end of the edge zone situated near the narrow edge, there remains a panel portion, which as such is not provided with a profile.

In a preferred embodiment of the first aspect, said means are performed such that, in the coupled condition of the panel-shaped elements, both profiled parts, according to a view on the end face, are hidden from view. It is also preferred that the panel-shaped elements there, where they are coupled together, show end faces with a rectangular end contour, more particular, as if the boards would fit against each other with straight sides.

The aforementioned coupling means may be of any kind, however, they are performed such that the panel-shaped elements can be joined together laterally. This latter means that two of such panel-shaped elements can be presented opposite each other with the edge zones provided with profiled parts and, from such position, can be coupled to each other by means of a suitable displacement. This movement may consist of a turning movement and/or a displacement, in which a coupling by means of a snap action is created.

The coupling means preferably comprise a tongue and groove, as well as locking elements, which, in a normal mutual usage position of the panel-shaped elements, counteract the drifting-apart of tongue and groove.

According to a second aspect, the invention relates to a composed element comprising at least two panel-shaped elements, which each have an edge zone in which coupling means are present in the form of a profiled part respectively extending in the longitudinal direction of the edge zone concerned, as well as each comprise an end face extending transversely to the respective edge zone, wherein said profiled parts allow coupling the panel-shaped elements together in an interlocking manner, with the characteristic that at least one of the panel-shaped elements is provided with a covering at the end face in the form of a strip of covering material, and that the profiled part extending to the same panel element extends continuously through said strip of covering material. According to this aspect, a less expensive solution is obtained, however, while still maintaining a certain finish at the front ends of the profiled parts.

According to a third aspect, the invention relates to a composed element comprising at least two panel-shaped elements, which each have an edge zone in which coupling means are present in the form of a profiled part respectively extending in the longitudinal direction of the edge zone concerned, as well as each comprise an end face extending transversely to the respective edge zone, wherein said profiled parts effect that the panel-shaped elements are coupled together in an interlocking manner, with the characteristic that the profiled part of at least one of the panel-shaped elements extends continuously up to said end face such that at this side a contour of the profiled part is visible and that the composed element comprises an additional element, more particularly a front panel, which, at least in one usage position, is situated in front of said contour and substantially covers the latter and thereby hides it from view.

In a practical application, said additional element is a door, for example, a cupboard door, which in closed condition substantially covers that contour.

Here, too, a simple and less expensive solution is offered for hiding the profiled parts from view, at least in the most often occurring usage position.

According to a fourth aspect, the invention relates to a composed element in the form of a wall portion or a furniture element, with the characteristic that it comprises at least two panel-shaped elements; that at least one and preferably both of the panel-shaped elements consist of a board formed of at least two structural material layers, a first material and a second material layer, respectively; and that the panel-shaped elements are provided with coupling means in the form of profiled parts, which, in the assembled condition, effect that the panel-shaped elements are coupled together in an interlocking manner.

This aspect offers the advantage that by using two structural layers, possibilities are obtained for optimizing the panel-shaped elements. For example, one material layer may be tailored to realizing sturdy coupling means therein, whereas the other material layer may be tailored to imparting the panel-shaped element a larger thickness and strength in an economic manner.

Preferably, the profiled parts are provided in the board material itself, more particularly by means of a machining cutting treatment, in particular a milling treatment.

The use of at least two structural layers is particularly useful for panel-shaped elements which are coupled to each other at an angle, preferably at 90 degrees.

In a particular embodiment, the composed element according to the fourth aspect is characterized in that the panel-shaped elements are connected at an angle by coupling means, wherein the coupling means comprise a tongue and groove integrated into the board material, as well as locking means present at the tongue and groove, which locking means counteract the drifting apart of the tongue and groove, wherein these locking means consist of locking elements, which are situated all along the side of the tongue situated closest to the inner side of the respective corner. Consequently, the locking elements are situated at a certain distance from the outer corner, due to which the risk of tearing off of certain parts under heavy load is minimized.

Preferably, such composed element herein shall be made such that the panel-shaped elements form a corner connection which forms a flush corner at the exterior side, thus, is free from protruding portions.

The composed elements according to the fourth aspect preferably utilize a multi-layered board, which further also shows one or more of the following characteristics:

- the first material layer is MDF (Medium Density Fiberboard) or HDF (High Density Fiberboard);
- the second material layer is particle board;
- the second material layer is a lightweight wood-based board;
- the first material layer has a smaller thickness than the second material layer;
- the first material layer has a thickness which is smaller than 0.7 times the thickness of the second material layer;
- the multi-layered board consists, for at least 90% of its total thickness, of said first material layer and said second material layer;
- the first material layer and the second material layer consist of separate boards which are adhered to each other, more particularly glued to each other;
- the first material layer and second material layer form part of a unitary pressed structure, wherein the first layer preferably is based on wood fibers and the second layer on wood particles;
- in the case of a corner connection, the first material layer is situated at the interior side in respect to the second layer.

As will become clear from the detailed description, it is evident that the coupling means and pertaining locking elements preferably are realized at least partially in the first material layer.

The first, second, third and fourth aspect are aspects which can be applied with panel-shaped elements coupled together in the same plane, as well as with panel-shaped elements coupled together at an angle.

According to a fifth aspect, the invention relates to a composed element comprising at least two panel-shaped elements, which consist of a board material and which are connected together at an angle, with the characteristic that the panel-shaped elements are connected by means of coupling means which comprise a tongue and groove substantially made as profiled parts in the board material itself, wherein the tongue has a first side and an opposed second side, and wherein said coupling means further also comprise locking elements preventing, in coupled condition, the drifting apart of the tongue and groove.

In a preferred embodiment of a composed element according to the fifth aspect, said coupling means show one or more of the following characteristics:
  said locking elements are only present at one side of the tongue, whereas the other side thus is free from locking elements;
  the locking means or locking elements consist of at least one locking part at the tongue and at least one cooperating-therewith locking part in the groove, wherein the locking part is provided at the tongue at an elastically bendable part of the tongue, which part also forms one side of the tongue;
  said elastic part of the tongue protrudes further in distal direction than the remainder of the tongue;
  said elastic part is separated from the remainder of the tongue by means of a slot, which preferably is reaching deeper than the plane where the panel-shaped elements adjoin each other;
  the tongue is split in order to allow a snap movement, wherein the slot in the tongue preferably reaches deeper than the plane where the panel-shaped elements adjoin each other;
  said locking means are situated at only one side of the tongue, wherein this is the side of the tongue situated closest to the interior side of said corner;
  the coupling means and locking elements allow coupling by means of a snap movement;
  the coupling means and locking elements allow coupling by means of a snap movement as well as by means of a turning movement;
  the tongue is situated at the distal end of a panel-shaped element, in other words, on the end side thereof, whereas the groove is situated at the side wall of the other panel-shaped element;
  the panel-shaped elements are realized from board material of pressed and consolidated wood components, such as particle board or wood fiberboard, for example, MDF or HDF, wherein the coupling means comprise a tongue which extends distally in the plane of the pertaining panel-shaped element, whereas the groove extends perpendicularly to the plane of the panel-shaped element in which it is provided.

In still another preferred embodiment of the fifth aspect, such composed element further is characterized in that the panel-shaped elements consist of at least two structural material layers, a first material layer and a second material layer, respectively, wherein this composed element further shows any of the following characteristics:
  the tongue has a side which is situated in the first material layer and an opposed side which is situated in the second material layer;
  the material of the first material layer shows a finer structure than the material of the second material layer, whereas at least one of said locking elements is situated in the first material layer and more particularly is made in one piece therein, which allows an accurate realization of the locking element;
  the material of the first material layer shows a finer structure than the material of the second material layer, wherein the locking elements both at the tongue and at the groove comprise a locking element, which both are situated in the first material layer of the panel-shaped element concerned.

As the locking elements are realized in the finer material, for example, MDF or HDF, the risk is small that torn-off particles would exert a disadvantageous influence on the locking. Also, narrower tolerances can be applied.

Also with composed panels according to the fifth aspect, it is preferred that the panel-shaped elements at the exterior side of a corner formed by them adjoin each other in a flush manner, such that the corner concerned is free from protruding panel parts.

According to a sixth aspect, the invention relates to a composed element, which is composed at least partially of a set of panel-shaped elements completely surrounding a space, with the characteristic that the panel-shaped elements are coupled to each other entirely around this space by means of coupling means in the form of profiled parts integrated into the edges of the panels, said profiled parts allowing that all these panel-shaped elements can be joined into each other laterally. Preferably, said space is surrounded by four panel-shaped elements, which successively are laterally joined into each other by means of coupling means in the form of profiled parts integrated into the edges of these elements and thereby form an element with four corners. Further, it is preferred herein that said four panel-shaped elements possess profiled parts, which are composed such that the four panel-shaped elements can be joined together in at least one of the following manners:
  the panel-shaped elements can be joined into each other at three of said four corners at least by means of a turning movement, whereas the panel-shaped elements which are adjacent to each other, at the fourth corner at least can be joined into each other laterally by means of a snap movement;
  the panel-shaped elements can be joined at all four corners into each other laterally at least by means of a snap movement;
  three of the four panel-shaped elements can be joined into each other at least at two successive corners by a turning movement, whereas the fourth panel-shaped element can be attached to, more particularly, in between, the other panels at least by means of a snap movement.

The sixth aspect offers the advantage of a simple assembly.

According to a seventh aspect, the invention relates to a composed element, characterized in that it comprises a basic structure which, at least at three successive sides, is provided with a covering formed by panel-shaped elements, with the characteristic that these panel-shaped elements mutually are connected to each other by means of coupling means. Such composed element allows that the covering can easily be provided around the basic structure, due to said coupling means, and as such also is held in its place. In a practical embodiment, the panel-shaped elements consist of board material, and the coupling means are formed at least by profiled parts formed in the board material itself.

The basic structure may consist of any element. It may relate, for example, to a carcass for a piece of kitchen furniture, a refrigerator, for example, a wine storage cupboard, and so on.

According to an eighth aspect, the invention relates to a composed element, which is composed of a basic structure formed by a refrigerator, which is provided with a covering at a number of sides, with the characteristic that the covering consists of panel-shaped elements consisting of wood-based board provided with a laminate covering. This eighth aspect allows providing for a covering in an inexpensive manner. The wood-based board is, for example, an MDF or HDF board.

According to a ninth aspect, the invention relates to a composed element in the form of a wall portion or a furniture element, which comprises at least two panel-shaped elements, with the characteristic that they are connected by means of coupling means making use of a locking element, which is made as an insertion piece in an edge in one of the panel-shaped elements. The use of such insertion piece offers the advantage that in respect to locking, bending and the like, other features may be obtained than when the coupling means are performed in the board material of the panel-shaped elements themselves. Consequently, the connection between two panel-shaped elements can be optimized considerably, as in this manner a sturdier locking can be realized, however, without putting an extensive load on the board material itself.

Preferable characteristics of such coupling means using an insertion piece will become evident from the description and the claims.

According to a tenth aspect, the invention relates to a multi-layered board, with the characteristic that it consists of at least two structural material layers, a first material layer and a second material layer, respectively, which both are made as a wood composite and wherein the material of the first material layer shows a finer structure than the material of the second layer.

It is clear that by a "wood composite", a composition is meant which is at least formed of components on the basis of wood and a binding agent connecting these components to each other. These components consist, for example, of wood particles and/or wood fibers and/or wood flour, also called sawdust. The fact that reference is made to "components" in the plural form, means that this relates to an amount of component particles and thus does not mean that different kinds, such as fibers on the one hand and particles on the other hand, must be present in the same layer, although this is not excluded.

By a "finer" structure, in particular a structure is meant, which, in a cross-section of the first material layer, offers a finer surface than the surface obtained with a cross-section of the second material layer.

Such "finer" structure may consist, for example, in that finer wood components are applied in the first material layer and/or that a better filling is used in the first material layer, such that a less porous structure is obtained, and/or in that a higher density is applied in the first material layer.

It is clear that such board can be realized in a relatively cheap manner, as it is substantially made on the basis of wood, however, at the same time has important usage possibilities, as each material layer can be optimized in function of the application.

This multi-layered board preferably has a structure fulfilling one or more of the following possibilities:
the first layer is formed on the basis of wood fiber material and more particularly consists of MDF or HDF;
the second layer is formed on the basis of wood particles and more particularly consists of particle board;
the second layer is made as a light-weight wood-based layer, for example, light-weight wood-based board; such light-weight wood-based layer or board consists of a wood composite in which one or more lighter filling materials are present;
said light-weight wood-based board comprises as a filling material at least foamed synthetic material and/or flax chips or the like;
the first layer has a smaller thickness than the second layer;
the first layer has a thickness which is smaller than 0.7 times the thickness of the second layer;
the multi-layered plate consists, for at least 90% of its total thickness, of said first layer and said second layer;
the first and second material layer consist of particles, more particularly wood particles, however, the first material layer on average comprises more finer wood particles and/or more binding agent than the second material layer;
the first layer and second layer consist of separate boards which are adhered against each other, more particularly, glued against each other;
the first layer and second layer form part of a unitary pressed structure, as a result of which the two layers can be realized in a single operation.

It is noted that all possible combinations of the herein above summarized possibilities for the first and second material layer specifically fall within the invention, with the exception of combinations showing mutually contradictory characteristics.

It is clear that by "structural" layers, layers have to be understood which, viewed in cross-section, each form an essential component part of the thickness of the composed board. Layers, which thus, for example, are performed exclusively as a skin, such as, for example, a thin layer of finer particles at the surface of the board in order to obtain a smoother surface, can not be considered a structural layer. Preferably, the first and second material layer show thicknesses each being at least 25% and still better at least 30% of the total thickness of the composed board.

It is clear that the difference intended by "finer structure" relates to a difference obtained by a production method applied explicitly for this purpose, more particularly by applying mutually different materials, mutually different material blends, or materials in different ratios, whereas a density distribution which is purely the result of, for example, pressing and consolidating a material mass in a press, where, as is known, a larger compression takes place at the surface than in the center, is not considered a "difference" as intended by the invention.

It is noted that a board which comprises at least two structural layers, which thus each have a considerable thickness in respect to the total thickness, and wherein the first material layer is formed by a pressed wood composite, whereas the second material layer comprises a pressed composite material of a lesser weight, as such also is advantageous, irrespective whether the first material does have or does not have a finer structure than the second material layer. To this aim, the present invention, according to an eleventh aspect, thus also relates to a board, which is characterized in that it comprises at least two structural material layers, wherein the first material layer thereof is formed by a pressed wood composite, whereas the second material layer comprises a pressed composite material of a lesser weight, more particularly of the light-weight type.

Preferably, the first material layer consists substantially, and still better exclusively, of wood composite, thus of wood components, such as wood particles and/or fibers, which are pressed and are consolidated by means of a binding agent, by which this first material layer, for example, is comparable to or consists of particle board or MDF/HDF board. The composite material of the second material layer preferably is a composite, thus, material particles with binding agent, formed on the basis of one or more materials chosen from the series of:

- wood with foamed synthetic material, for example, wood particles with foamed synthetic material and/or wood fibers with foamed synthetic material;
- flax, more particularly flax particles, originating from flax shives;
- straw;
- grasses, such as hay, hemp or elephant grass;
- a composite formed on the basis of flax and/or straw and/or grasses, combined with foamed synthetic material and/or wood particles.

It is clear that still other materials can be blended into the composites.

The foamed synthetic material can be foamed during the production of the board, as well as already foamed beforehand and can be taken up between the wood components, for example, in the form of foamed particles, for example, granules, prior to pressing the whole to form a board.

According to the eleventh aspect of the invention, the first material layer and second material layer preferably form a part of a unitary pressed structure, although it is not excluded to start for each of the two material layers from a separately manufactured board, wherein the respective boards then are attached to each other.

It is clear that also according to the eleventh aspect, by "structural layers", layers have to be understood which, viewed in cross-section, each form an essential component part of the thickness of the composed board. Layers, which thus, for example, are performed exclusively as a skin, such as, for example, a thin layer of finer particles at the surface of the board in order to obtain a smoother surface, can not be considered a structural layer. Preferably, the first and second material layer show thicknesses each being at least 25% and still better at least 30% of the total thickness of the composed board.

It is clear that the boards of the tenth as well as of the eleventh aspect, apart from the mentioned two structural material layers, may comprise still other structural material layers. According to a particular embodiment, the boards will be performed as sandwich panels, with at least three structural material layers, wherein then preferably two adjacent material layers of the aforementioned three material layers are formed by said first and second material layer.

Boards with only two structural material layers, however, show the advantage that they are easier to realize. Also, each material layer then may have a relatively large thickness in relation to the total thickness, which is useful when coupling parts have to be realized in one of the material layers.

Of course, the boards of the tenth and eleventh aspect may be provided with a finish on one or both flat sides, for example, treated with melamine and/or printed and/or lacquered.

It is noted that, when the boards of the tenth or eleventh aspect are performed as a unitary pressed structure, the transition between the first material layer and the second material layer may be gradual. The middle of the transition then shall be considered the borderline.

Further, it is preferred that said multi-layered board according to the tenth or eleventh aspect is characterized in that it is made as a panel-shaped element, which, at least at two edges, is provided with coupling means for coupling several of such panel-shaped elements to each other in an interlocking manner, whether or not by the intermediary of provided in between profiled connecting pieces, wherein these coupling means show one or more of the following features:

- the coupling means allow coupling at least two of such panel-shaped elements to each other in the same plane, preferably directly to each other;
- the coupling means allow coupling at least two of such panel-shaped elements to each other at an angle, directly or, as further described, by means of intermediary pieces;
- the coupling means consist of a tongue and groove, as well as locking elements which, at least in a certain mutual position of the panel-shaped elements, prevent that the one element comes with its tongue out of the groove of the other element;
- said locking elements are only present at one side of the tongue, whereas the other side thus is free from locking elements;
- the locking means consist of at least one locking part at the tongue and at least one cooperating-therewith locking part in the groove, wherein the locking part at the tongue is provided at an elastically bendable part of the tongue, which also forms a side of the tongue;
- said elastic part of the tongue protrudes farther in distal direction than the remainder of the tongue;
- said elastic part is separated from the remainder of the tongue by means of a slot;
- said locking means are situated at only one side of the tongue, wherein this is the side of the tongue situated closest to the inner side of said corner;
- the tongue comprises a side which is situated in the first material layer and an opposed side which is situated in the second material layer;
- at least one of the aforementioned locking elements is situated in the first material layer and more particularly is made in one piece therewith;
- said locking elements, at the tongue as well as at the groove, both are situated in the first material layer;
- the entire tongue and groove, in which by the groove at least the directed towards each other flanks of the groove are intended, as well as the pertaining locking elements are realized in the material of the first material layer.

According to the invention, all features summarized herein above can be combined at wish, inasmuch as such combinations are not contradictory.

According to an independent twelfth aspect, the invention relates to a composed element comprising at least two panel-shaped elements, which mutually are at an angle, as well as at least one connecting piece, which can cooperate with both panel-shaped elements, with the characteristic that at least one of the panel-shaped elements comprises an edge zone in which coupling means are present in the form of a profiled part extending in the longitudinal direction of the edge zone concerned; that the connecting piece comprises at least one profiled part extending in the longitudinal direction thereof; and that said profiled parts allow laterally joining the panel-shaped element and the connecting piece into each other in an interlocking manner and in this way coupling them to each other.

Such composed element has the advantage that it is easy to assemble and that the use of small components, such as screws, connecting pins, clamping systems and the like can be excluded for forming the corner connection. Also, it is easy to manufacture. The connecting piece can be realized from different materials, at manufacturer's choice, whereby for this purpose another material may be chosen than for the panel-shaped elements.

The panel-shaped elements consist, for example, of laminated wood composite boards, such as laminated particle board or wood fiberboard, or multi-layered boards, such as already described herein above. Also, otherwise-coated wood composite boards are taken into account.

The connecting pieces preferably are made as profiled laths. They may be formed, for example, by extrusion or by providing the necessary profiles in straight laths by means of a machining treatment, such as a milling process.

A number of practical examples of materials from which the connecting pieces can be realized, are MDF, HDF, solid wood, aluminum or synthetic material, more particularly Nylon, PET, PP, PVC and the like. Of course, the profiled parts may be provided with a covering, for example, by means of a print and/or one or more lacquer layers and/or by encasing. In the case of encasing, any film can be used, for example, paper, PP, PVC, PET, veneer and the like.

The connecting pieces may have different lengths. Their final length may correspond to the depth of a piece of furniture or the like applying it, or differ therefrom. For example, it is not excluded to apply short connecting pieces, whereby then, for example, at least two thereof will have to be applied at a distance from each other along a respective edge of a piece of furniture. In such case, these connecting pieces may have a length of several centimeters or even have a length of one centimeter or less.

Preferably, the profiled part at the panel-shaped elements is made in one piece therewith.

The profiled parts preferably are configured such that the panel-shaped elements and the connecting pieces can be joined into each other at least by means of a snap movement. Still better, they are configured such that, at the location of one and the same connection, they can be joined into each other by turning as well as by snapping, at the assembler's choice.

The profiled parts preferably apply a tongue and groove connection, wherein the tongue and groove are provided with locking parts or locking elements, which prevent the drifting apart. The tongue preferably is situated at the distal end of the panel-shaped element, whereas the groove is provided in the connecting piece. Preferably, the tongue is split for the purpose of the snap action. Herein, it is advantageous that the slot present in the tongue to this aim extends up to a depth which, in mounted condition, is deeper than up to the plane where the panel-shaped elements adjoins the connecting piece.

The composed element of the twelfth aspect preferably is a furniture element. This may relate to a furniture element of any kind. A practical field of application is in modular hanging or standing cupboards. Another application is in kitchen cupboards, for example, for composing basic kitchen modules, which then are further finished by the kitchen installers, for example, by providing thereon front walls, countertops and the like.

In a corner construction, preferably both panel-shaped elements adjoining thereto are coupled to the connecting piece in such manner by means of profiled parts. It is noted that the tongue and groove in a single-fold corner connection preferably are always situated closer to the inner corner than to the outer corner.

Also, connecting pieces can be applied, which allow a T-connection, a cross connection or a connection in the same plane, such that a plurality of furniture modules can be formed next to each other and one upon the other.

Preferably, the connecting pieces are mounted along the corner edges, where side walls have to be coupled with upper walls, lower walls, respectively, of a module. More particularly, it is preferred that the component parts of such module all around between side walls, upper wall and lower wall are coupled in such manner, thus, by means of the connecting pieces.

According to a thirteenth aspect, the invention relates to a composed element, which comprises at least two modules situated next to each other, with side walls, upper walls and lower walls, which are formed by panel-shaped elements, characterized in that the side wall where the modules adjoin each other, is formed by a single common panel-shaped element; that there is a first connecting construction between this common panel-shaped element and the upper walls of the modules; that there is a second connecting construction between this common panel-shaped element and the lower walls of the modules; and that at the location of at least one of said connecting constructions, one of the panel-shaped elements, via a profiled part formed at this panel-shaped element, is coupled directly or indirectly to the other panel-shaped elements.

By the technique of the thirteenth aspect, the respective modules can be assembled in a fast manner. A separate height adjustment and connection between separate side walls is no longer necessary. Moreover, space is saved, in consideration of the fact that between the modules, only a single common panel-shaped element is required.

In a preferred embodiment, all panel-shaped elements which come together in said connecting constructions are coupled to each other by means of profiled parts provided in the elements, whether or not by means of intermediate pieces.

For the coupling means and/or connecting pieces used therewith, preferably use is made of embodiments as described in the preceding aspects.

The eleventh aspect is particularly advantageous when building kitchen cupboards, in particular in modules offered as a basis to kitchen builders, which latter then build complete kitchen cupboards from these modules, by providing them, for example, with front panels, countertops, possible additional lateral coverings and a variety of accessories.

According to a fourteenth aspect, the invention also relates to a board, which, over the majority of its thickness, comprises a pressed wood composite, which is at least composed of wood components and a binding agent, with the characteristic that in the wood composite, by means of its composition, a reinforcing layer of a local thickness is formed. By a "local thickness", it is meant that the reinforcing layer shows a thickness which is smaller than the total thickness of the board and thus, viewed in a cross-section, is present only locally.

It is noted that the reinforcing layer is formed in the wood composite, which means that the reinforcing layer is in one piece integrated into the board and that this does not relate to a separate layer applied by gluing or the like between other board-shaped layers formed in advance.

Such board of the fourteenth aspect has the advantages that, on the one hand, it can be realized in an economic manner, and, on the other hand, it offers advantageous features in a large number of applications.

Due to the fact that it is started from a pressed wood composite and the most important basic material thus is wood, the costs, however, remain relatively low. In that the reinforcing layer moreover only is formed over a certain thickness, also the amount and cost of the materials required to this aim are kept low.

It is clear that such board can be advantageously applied, for example, when manufacturing furniture panels. The furniture panels manufactured thereof then show, amongst others, an increased bending resistance, due to which, when being applied, for example, as a shelf, they will sag less fast and/or can carry heavier loads.

In a particular embodiment, the board is applied in the manufacture of panels which are provided with coupling means formed of the board material, which coupling means comprise locking parts or locking elements, and these coupling means are realized at least partially in the reinforcing layer. This offers the advantage that the coupling means obtained are stronger than with a panel realized from a similar board, however, without such reinforcing layer being present. As a result thereof, for example, sturdier couplings can be realized, wherein the coupling parts may be loaded heavier without a break and/or tear-off thereof occurring. On the other hand, according to the invention it is also possible to realize a less expensive board, for example, with a lower density and thus relatively with less wood composite, wherein due to the reinforcing layer, coupling means still can be realized therein, which have a normal or even better strength. A practical application thereof, for example, consists in manufacturing panels in MDF, wherein at least in a certain thickness thereof a reinforcing layer is integrated, such that at that location, an increased strength is created in the board, and such MDF board then can be used in many applications as a replacement for a HDF board, which as such is more expensive.

Consequently, the invention is particularly useful with floor panels, furniture panels and ceiling panels, which are provided with coupling means at their edges, which coupling means allow coupling such panels to each other in an interlocking manner, whether directly or indirectly.

It is clear that generally, the location of the reinforcing layer can be chosen in function of the application for which the board is used. Also, it is clear that possibly also two or more reinforcing layers can be provided in the board.

Preferably, the reinforcing layer substantially extends over the entire board, preferably relatively uniform. This offers the advantage that, irrespective where a panel is formed from a board, for example, is sawed therefrom, it is always possible to form reinforced coupling means at the edge.

The board according to the fourteenth aspect preferably relates to a board of the type obtained by pressing a mat-shaped layer of wood composite, whether or not in combination with other materials, as is usual in the traditional manufacture of particle board and MDF/HDF boards.

The wood composite which is applied in the board according to the fourteenth aspect of the invention, preferably consists of wood fibers with a binding agent. More particularly, it is preferred that the wood composite is performed as a MDF or HDF board, in which then the reinforcing layer is integrated.

However, it is not excluded to apply other wood composites for this purpose, such as particles and the like, such that in such case, the board according to the fourteenth aspect consists of a particle board with a reinforcing layer integrated therein.

The reinforcing layer may be performed in different ways.

The reinforcing layer may be formed, for example, by locally applying wood components, which, at least in one certain direction, offer a higher strength than the remaining wood components. An example thereof is a particle board in which a wood fiber layer has been incorporated. The wood fiber layer, which then is comparable, for example, to MDF or HDF, shows a higher tensile strength in the plane of the board than in the portion of the board which is composed of particles. In such application, it is preferred that the wood fiber layer is situated at one side of the board only or rather is situated in the middle, thus, at a distance from both sides, such in view of forming coupling means in this reinforcing layer.

According to the fourteenth aspect of the invention, the reinforcing layer does not necessarily have to consist of wood composite and may also be formed by a reinforcing layer which utilizes other materials. For example, it may be formed by glass fibers, which form a layer as such in between the wood composite, or which are blended with the wood composite over a certain thickness; preferably introduced as loose fiber particles which are consolidated by pressing.

Another efficient technique of the invention consists in realizing the reinforcing layer by means of the applied binding agent. According to a first possibility, the board is formed such that it comprises more binding agent at the location of the reinforcing layer. Herein, this may relate to an additional amount of binding agent of the same binding agent which is applied in the remainder of the board, and/or to an additional amount of another material with a binding effect. By applying more binding agent, a better bonded and more solid mass is obtained, which also increases the strength of the board at the location of the reinforcing layer.

Particular binding agents, which can be used in the layer to be reinforced, are elastomers and/or thermoplastics. More particularly, it is preferred that polyurethane is applied, in a non-foamed form, and still in particular thermoplastic polyurethane.

The reinforcing layer may be provided adjacent to a surface of the board, thus, of the raw board, as well as within the board, thus, at a distance from the two flat sides of the board. For example, when it is intended to realize a board with an increased impact resistance at the surface, it is clear that the reinforcing layer preferably is realized at that surface. For example, when the intention is to be able to form sturdier coupling means in the edges of the board, then the reinforcing layer preferably is present over that portion of the thickness of the board, where this contributes to a reinforcement in the coupling means in the best way.

It is clear that the invention also relates to panels which are formed from a board according to the fourteenth aspect of the invention, more particularly panels with coupling means, which are at least partially performed in the reinforcing layer. Here, this may relate to furniture panels, wall or ceiling panels, as well as floor panels.

It is noted that the use of an elastomer and/or thermoplastic as a binding agent also offers good characteristics in respect to noise dampening, in particular in respect to impact noises, such as footfall sound when walking on floor panels, however, also in respect to penetrating noises. In connection herewith, the present invention, according to a fifteenth aspect, relates to a board, which, for the majority of its thickness, is composed of a pressed wood composite, consisting of wood components bonded by a binding agent, characterized in that it is provided, over a local thickness, with a layer of elastomer and/or thermoplastic, more particularly polyurethane or a product on the basis of polyurethane, and more particularly thermoplastic polyurethane. By applying this material only over a minor thickness, in other words, not the entire thickness, costs remain low. Efficiency, however, remains good, as the product is present in the entire board as a layer, even if this is only over a portion of the thickness thereof.

It is clear that this then is a layer which forms part of the pressed board itself. The elastomer and/or the thermoplastic, and more particularly the polyurethane, thus is situated between the wood components and/or the wood components are impregnated therewith. For this purpose, the elastomer and/or the thermoplastic, more particularly the polyurethane or the product on the basis of polyurethane, may be added to the wood components either in combination with the usual binding agent of the wood composite, or as a replacement thereof, at the location where the layer concerned has to be formed.

The wood components can consist of particles and/or wood fibers, and such board can be realized, for example, in a similar manner as wood particle boards or wood fiberboards, such as MDF and HDF, wherein then it is started from two wood composites, on the one hand, a wood component which is at least glued with the elastomer and/or the thermoplastic, more particularly the polyurethane or the product on the basis of polyurethane, whether or not combined with other binding agent, and, on the other hand, a wood component which is glued with a binding agent which does not comprise said elastomer and/or the thermoplastic, more particularly the polyurethane or the product on the basis of polyurethane, or does comprise it to a considerably lesser extent. Starting from these wood composites, then a mat consisting of different layers can be formed by strewing the treated wood components, such that after pressing this mat a board according to the invention is obtained.

Alternatively, one may also start from the same wood composite, which is glued with a traditional binding agent, wherein during the forming of the mat to be pressed, the elastomer concerned and/or the thermoplastic concerned are added thereto, for example, by spraying or the like.

Other possibilities for providing the elastomer and/or thermoplastic in the board itself in the form of a layer, more particularly the polyurethane or a product on the basis of polyurethane, and still more particularly thermoplastic polyurethane, are not excluded to achieve a board according to the fifteenth aspect. For example, a possibility may consist in that the layer is formed by impregnating the upper side of an already formed particle board or wood fiberboard with the respective materials.

The elastomer and/or thermoplastic, more particularly polyurethane or a product on the basis of polyurethane, and in particular thermoplastic polyurethane, best is situated in the proximity of a surface of the board and more particularly preferably is adjacent to this surface. Consequently, such boards are considered particularly useful as a basic board for realizing floor panels from them, more particularly floor panels having a thin top layer on top of the basic layer of which they consist. As in such applications the respective layer then is directly beneath or at a very small distance beneath the top layer, a clearly observable dampening effect against footfall sound is obtained, which presumably is due to the fact that said layer forms a more or less elastic underlay for the mostly hard top layer.

The above-mentioned effect is particularly useful with floor panels which are formed of such board and are provided with a laminate layer, in particular DPL (Direct Pressure Laminate). Herein, the top layer is hard and thin. Due to the hardness, usually an undesired footfall sound is produced when it is walked upon. Due to the fact that the top layer, however, is thin and said dampening layer is situated directly or almost directly underneath, a good dampening effect is obtained. Also in floor panels with other top layers, there is an improvement, such as in floor panels having a top layer of HPL (High Pressure Laminate) or a top layer consisting of one or more prints and/or one or more layers of lacquer, such as primers, decorative paint layers, transparent top layers and the like.

In particular with a directly printed board, whether or not by the intermediary of primers, and whether or not provided with a transparent protective layer, however, with the exclusion of classical laminate layers consisting of one or more paper sheets soaked in resin, the invention will show its usefulness, as the produced footfall sound as such then will be low and moreover is dampened well.

The layer of elastomer and/or polyurethane, more particularly polyurethane or a product on the basis of polyurethane, and in particular thermoplastic polyurethane, is situated with its upper side preferably not farther than 2 mm and still better not more than 1 millimeter below the surface of the floor panel to be walked on.

Thus, it is also clear that the invention relates to floor panels showing the above-mentioned characteristics.

According to a sixteenth aspect, the invention relates to a composed element, which comprises at least two panel-shaped elements, which mutually are at an angle and are coupled by means of a connection, wherein one of the two forms a back part, whereas the other forms a part extending perpendicularly in respect to the back part, with the characteristic that at least one of the panel-shaped elements, for forming said connection, comprises a zone, more particularly an edge zone, at which coupling means are present in the form of a profiled part extending in the longitudinal direction of the respective zone, wherein this profiled part allows that said panel-shaped elements can be joined into each other directly or indirectly in an interlocking manner and in this way can be coupled to each other. The profiled part, as well as the portion in which it has to engage, which usually also will consist of a profiled part, herein preferably are configured such that the respective panel-shaped elements can be directly or indirectly joined laterally into each other in an interlocking manner. By "laterally" is meant that the panel-shaped elements, from a position in which the respective profiled parts are situated parallel opposite to each other, can be joined into each other, more particularly by means of a turning and/or snap movement, either directly into each other, or by the intermediary of a connecting piece. A composed element according to the sixteenth aspect of the invention offers the advantage that it is very easy to assemble and that due to the locking connection with the back part, a particularly stable construction is obtained.

By an "interlocking" connection, it has to be understood that as soon as the panel-shaped elements are in a coupled condition and in the normal mutual position, they are prevented to come apart from each other. Such connection preferably is performed as a tongue and groove coupling, at which additional locking elements are present, for example, as already described above in connection with the other aspects.

Particularly practical constructions are obtained with embodiments of the sixteenth aspect, wherein said longitudinal direction extends in the height and such connection thus is active between the back part and one or more upright-standing side walls and/or upright-standing intermediary walls. Preferably, at least the two connections between the back part and the usual two side walls are performed in accordance with the sixteenth aspect. In the case that one or more upright-standing intermediary walls are applied, it is also preferred that one or more thereof, and still better all of them, also are coupled to the back part by means of connections by means of the sixteenth aspect.

An additional advantage with composed elements, wherein said connection extends in height, is that, when such element is higher than a person, the coupling means at the end faces are not visible and thus it is not necessary to apply particular means in order to hide the profiled parts from view at their upwardly directed ends. Herein, possible shelves or the like preferably are put on between the side walls and/or intermediate walls by classical support means, such that the end faces of the side panels and/or partitions, which are directed forward, simply can be made straight. In other words, there are no continuous profiled parts in the end faces, which would have to be camouflaged one way or another.

Although the sixteenth aspect is particularly advantageous with upright-directed connections, it may also be applied with horizontal connections between a back part and a panel-shaped element, such as between a back part, on the one hand, and a shelf, a bottom plank or a top plank, on the other hand.

According to a preferred embodiment of the sixteenth aspect, both respective panel-shaped elements are provided with profiled parts, which then engage directly into each other. This offers the advantage that no separate connecting pieces are necessary and the cost of the construction remains limited.

However, this does not exclude that according to a variant, use can be made of one or more connecting pieces situated as an intermediate piece between the panel-shaped elements, for example, profiled laths, which are made in accordance with the twelfth aspect.

It is noted that the aforementioned panel-shaped element, which is made as a back part, can be composed of a plurality of segments, which each as such also can be coupled to each other, whether directly or indirectly, by means of profiled parts. In an indirect coupling, preferably one or more lath-shaped connecting pieces are applied, which respectively also may perform a connection with an intermediate wall, preferably also by means of profiled parts, at the connecting pieces and at an edge of the intermediate wall, respectively.

A particularly practical embodiment of a piece of furniture which is performed according to the sixteenth aspect, consists in that between the side walls and the back part, there are corner connections with profiled parts which are performed directly in the respective panel-shaped elements, whereas for the connections between the back part and the intermediate walls, use is made of connecting pieces.

It is clear that embodiments according to the sixteenth aspect of the invention are particularly suitable for pieces of furniture in the form of a rack with shelves. It is clear that in this application as well as in other applications the term furniture or piece of furniture has to be broadly interpreted and that in this manner, this may relate, amongst others, to pieces of furniture in the form of standing cupboards, hanging cupboards and the like, as well as pieces of furniture in the form of a large assembly, for example, wall cabinets, dressings, large racks, for example, for shops, and the like.

Further, the invention also relates to a composed element, such as defined above or such as also described in the following, wherein at least one of the panel-shaped elements, and preferably both, is, are, respectively, made of a multi-layered board, such as described here above.

Also, the invention relates to panel-shaped elements which combine one or more characteristics of the various aforementioned aspects at the location of one and the same connection, of course, inasmuch as these characteristics are not contradictory. Herein, the invention aims at all possible combinations of such characteristics.

It is clear that the invention relates to any form of composed element which comprises at least two or more panel-shaped elements, as mentioned above, irrespective of the field of application, and irrespective of the fact whether the composed element substantially consists exclusively of said panel-shaped elements or whether these panel-shaped elements only form a part thereof.

Although the invention can be applied in any application, it is, for various of the aforementioned aspects, in particular intended for being applied in the sectors of furniture, walls and wall coverings. For couplings in the same plane, this may relate, for example, to panel-shaped elements together forming a wall or wall covering, or which together form a large panel of a piece of furniture, such as, for example, a tabletop formed of multiple panel-shaped elements. In such tabletop, then, the end faces form the lateral edge of this tabletop. For coupling at an angle, this may relate, for example, to panel-shaped elements forming different sides of a cupboard.

A number of application possibilities of the invention in the furniture sector are the following:

a table, such as a party table; sports table, more particularly a ping-pong table or the like, wherein the tabletop consists of multiple of said coupleable or coupled panel-shaped elements;

a cupboard, wherein the panel-shaped elements form at least a vertical and a horizontal wall;

a piece of bathroom furniture or a kitchen cupboard;

a cupboard having a basic structure around which a covering casing is provided, wherein the composed element forms the covering casing or a portion thereof;

a wine storage cupboard;

flat-pack furniture.

In the case of a tabletop, the panel-shaped elements can consist of parts which systematically have to be coupled one after the other; however, according to a variant, the elements also can form parts of the tabletop situated next to each other as well as one after the other, for example, in the form of four quadrants.

It is clear that the invention also relates to panel-shaped elements which allow realizing, together with other elements, a composed element according to the invention.

Further characteristics of the invention follow from the following detailed description and the attached claims.

BRIEF DESCRIPTION OF THE DRAWINGS

With the intention of better showing the characteristics of the invention, hereafter, as an example without any limitative character, several preferred embodiments are described, with reference to the accompanying drawings, wherein.

Figure 1:
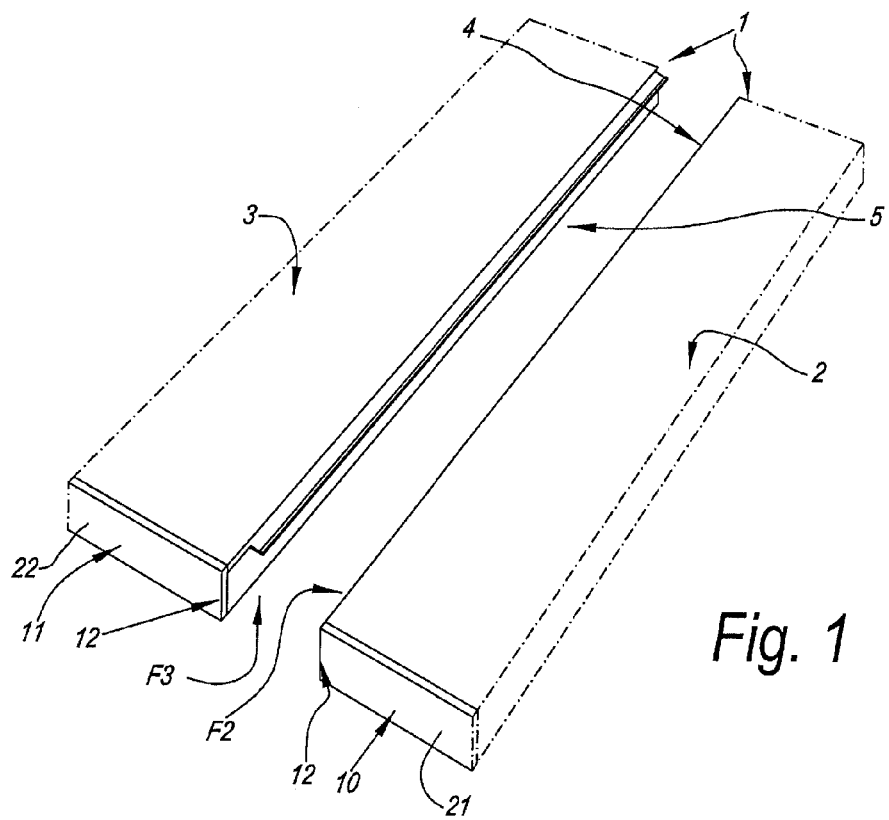
FIG. 1 represents a composed element according to the invention in dismounted condition.
Figure 12:
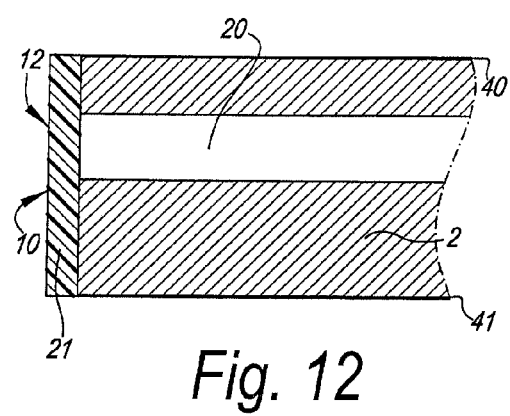
Figure 13:
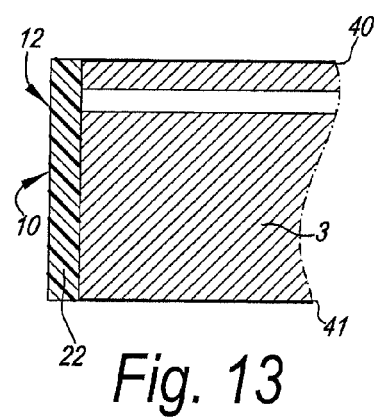
Figure 2:
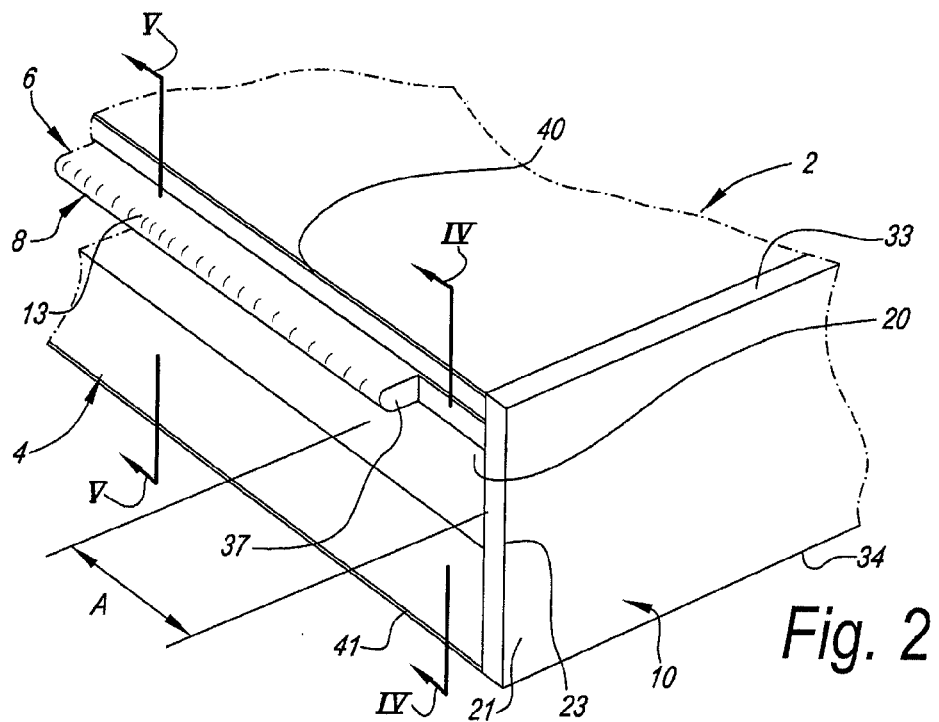
Figure 3:
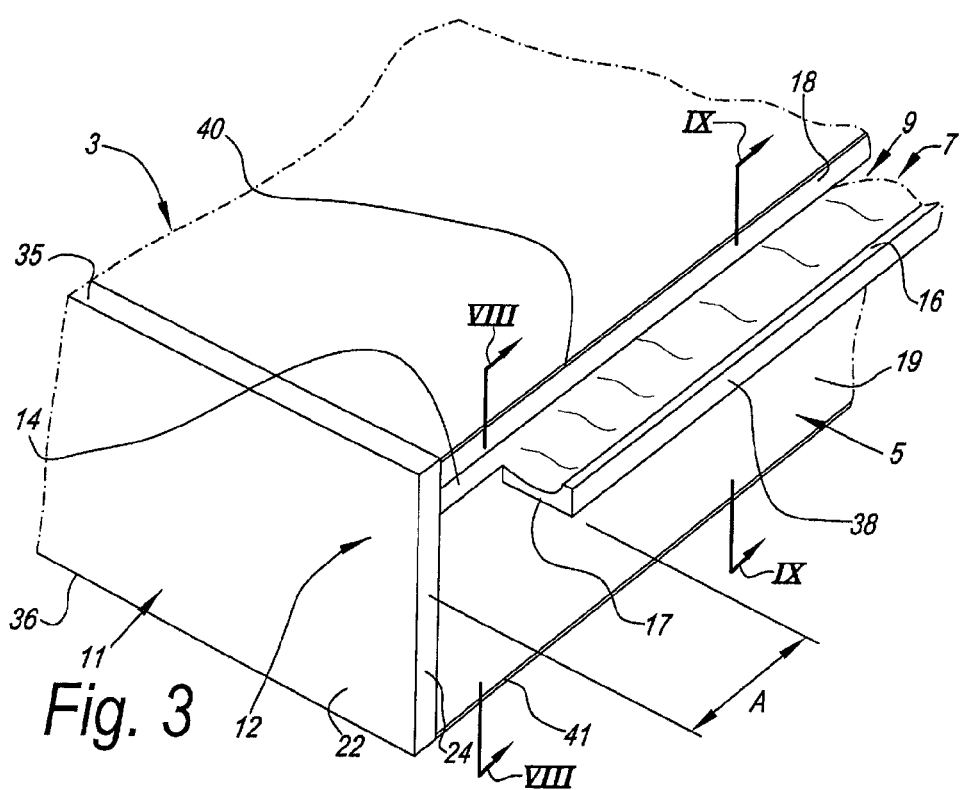
Figure 4:
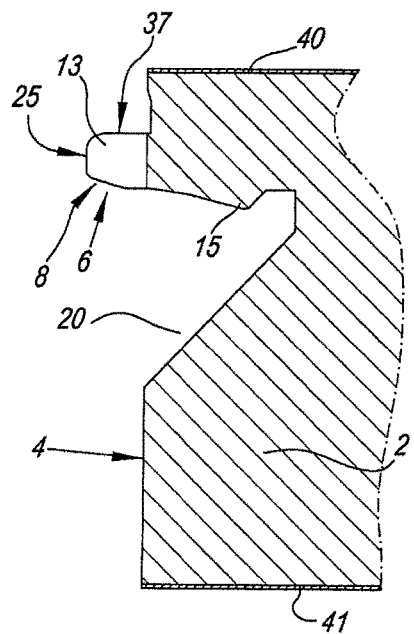
Figure 5:
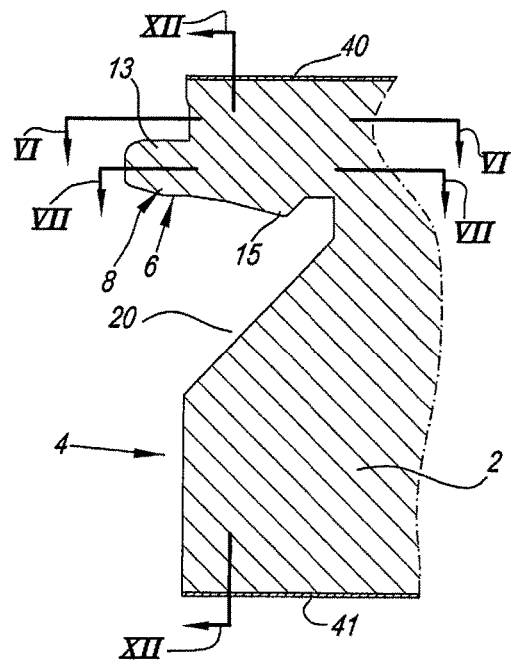
Figure 6:
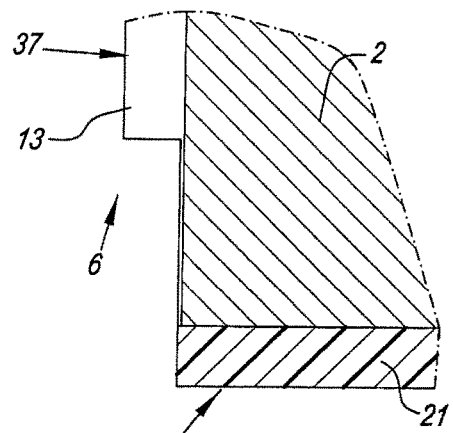
Figure 7:
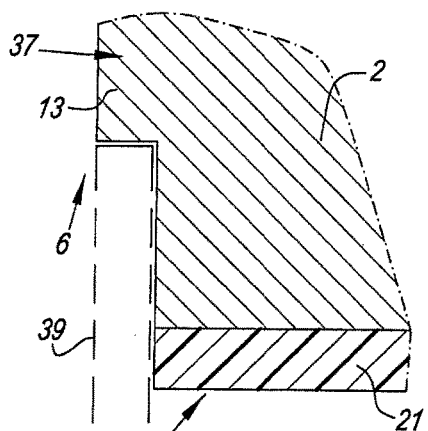
Figure 8:
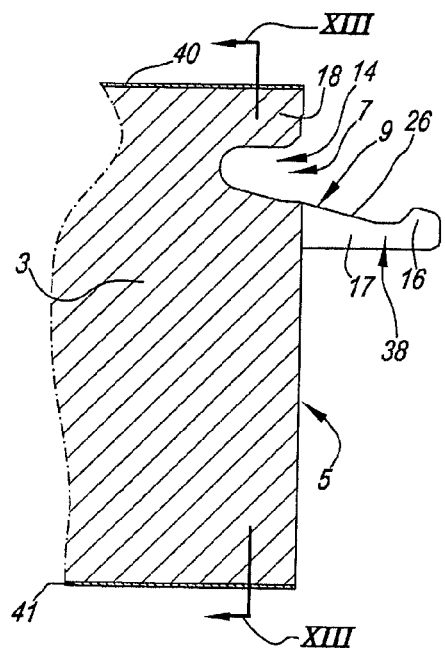
Figure 9:
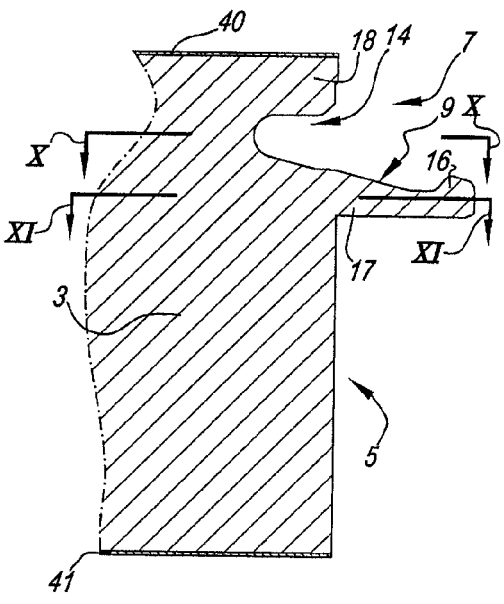
Figure 10:
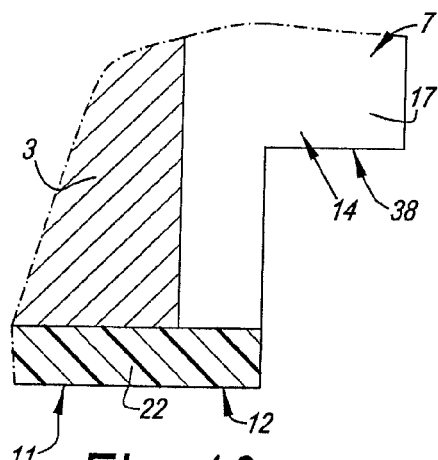
Figure 11:
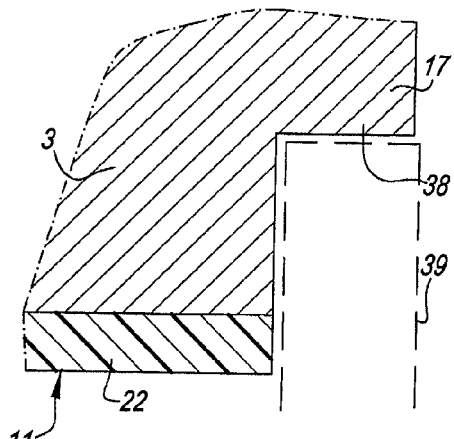
Figure 14:
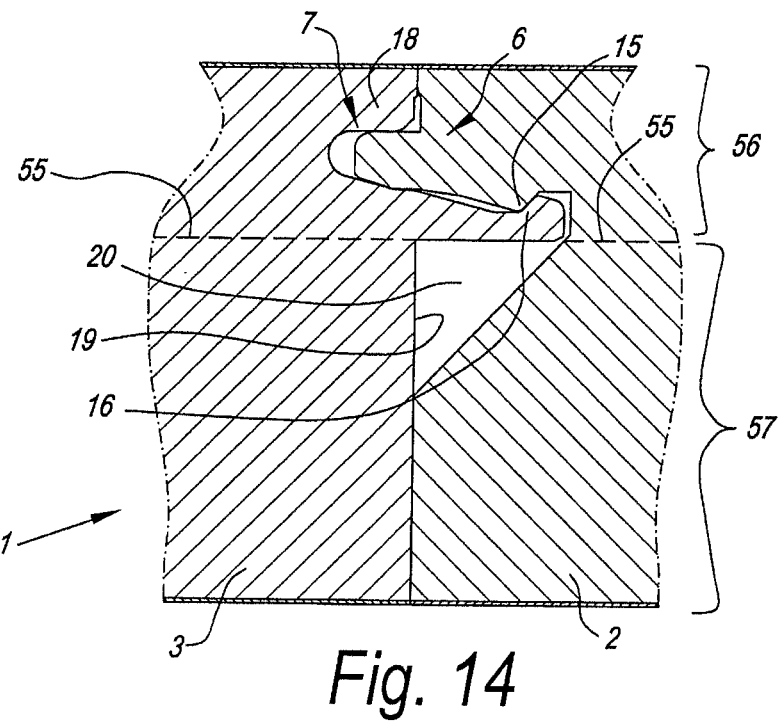
Figure 15:
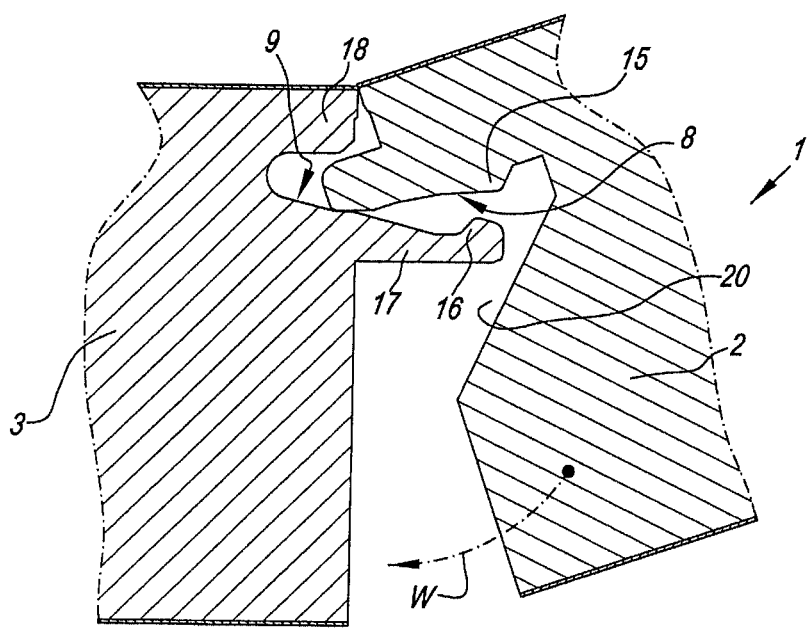
Figure 16:
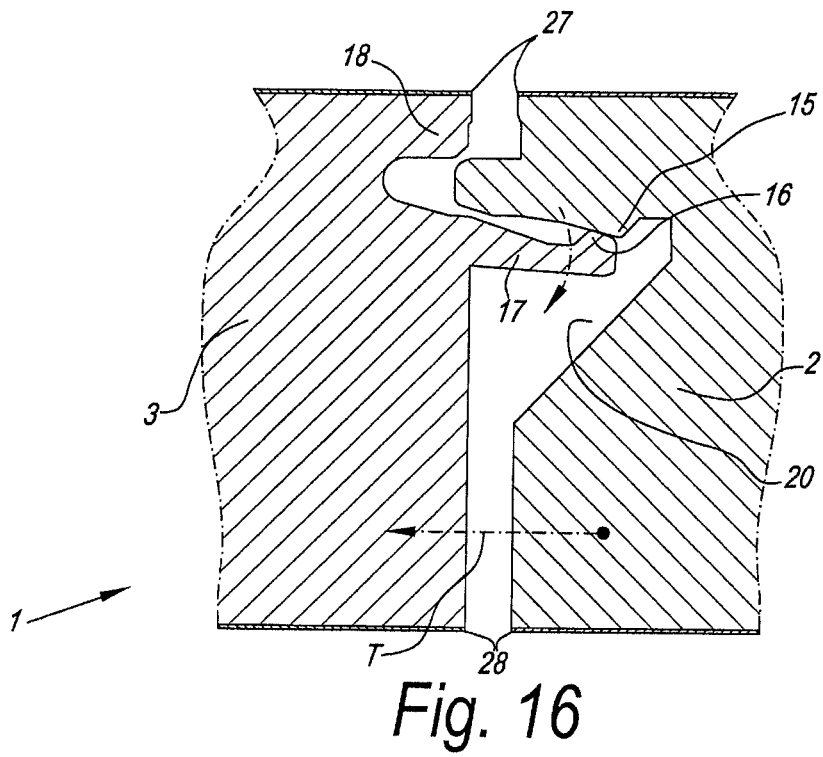
Figure 17:
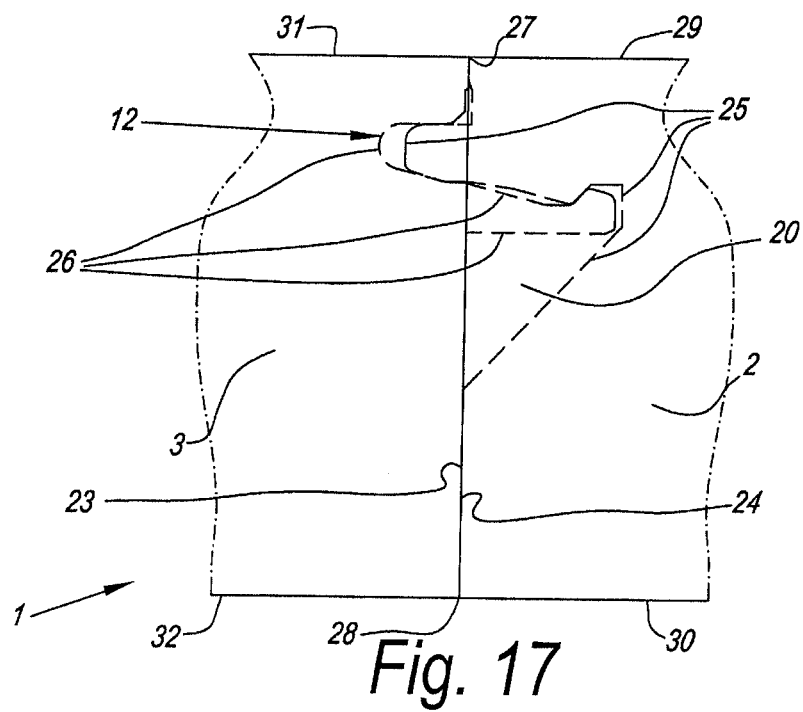
Figure 18:
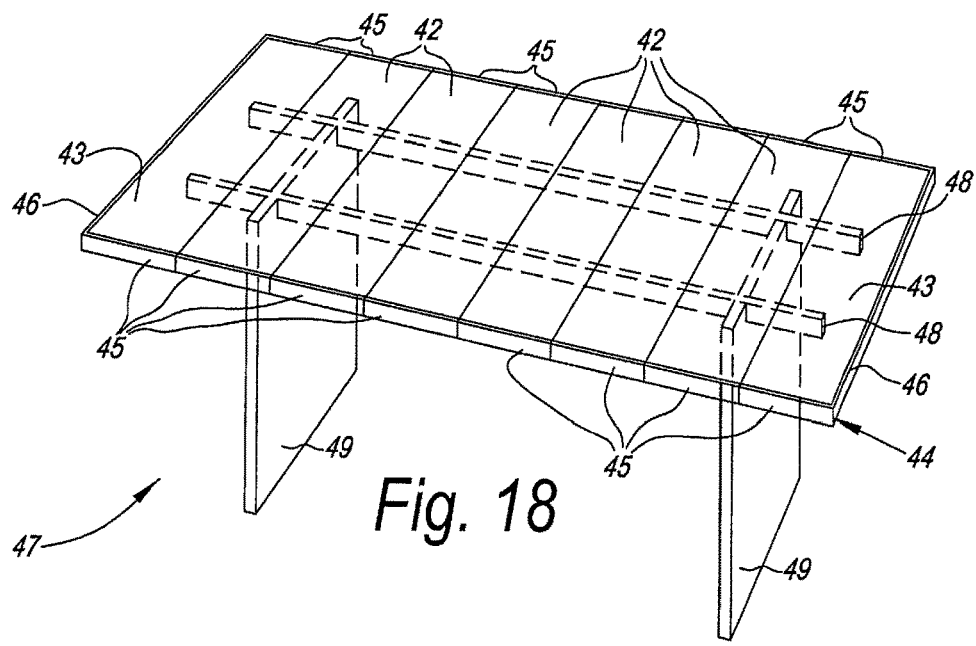
Figure 19:
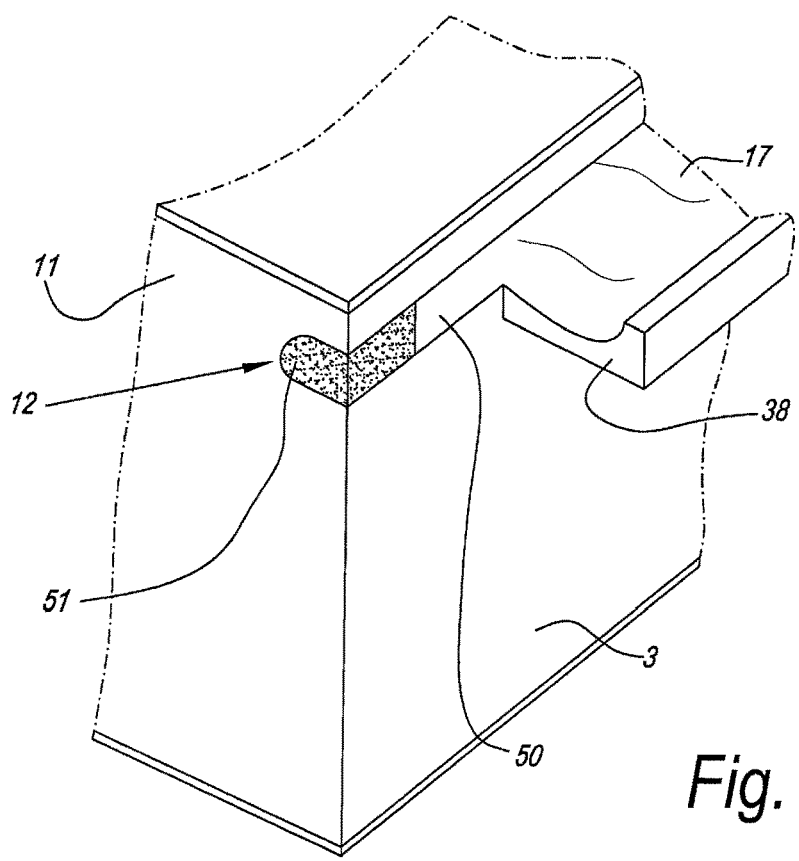
Figure 20:
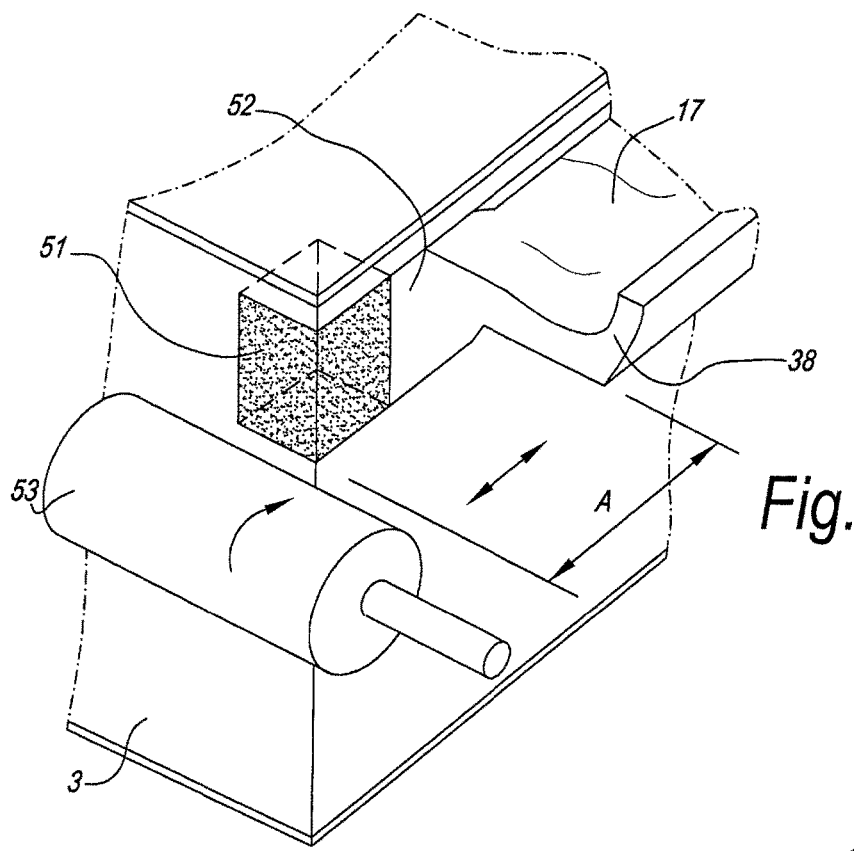
Figure 21:
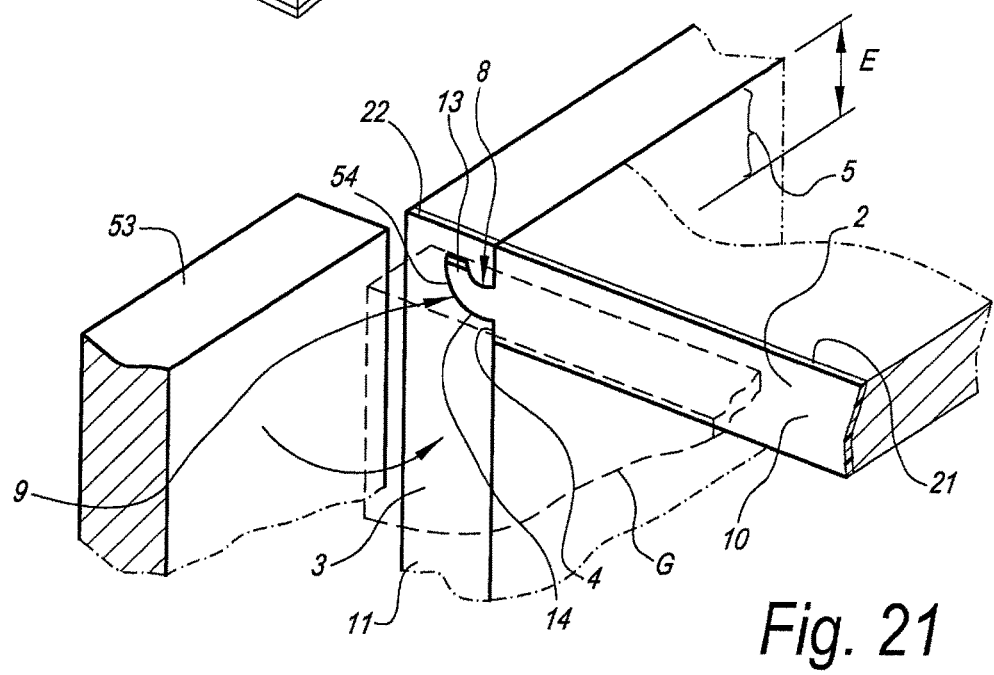
Figure 22:
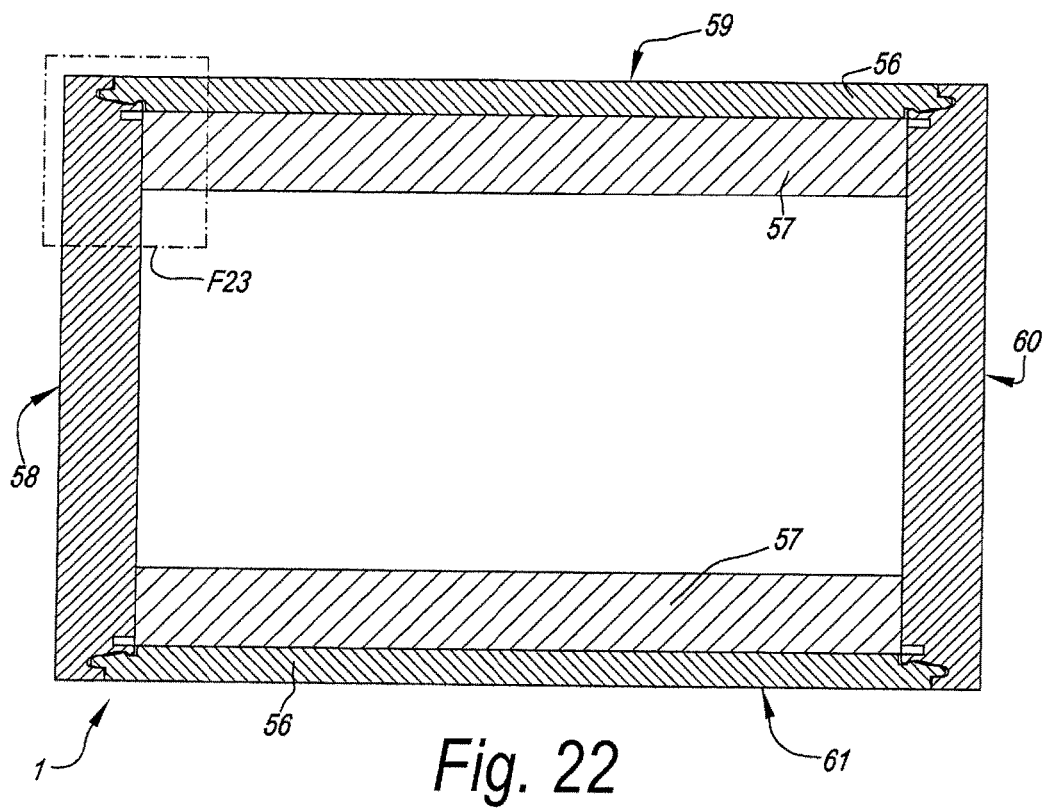
Figure 23:
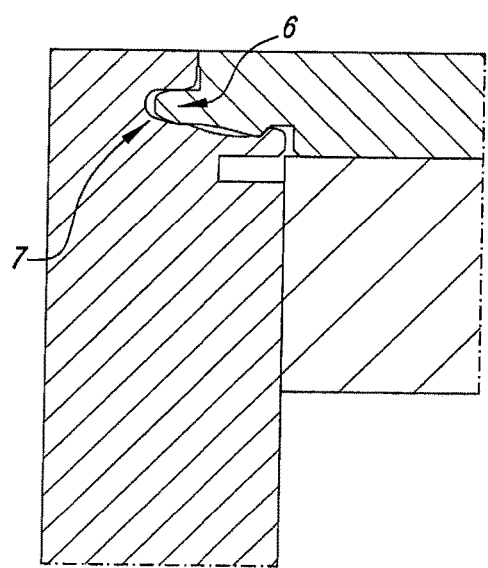
Figure 25:
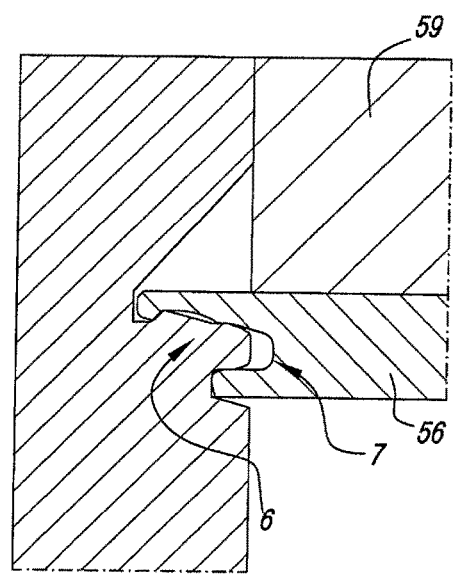
Figure 24:
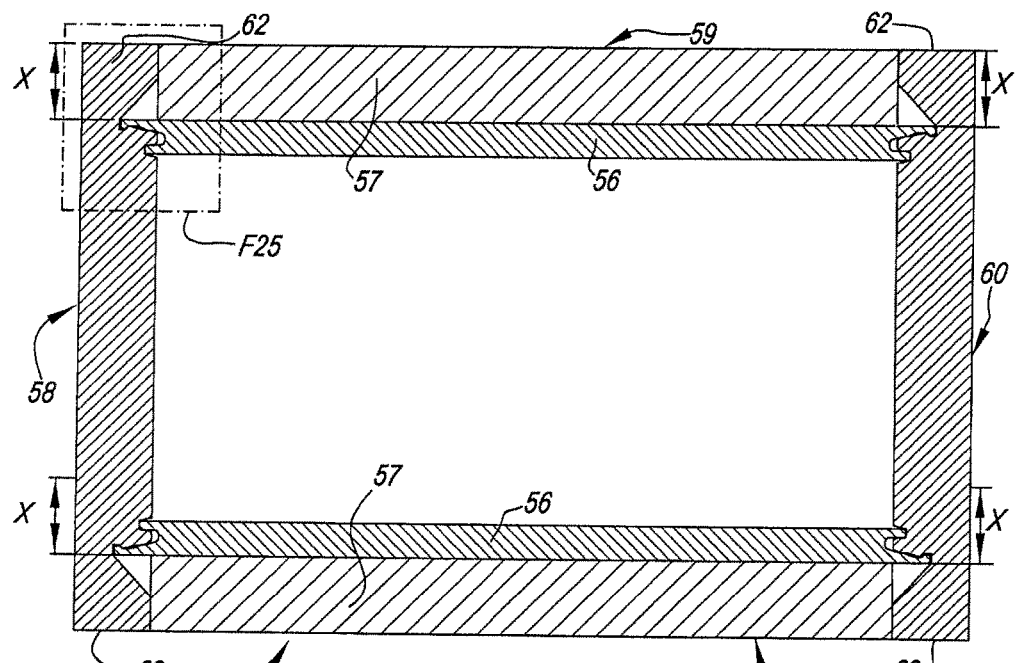
Figure 26:
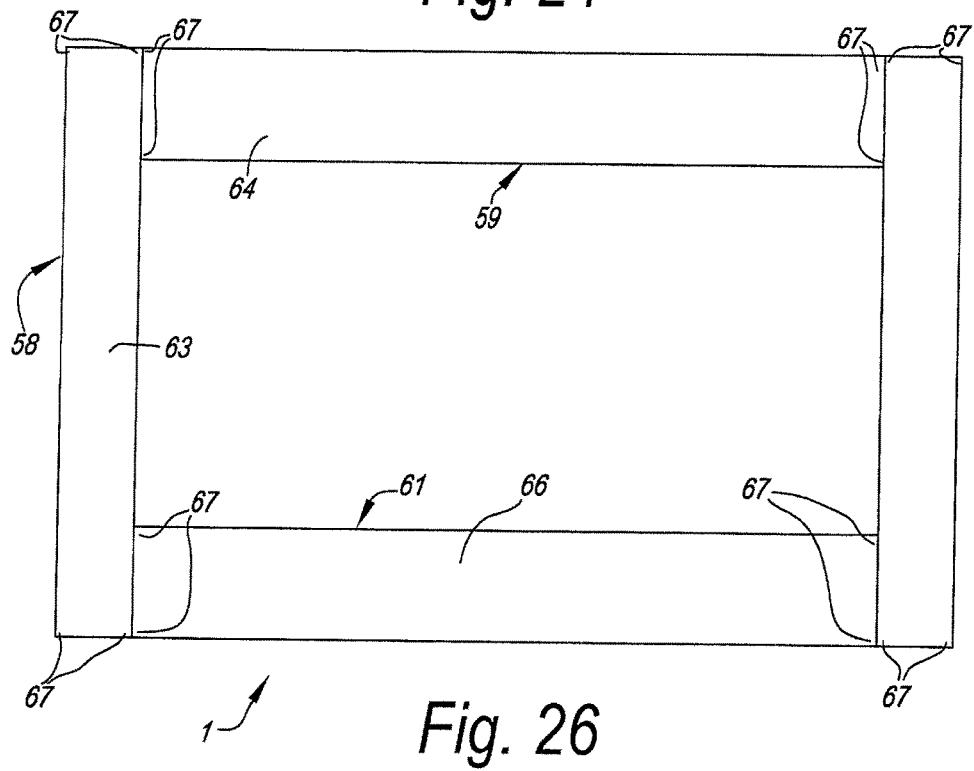
Figure 27:
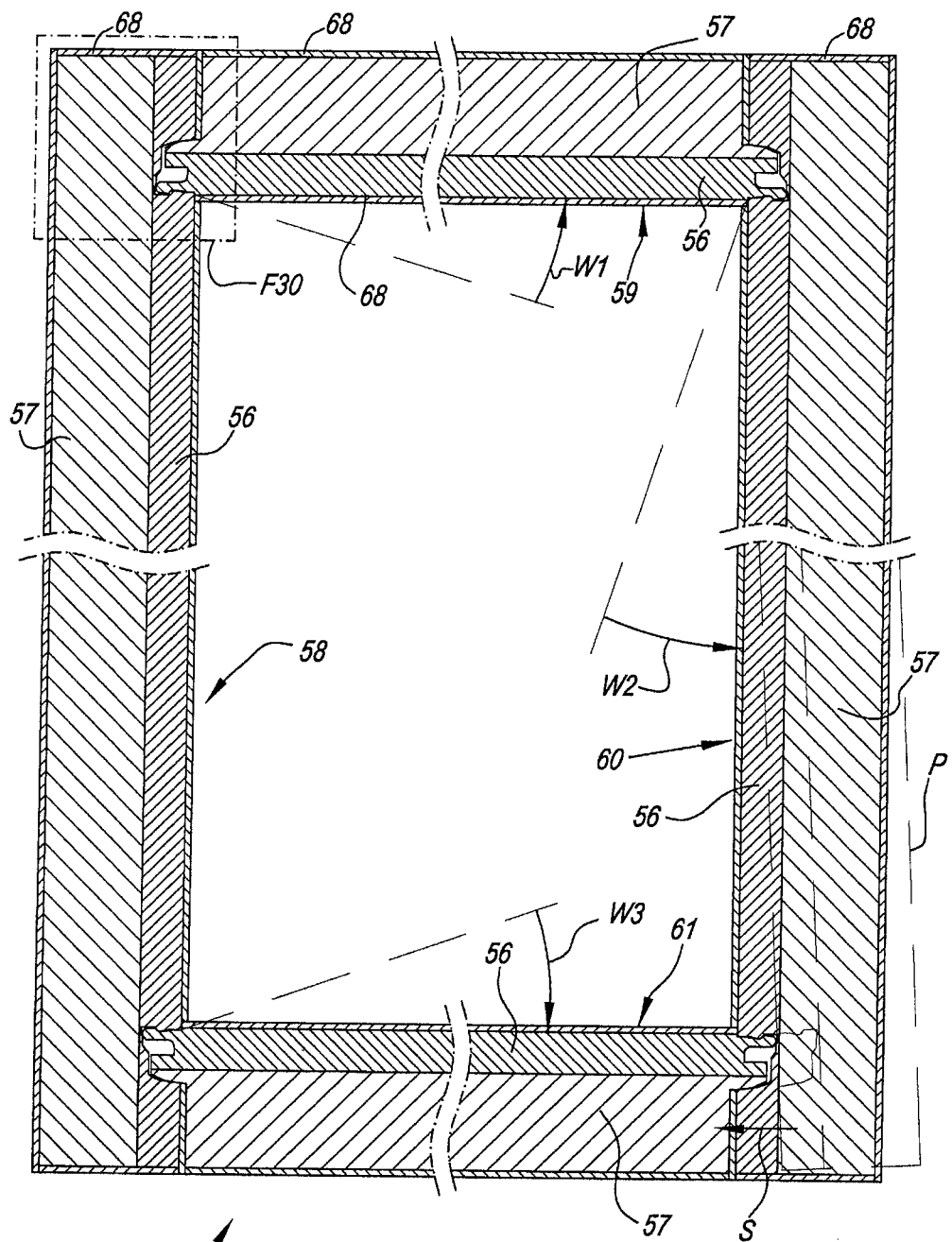
Figure 28:
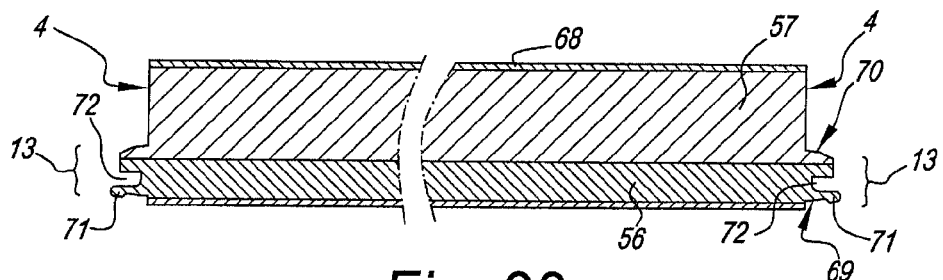
Figure 29:
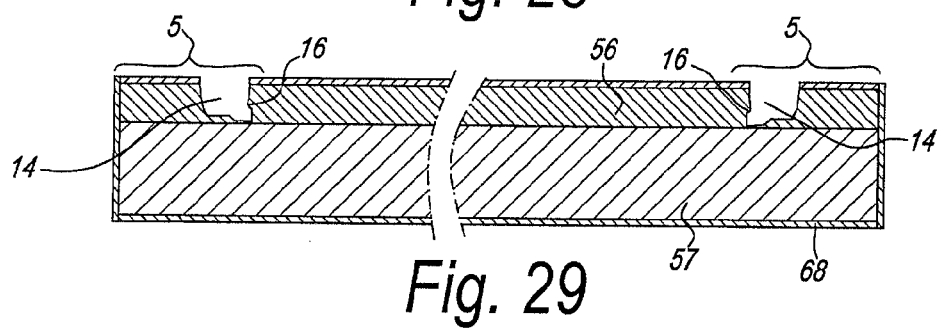
Figure 30:
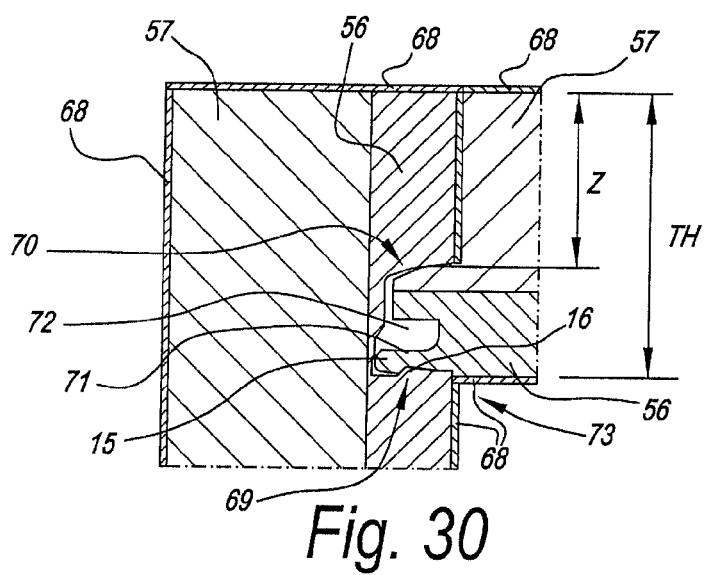
Figure 31:
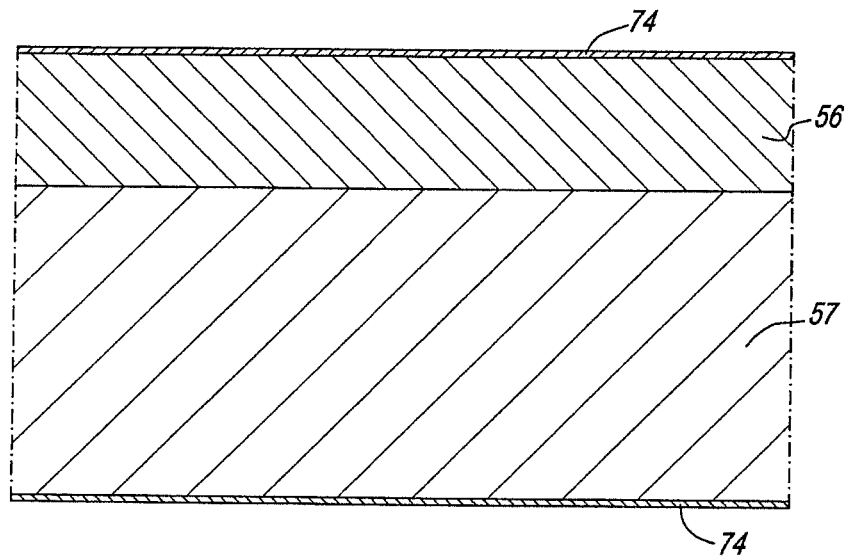
Figure 32:
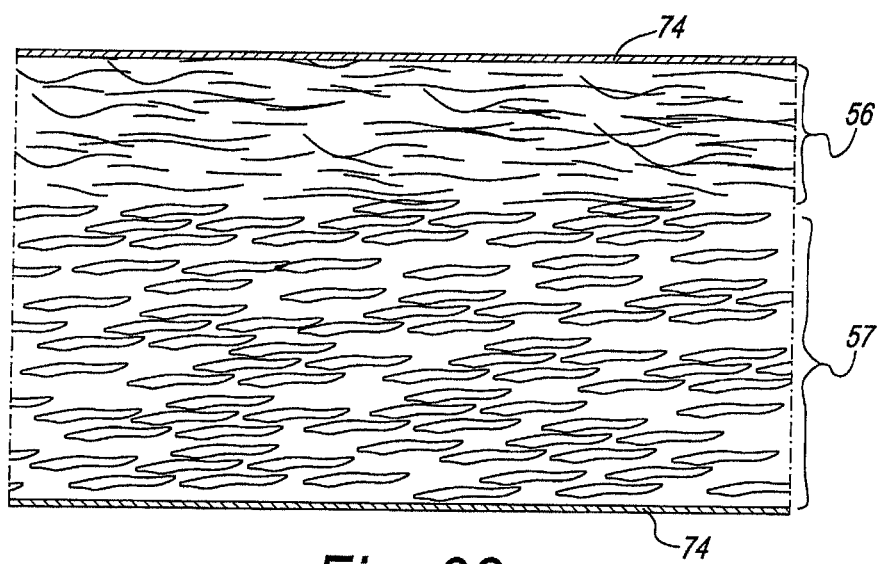
Figure 33:
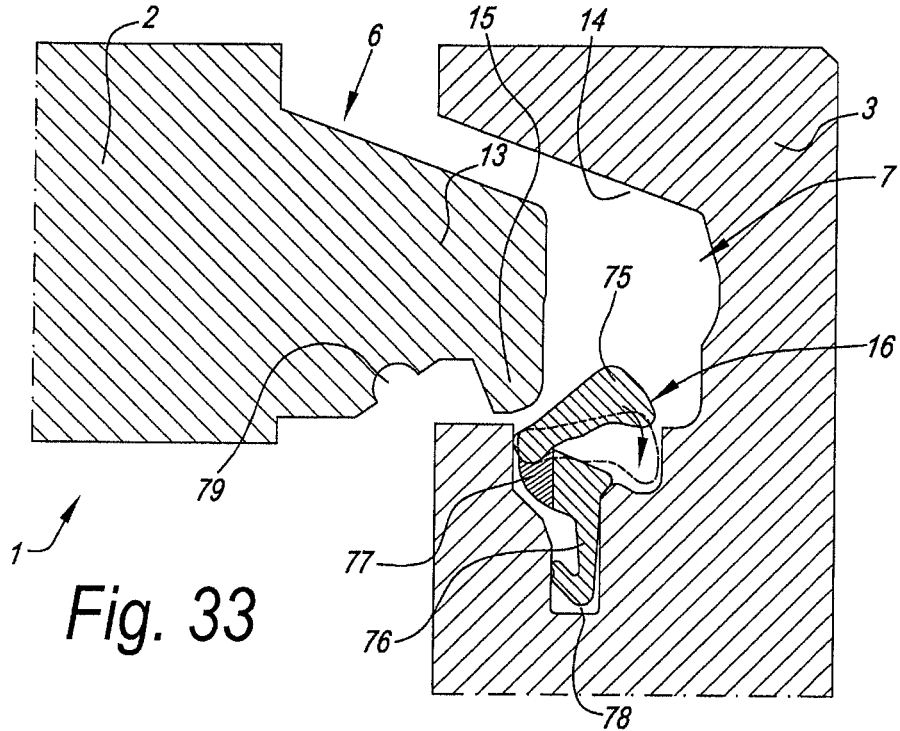
Figure 34:
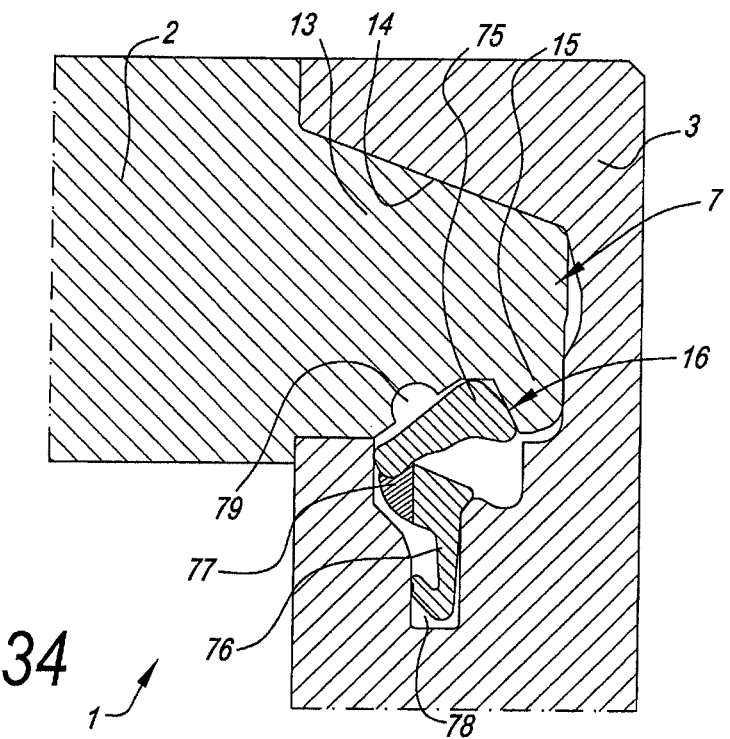
Figure 35:
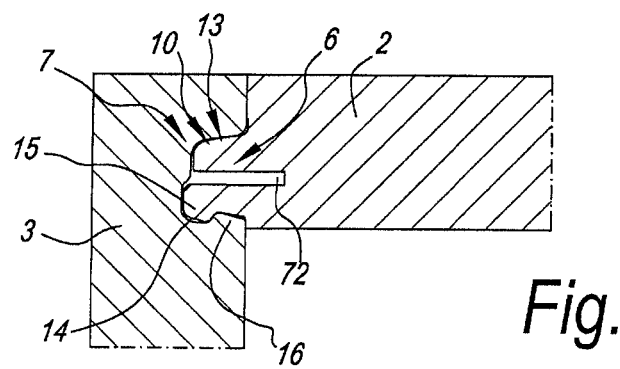
Figure 36:
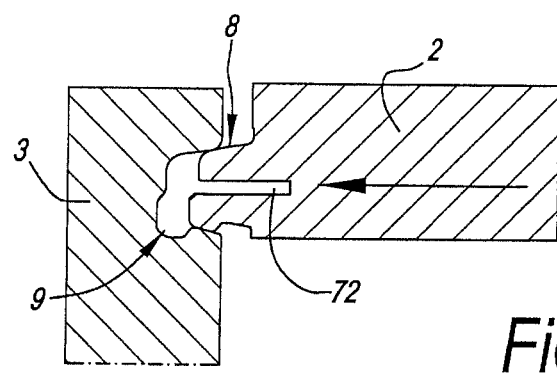
Figure 37:
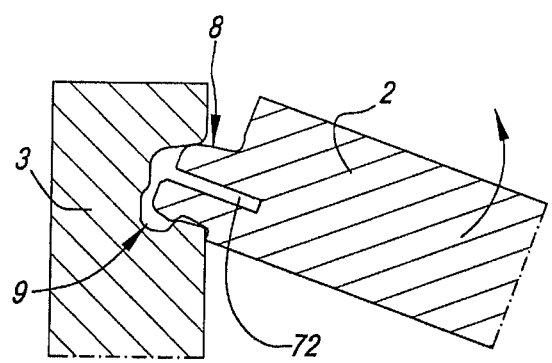
Figure 38:
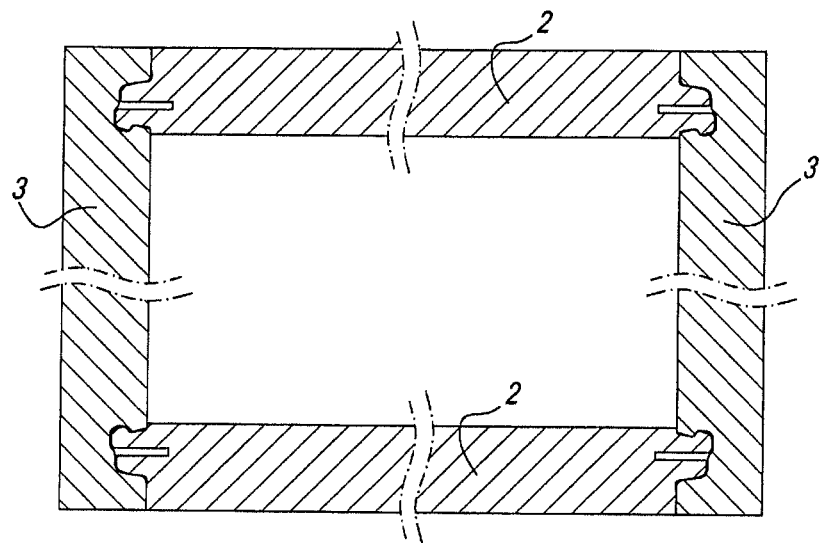
Figure 39:
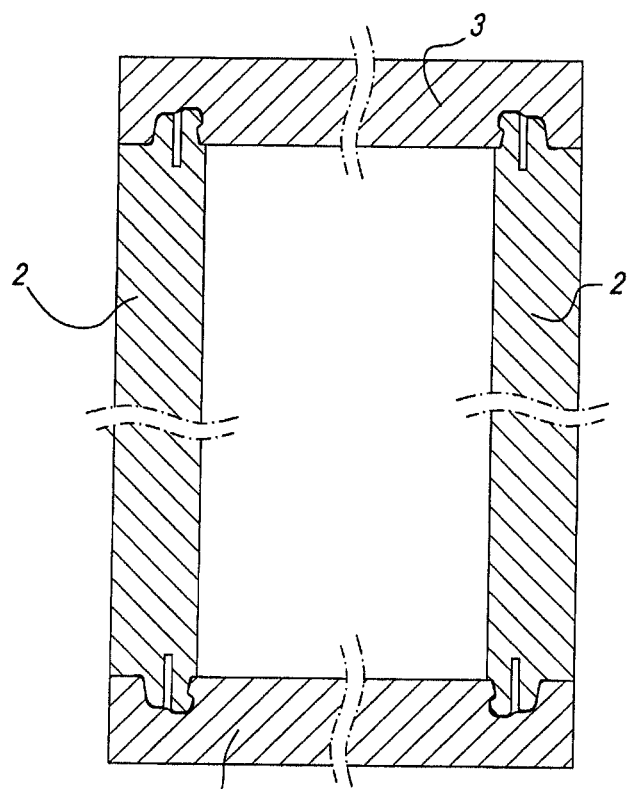
Figure 40:
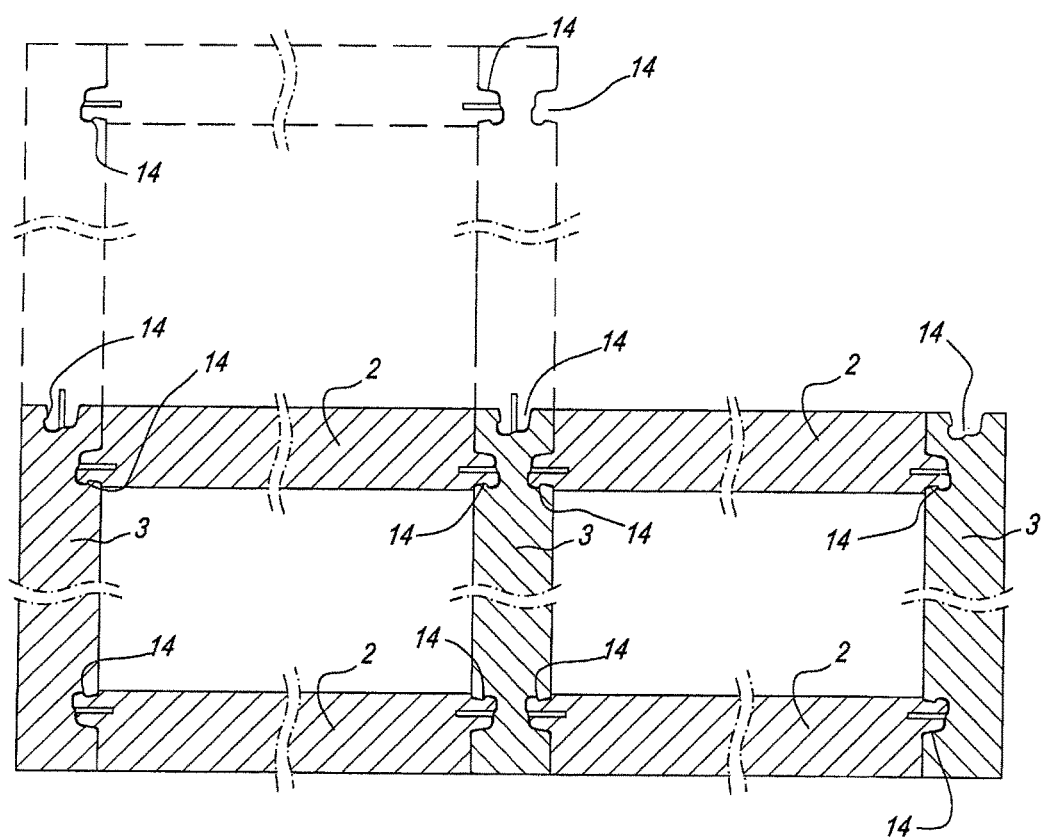
Figure 41:
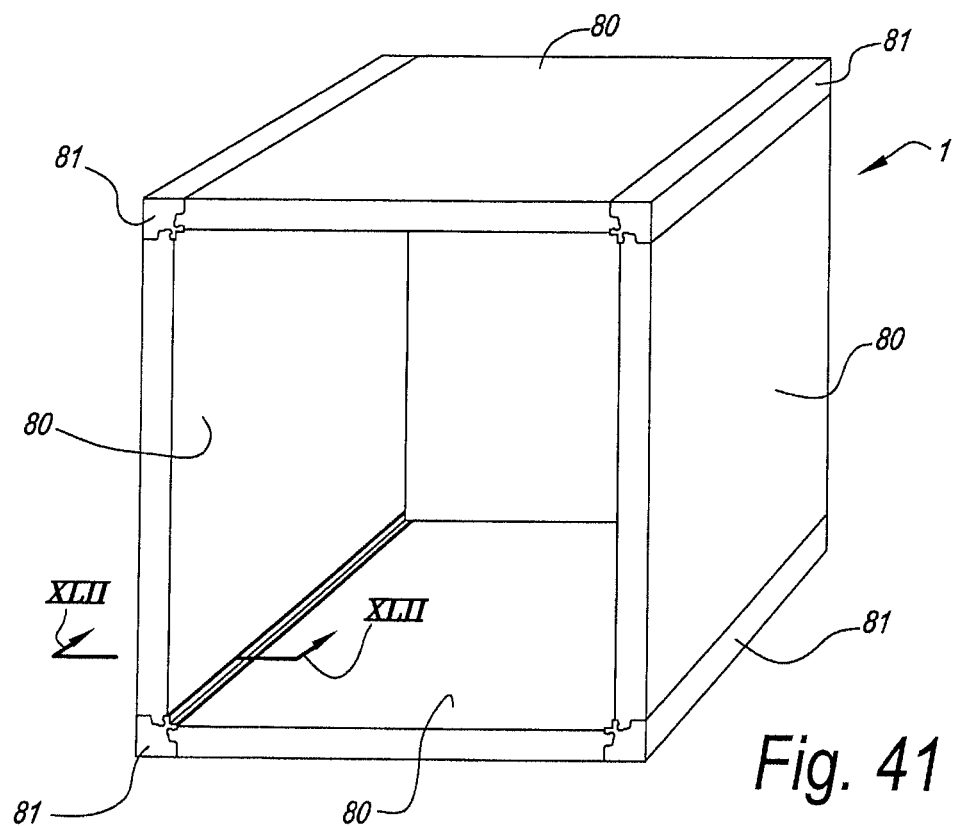
Figure 42:
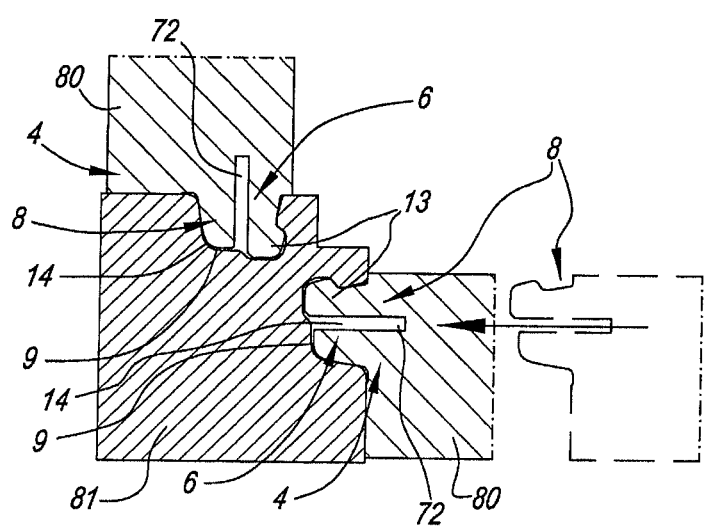
Figure 43:
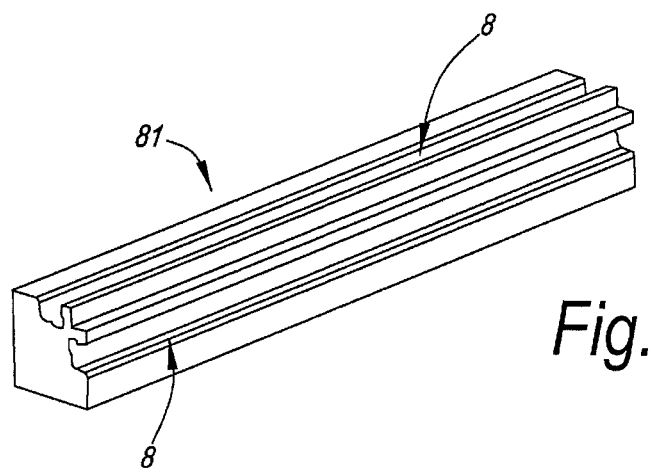
Figure 44:
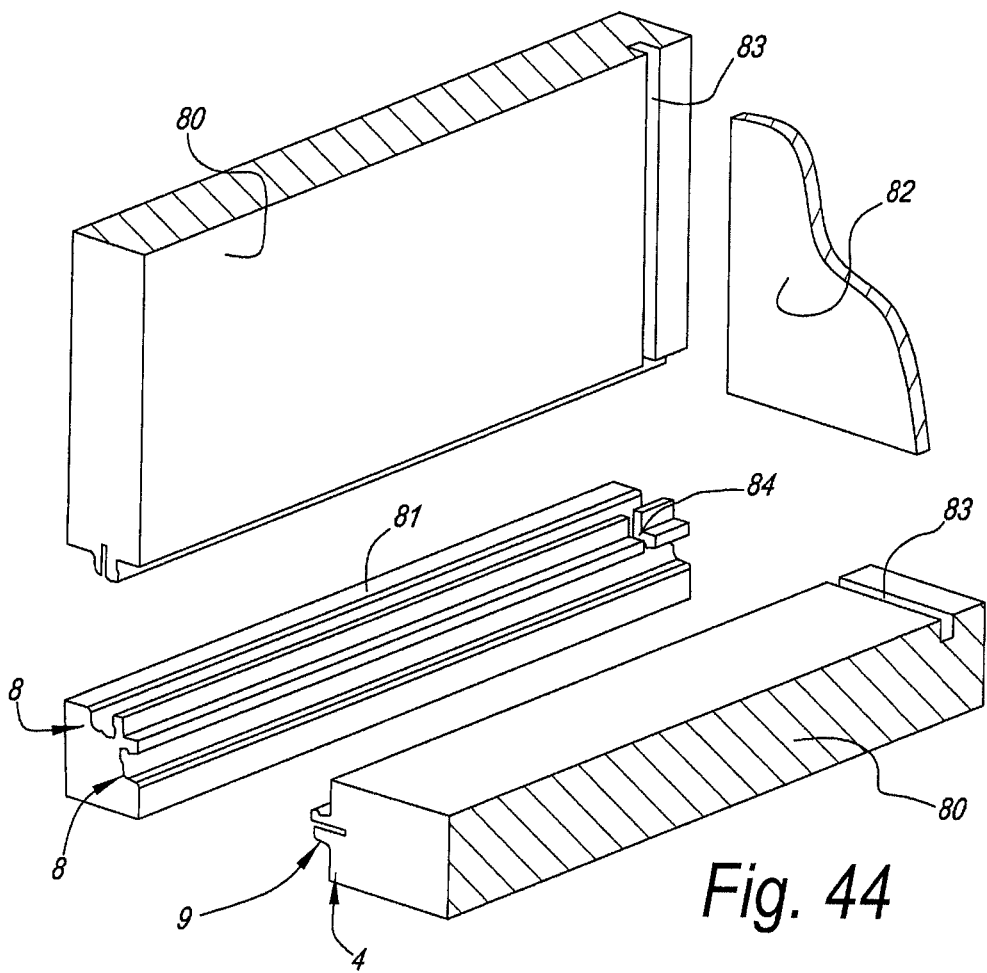
Figure 45:
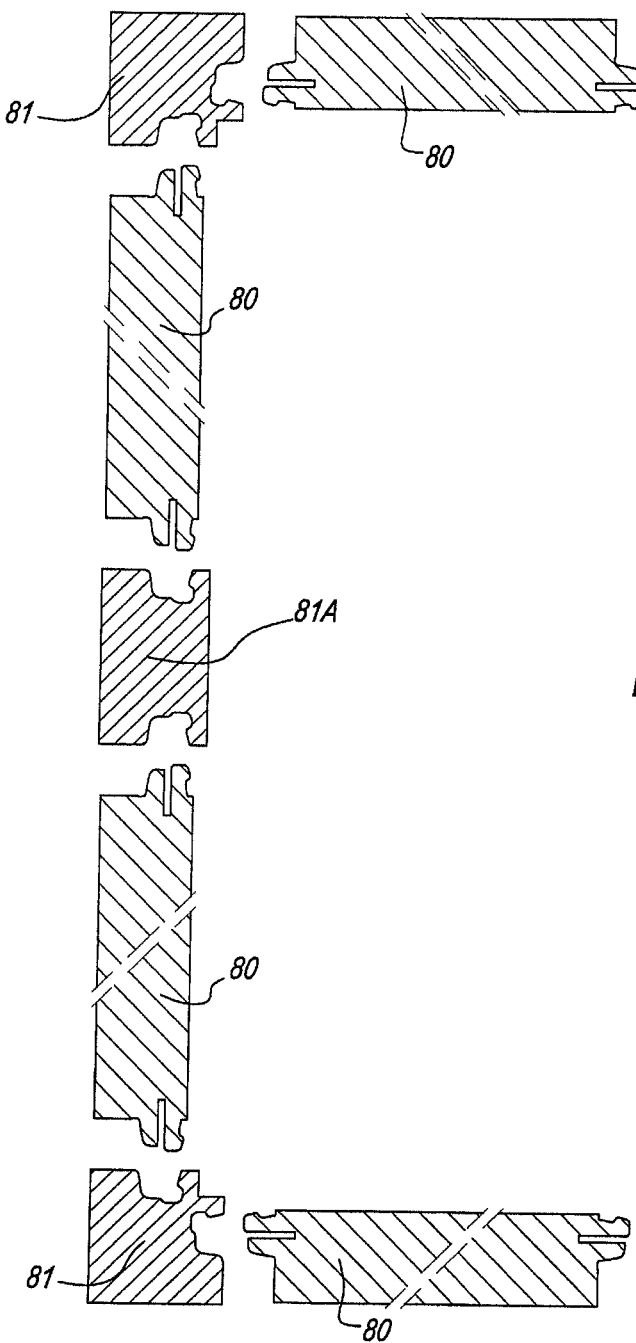
Figure 46:
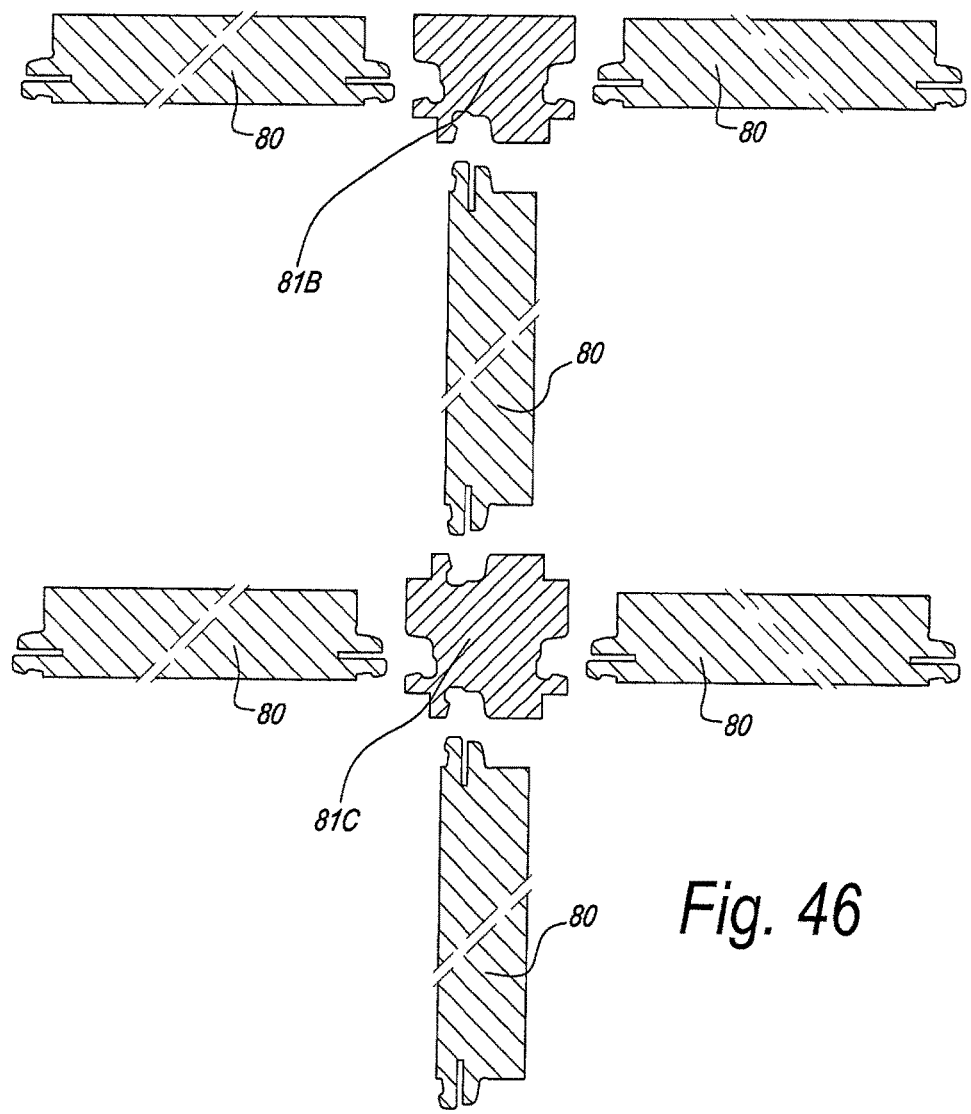
Figure 47:
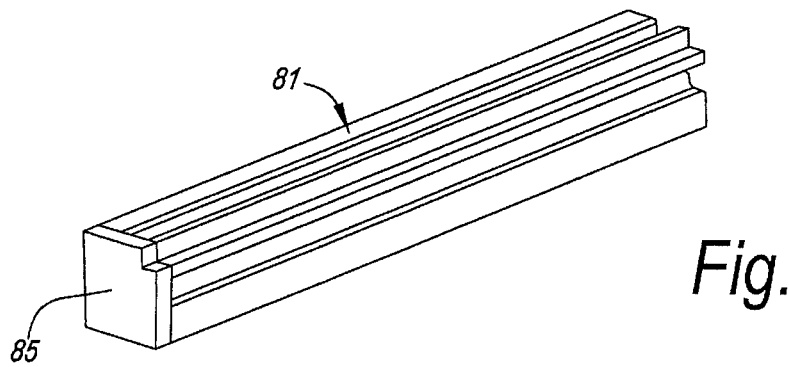
Figure 48:
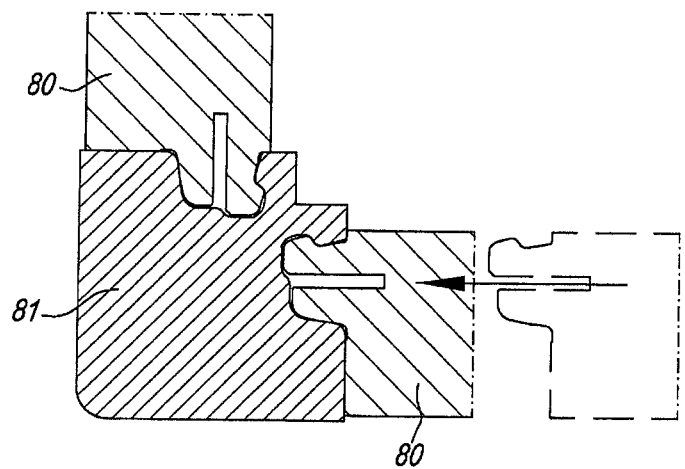
Figure 49:
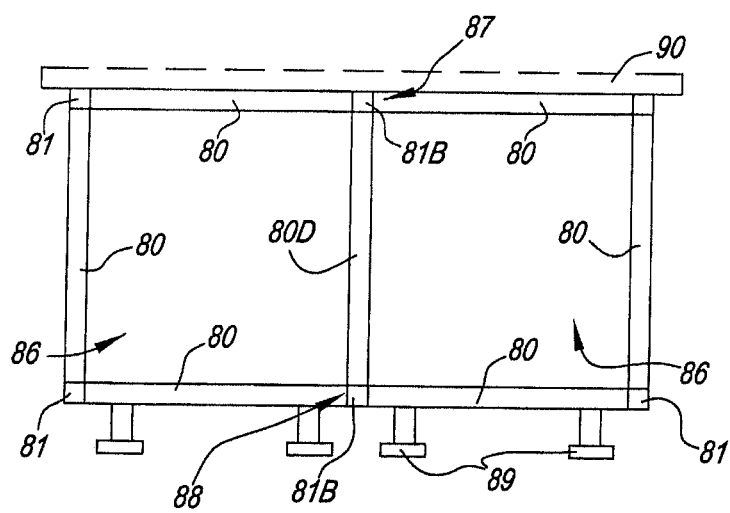
Figure 50:
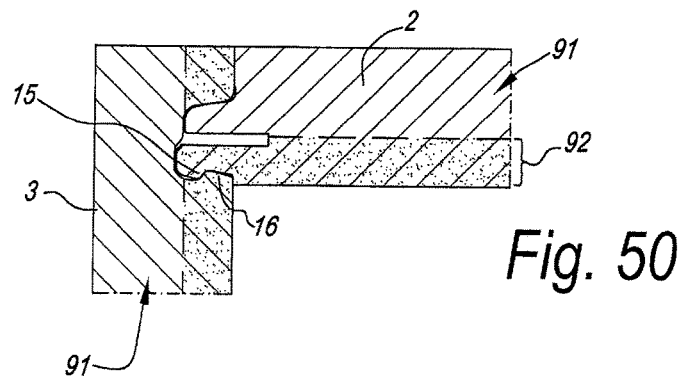
Figure 51:
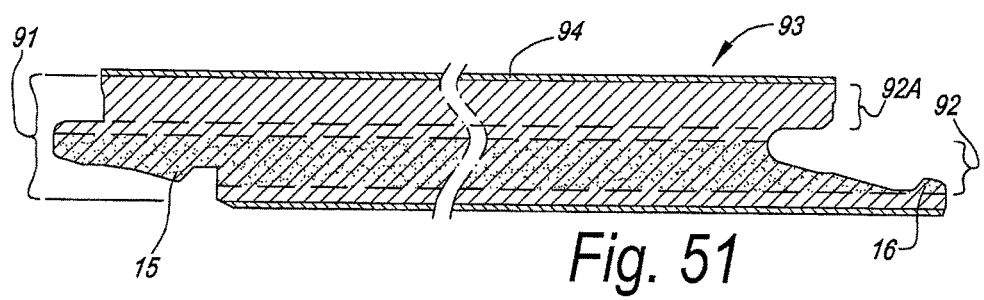
Figure 52:
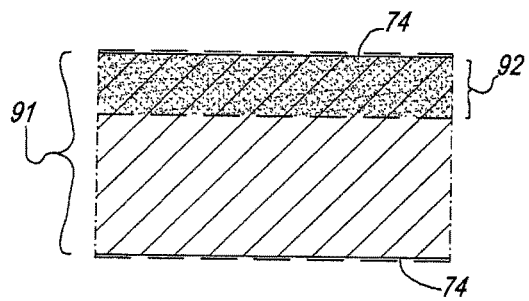
Figure 53:
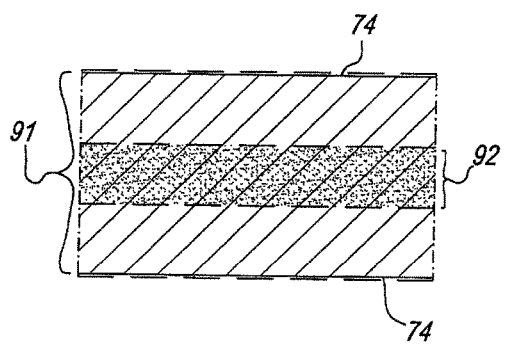
Figure 54:
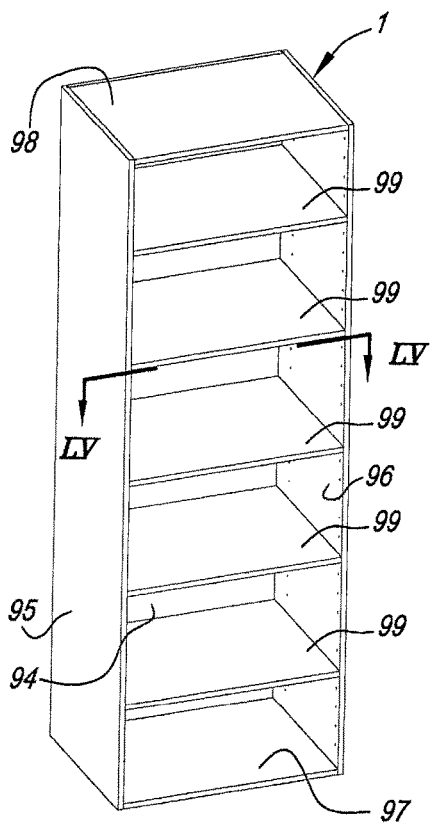
Figure 56:
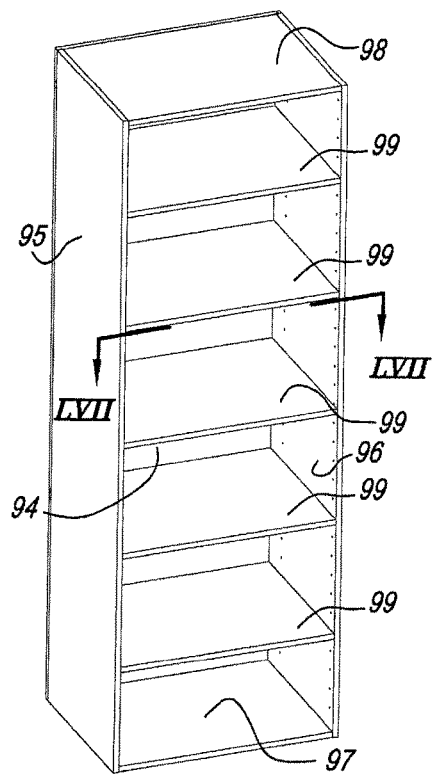
Figure 58:
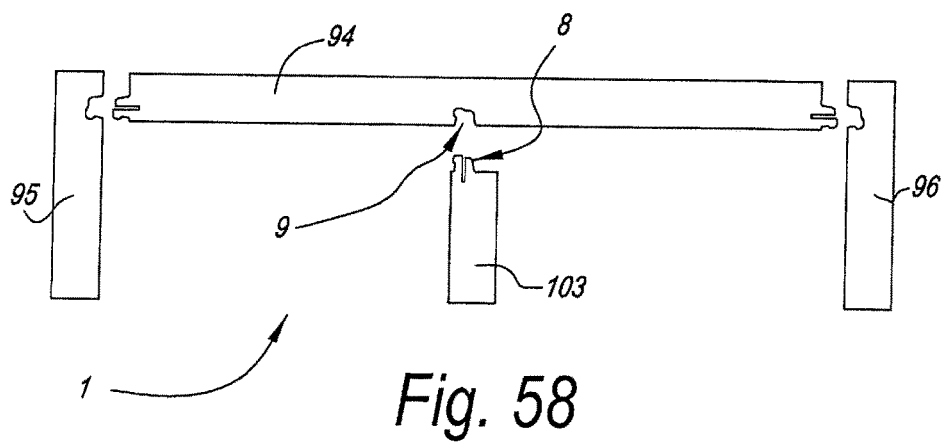
Figure 55:
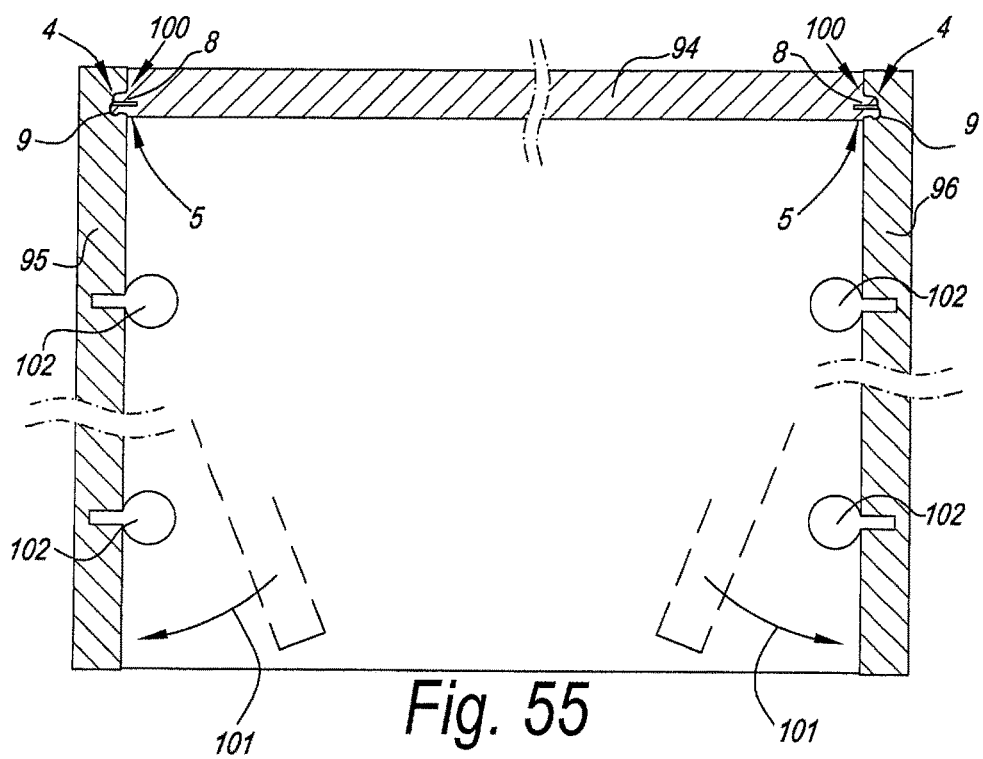
Figure 57:
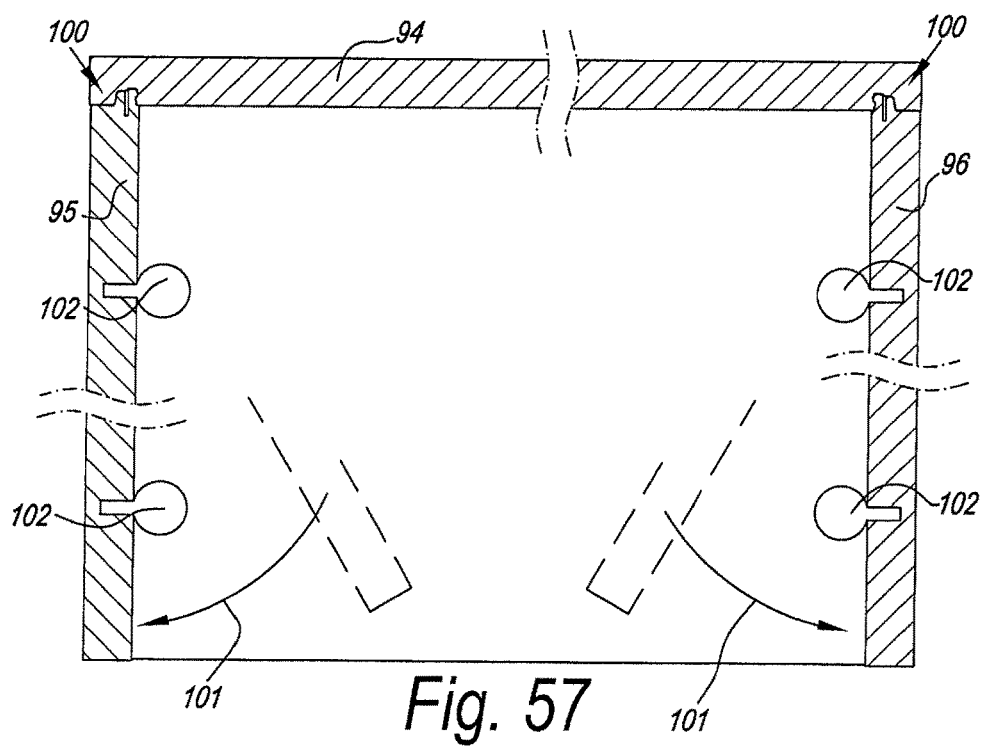
Figure 59:
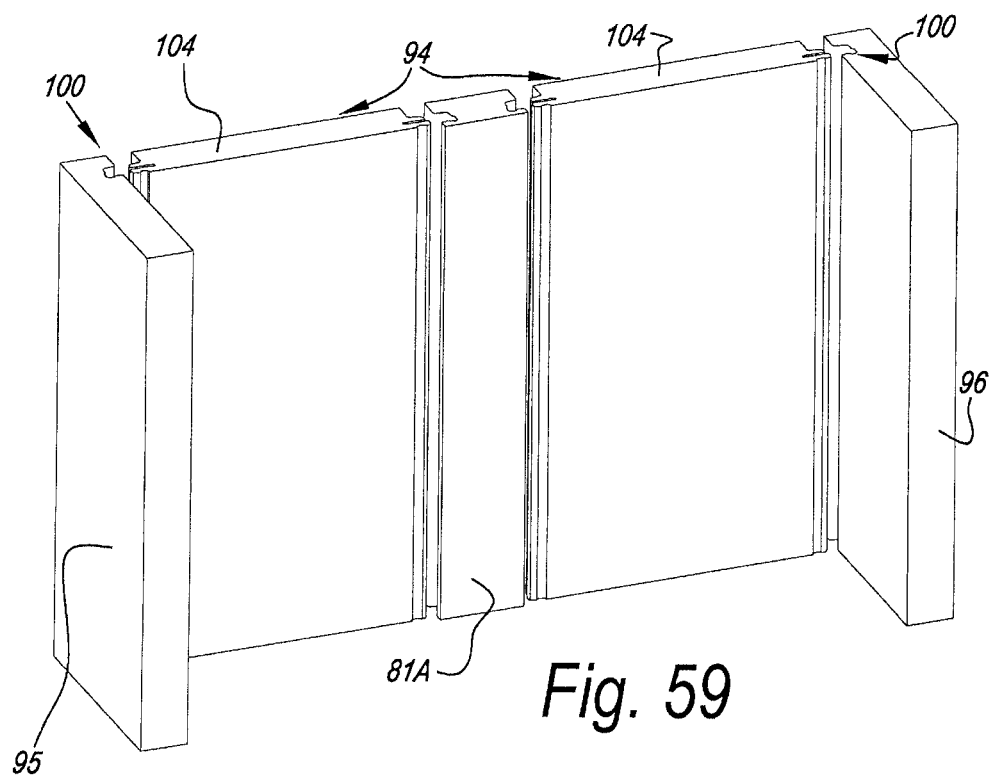
Figure 60:
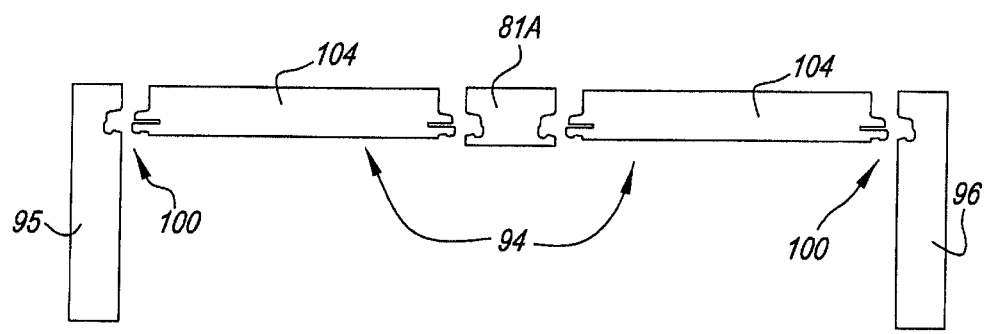
Figure 66:
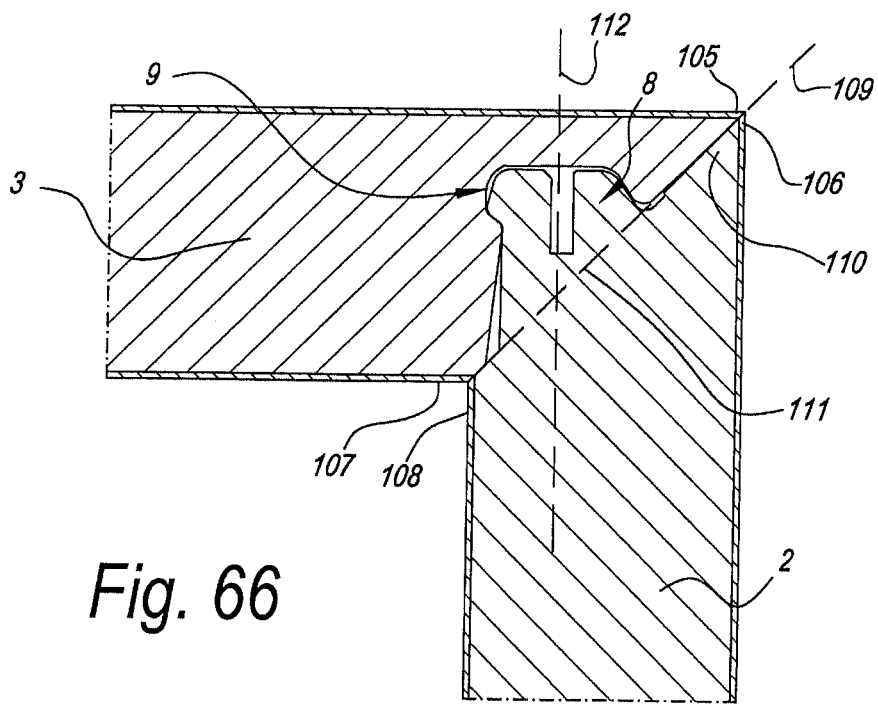
Figures 67, 69:
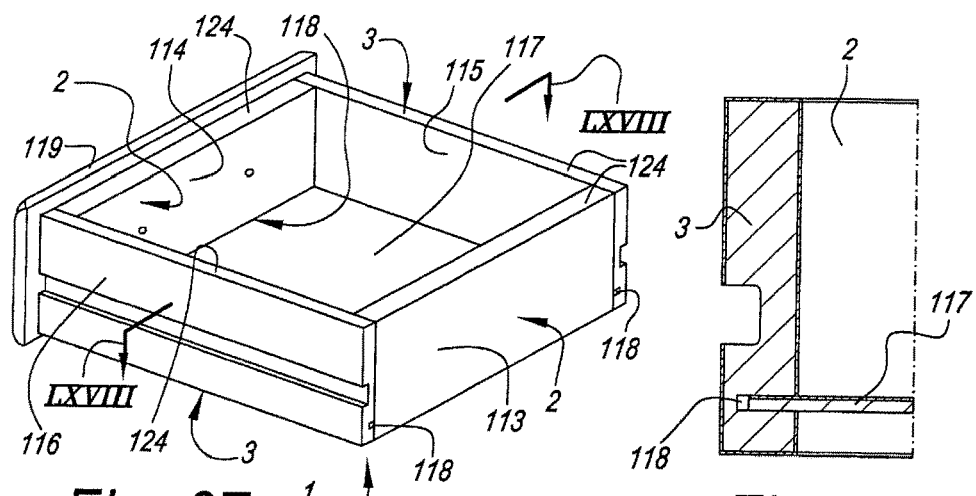
Figure 68:
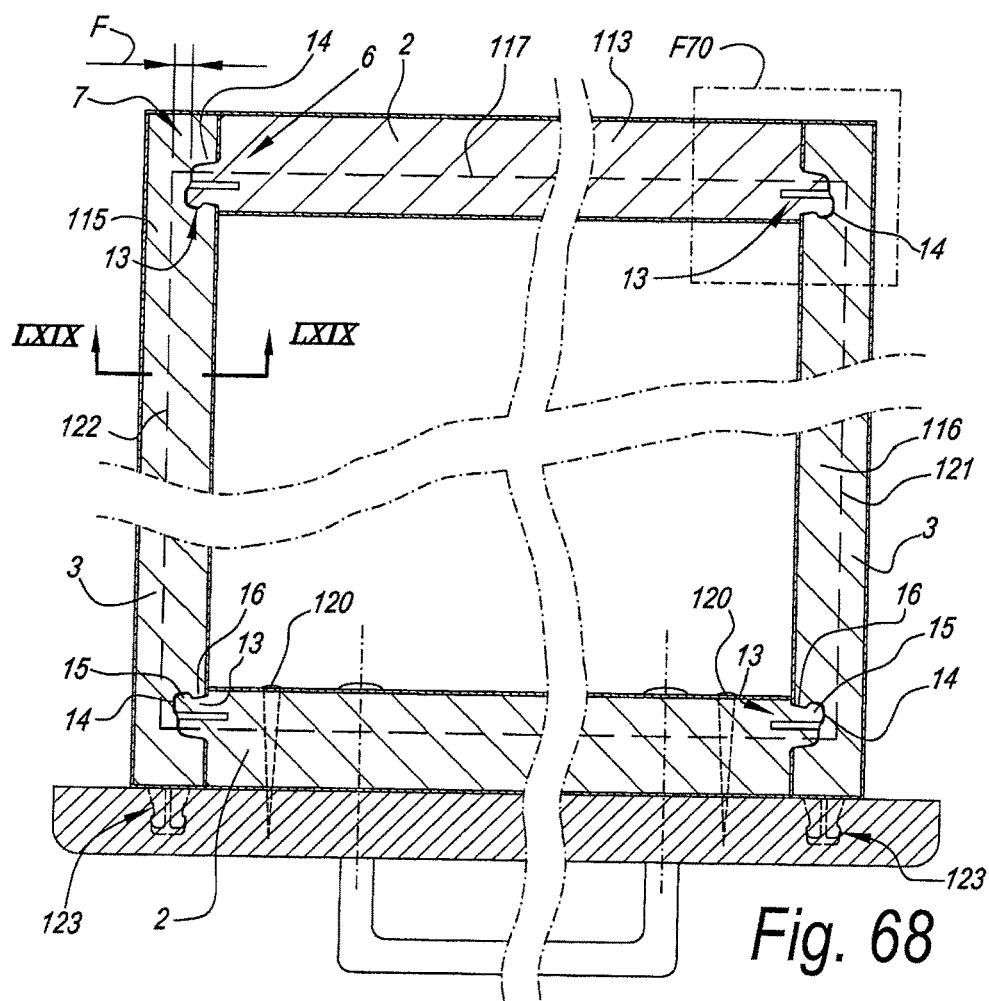
Figure 70:
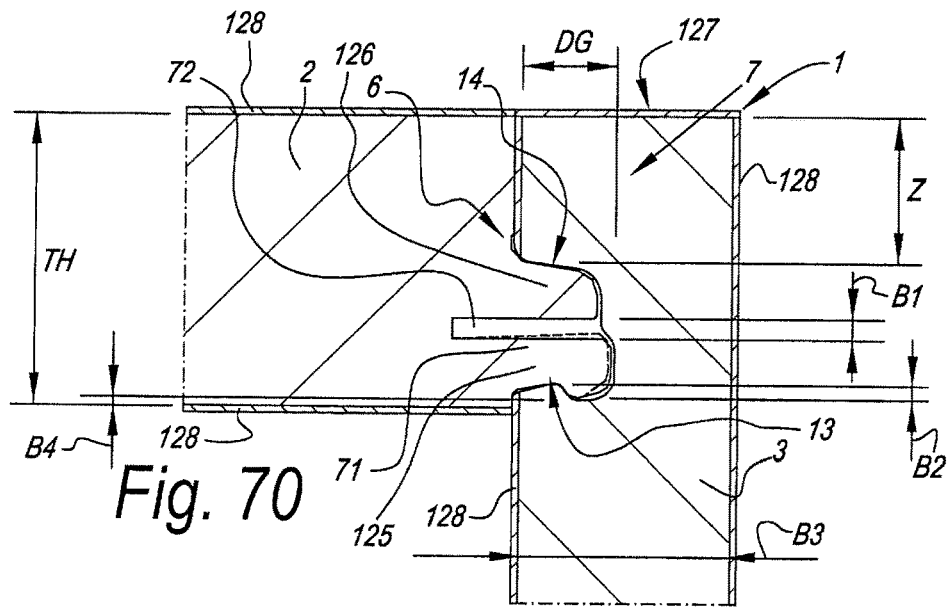
Figure 71:
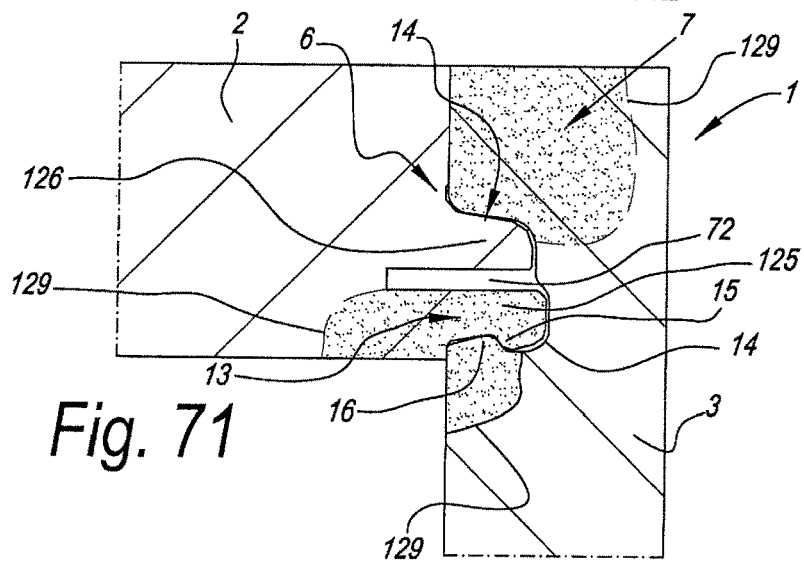
Figure 72:
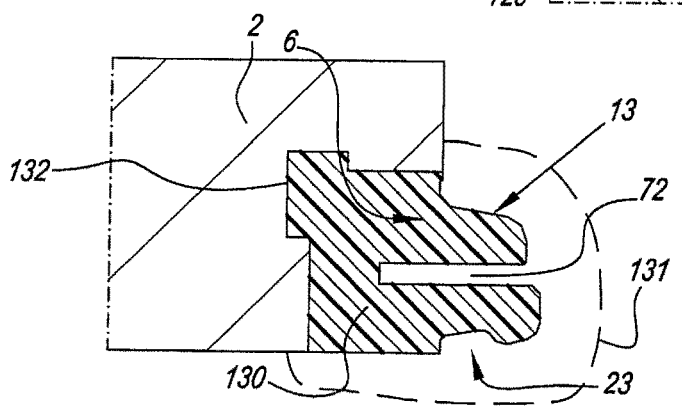

ii) FIGS. 2 and 3, at a larger scale, represent views according to arrow F2 and F3, respectively, in FIG. 1;

iii) FIGS. 4 and 5 represent sections according to lines IV-IV and V-V, respectively, in FIG. 2;

iv) FIGS. 6 and 7 represent sections according to lines VI-VI and VII-VII in FIG. 5, respectively;

v) FIGS. 8 and 9 represent sections according to lines VIII-VIII and IX-IX in FIG. 3;

vi) FIGS. 10 and 11 represent sections according to lines X-X and XI-XI in FIG. 9;

vii) FIGS. 12 and 13 represent sections according to line XII-XII in FIG. 5 and line XIII-XIII in FIG. 8, respectively;

viii) FIG. 14, in cross-section and in mounted condition, represents the composed element of FIG. 1;

ix) FIGS. 15 and 16 represent how the panel-shaped elements of the composed element can be joined;

x) FIG. 17 represents a view on said composed element, on the finished end face thereof;

xi) FIG. 18 represents a composed element according to the invention, which is made in the form of a table;

xii) FIGS. 19 and 20 represent two variants of panel-shaped parts for realizing a composed element;

xiii) FIG. 21 represents a composed element according to the invention with two panel-shaped elements coupled at an angle;

xiv) FIG. 22 in cross-section shows another composed element according to the invention;

xv) FIG. 23 at a larger scale represents the portion indicated by F23 in FIG. 22;

xvi) FIG. 24 in cross-section represents another composed element according to the invention;

xvii) FIG. 25 at a larger scale represents the portion indicated by F25 in FIG. 24;

xviii) FIG. 26 represents a front view of the composed element of FIG. 24;

xix) FIG. 27 in cross-section represents another composed element according to the invention;

xx) FIGS. 28 and 29 represent two panel-shaped elements of the composed element of FIG. 27;

xxi) FIG. 30 at a larger scale represents the portion indicated by F30 in FIG. 27;

xxii) FIGS. 31 and 32 represent two embodiments of a multi-layered board according to the invention; and xxiii) FIGS. 33 and 34 in cross section and for two positions represent a corner construction of another composed element according to the invention;

xxiv) FIGS. 35 to 37, in cross-section and for three conditions, represent a corner construction of still another composed element according to the invention;

xxv) FIGS. 38, 39 and 40 represent composed elements applying corner constructions from FIGS. 35 to 37;

xxvi) FIG. 41 represents a composed element according to the invention, wherein separate connecting pieces are applied at the corners;

xxvii) FIG. 42, at a larger scale, represents a cross-section according to line XLII-XLII in FIG. 41;

xxviii) FIG. 43 represents a connecting piece from FIG. 41 as such;

xxix) FIG. 44, in an exploded view, represents a number of component parts of a composed element similar to that of FIG. 41, but wherein a back is present, too;

xxx) FIGS. 45 and 46 illustrate composed elements in exploded view, with various embodiments of connecting pieces;

xxxi) FIG. 47 represents a variant of the connecting piece of FIG. 43;

xxxii) FIG. 48 represents a variant of the embodiment of FIG. 42;

xxxiii) FIG. 49 schematically represents another composed element according to the invention;

xxxiv) FIG. 50 represents a portion of a composed element according to the invention, in the form of a corner connection, wherein the panel-shaped elements are provided with a reinforcing layer;

xxxv) FIG. 51 represents a floor panel which, according to the invention, is provided with a reinforcing layer;

xxxvi) FIGS. 52 and 53 schematically represent another two boards, which are realized in accordance with a particular aspect of the invention;

xxxvii) FIG. 54 represents another composed element according to the invention, in the form of a piece of furniture;

xxxviii) FIG. 55 represents a cross-section according to line LV-LV in FIG. 54;

xxxix) FIG. 56 represents a variant of the embodiment of FIG. 54;

xl) FIG. 57 represents a cross-section according to line LVII-LVII in FIG. 54;

xli) FIG. 58 schematically and in exploded view represents a back and two side walls of a composed element according to the invention;

xlii) FIG. 59 in perspective view represents a variant of the embodiment of FIG. 58;

xliii) FIG. 60 represents a top view from the elements from FIG. 59;

xliv) FIGS. 61 to 65 represent various variants of the invention, respectively in a top view similar to that of FIG. 60;

xlv) FIG. 66 represents still another corner connection according to the invention;

xlvi) FIG. 67 represents another composed element according to the invention;

xlvii) FIG. 68 represents a cross-section according to line LXVIII-LXVIII in FIG. 67;

xlviii) FIG. 69 represents a cross-section according to line LXIX-LXIX in FIG. 68;

xlix) FIG. 70, at a larger scale, represents the part indicated by F70 in FIG. 68;

l) FIGS. 71 and 72 represent two variants of coupling means, which can be applied according to the invention.

DETAILED DESCRIPTION OF PREFERRED EMBODIMENTS OF THE INVENTION

FIGS. 1 to 17 represent a composed element 1, as well as the component parts thereof, which is made at least in accordance with the aforementioned first aspect.

Herein, the composed element 1 comprises two panel-shaped elements 2-3, which each have an edge zone 4-5 in which coupling means 6-7 are present in the form of a profiled part 8-9 respectively extending in the longitudinal direction of the edge zone 4-5 concerned, as well as each comprise at least one end face 10-11 extending transversely in respect to the respective edge zone 4-5, wherein said coupling means 6-7, and more particularly the profiled parts 8-9, allow that the panel-shaped elements 2-3 can be coupled together in an interlocking manner. In accordance with the first aspect of the invention, at least one of the panel-shaped elements, and in this example both panel-shaped elements 2-3, comprises means 12 which hide from view at least a portion of the profiled parts 8-9 at the location of the end face 10, 11, respectively.

The coupling means 6-7 are of such kind that the panel-shaped elements 2-3, as in FIG. 1, can be presented opposite to each other and can be joined laterally into each other, as will be explained in the following.

As represented in the example, the coupling means 6-7 preferably comprise a tongue 13 and a groove 14, as well as locking elements 15-16, which, in a normal mutual usage position of the panel-shaped elements 2-3, counteract the drifting apart of tongue and groove, as can be seen in FIG. 14, which shows the coupled condition.

A particular characteristic of the embodiment of FIGS. 1 to 17 consists in that the groove 14 is bordered by lips 17-18, one lip 17 of which protrudes outwardly of the actual edge 19 of the panel-shaped element 3 concerned. Further, a recess 20 is provided at the panel-shaped element 2, which recess, in the coupled condition, offers room for the protruding portion of the lip 17 and, as is evident from FIG. 15, allows a free turning movement of this protruding portion.

In the example of the figures, the aforementioned means 12 consist in that at the end faces 10-11 a strip of covering material, 21-22, respectively, is provided, which next to said edge zones shows a contour course 23, 24, respectively, which differs from the contour course 25, 26, respectively, of said profiled parts, which contour courses all are represented in FIG. 17. As represented herein, the contour courses 23 and 24 are rectilinear, as a consequence of which a simple finishing is possible.

Further, the strips of covering material 21-22 have a contour course at the height of said edge zones which extends between the corner edges 27-28 of each respective side edge, such that the covering material does not protrude at its corners, which reduces the risk of being damaged, for example, by breaking off.

In the represented example, the extremities of the strip-shaped covering material 21-22 have a rectangular end contour, more particular, as if the panel-shaped elements fit against each other with straight sides, which thus are formed by said straight contour courses 23 and 24, as well as by the contour lines 29, 30, 31 and 32, which are determined by the corner edges 33, 34, 35 and 36 of the panel-shaped elements, where the large surfaces thereof are ending.

The protruding parts 37-38 of the profiled parts at the respective edge zones are performed up to a distance A from said end face only, or, in other words, are removed up to a distance A.

The strip of covering material may consist of any suitable material. In a practical embodiment, preferably use shall be made of an adhered edge strip, more particularly a laminate strip or an ABS strip (acrylonitrile butadiene styrene), which are generally known for use as adhered edge strips. A laminate strip offers the advantage that it is easy to make in the same color and/or with the same pattern as the laminate with which possibly the large surfaces of the panel-shaped elements 2-3 are covered. An ABS strip, however, offers the advantage that it is sturdier and will not be damaged as easily.

Such adherable edge strip can be applied in a known manner, which usually is performed by rolling such strip, by the intermediary of glue, against the end face to be covered and cutting it off automatically at the end, for example, with a severing cutter. It is noted that such severing cutter 39 simultaneously also may serve for removing the protruding parts 37-38, as aforementioned, up to a distance A from the end face concerned, as a result of which no separate treatment is required to this aim. This treatment is represented schematically in FIGS. 7 and 11.

It is noted that cutting off by means of such severing cutter 39 possibly can also be realized at a very slight angle, for example, of 2 degrees, such that this severing cutter, at the location where it penetrates deeper into the panel, is directed somewhat away from the panel. By this, it is avoided that the severing cutter 39, as a result of possible tolerance deviations, would cut into the flat side of the panel-shaped element concerned.

Preferably, the panel-shaped elements possess a covering at one or both sides. Such covering may be of any kind and, for example, may be performed in the form of a laminate, for example, of the HPL type or the DPL type. Also, other coverings come into consideration, such as, for example, a foil, a lacquer layer, which as such may or may not be composed of multiple layers. In the example of FIGS. 1 to 17, thin laminate coverings 40-41 are represented.

It is noted that in the case of laminate coverings, in the manufacture of the panel-shaped elements preferably from the beginning one starts from a larger board which already is laminated on one or both sides, from which then the smaller panel-shaped elements 2-3 are realized.

Depending on the design of the coupling means 6-7, the panel-shaped elements 2-3 can be joined together in one or more well-determined ways and possibly also taken apart again. In the embodiment of FIGS. 1 to 17, the coupling means 6-7 allow joining the panel-shaped elements 2 and 3 together as desired, with a turning movement as well as with a translation and snap movement. The turning movement W is represented in FIG. 15, whereas the translation movement T is illustrated in FIG. 16. In this latter, the lip 17 briefly bends out in order to provide for a snap-effect.

Generally, it is noted that the coupling means 2-3 can be performed such, more particularly, have an overlapping design on certain locations, that the panel-shaped elements 2 and 3 are permanently drawn towards each other in the mounted condition, which term also is called "pretension" and as such is known from the sector of floor panels and is described, for example, in the document WO 97/47834.

FIGS. 1 to 17 represent an embodiment wherein the panel-shaped elements 2-3 in connected condition are situated in the same plane. However, it is clear that the invention is not restricted to such embodiments, but is also applicable to embodiments wherein the panel-shaped elements are connected at an angle, as will become clear from the further-described examples.

It is clear that the coupling means 6-7 also can be provided at two or more sides of a panel-shaped element. When, for example, panel-shaped elements are applied having complementary coupling means at two opposite edges, for example, the above-described coupling means 6 and 7, it is clear that successively a plurality of these elements can be coupled to each other. An example of such coupled panel-shaped elements 42 is represented in FIG. 18, wherein these, together with two end elements 43, form a tabletop 44. The end elements 43 exclusively have coupling means at the longitudinal edges with which they border the elements 42. At the end faces the elements 42-43 in accordance with the invention are provided with a strip of covering material 45. Also the outwardly-directed longitudinal edges 46 are provided with such covering material. The represented table offers the advantage that the tabletop is easy to handle and transport in parts. Also, such tabletop can easily be enlarged or shortened by applying more or less elements 42. Hereby, the invention is particularly suitable for composing tables of a large format, such as long party tables or sports tables, for example, for playing ping-pong. Such tables thus also offer the advantage that they are easy to store when not in use. It is clear that suitable support structures 48 and legs 49 are provided.

FIG. 19 represents a variant of the invention, wherein said means 12 consist in that the protruding parts 37-38, wherein solely the panel-shaped element 3 with the protruding part 38 is represented here, are shortened over a distance, whereas the recessed portions 50 associated with the profiled parts are filled up at the height of the end face, in this case, 11, by means of a filling material 51, as a result of which the respective panel-shaped elements, in this case, the represented element 3, each obtain a rectilinear corner contour.

The filling material 51 may consist of a filling compound, which is finished flush with the adjoining sides, or of an insertion piece which is provided in the respective recessed portion 50. When the filling material 51, in respect to its appearance, is attuned to the basic material of the respective panel-shaped elements, then a further covering of the end face 11 possibly may be omitted. However, when herein use is made of a strip-shaped covering material, then the filling material forms a support for this stroke, as then at this location, too, gluing may be provided. The use of such filling material 51 also offers the advantage that this technique may be applied for lacquered furniture, for example, with lacquered MDF/HDF cupboards.

FIG. 20 schematically represents a variant, wherein the recessed portion of the profile is enlarged to a larger recess 52, for example, by means of a milling cutter 53, which is moved over the distance A through the material of the panel-shaped element 3. This technique offers the advantage that the recess can be realized with a rectangular cross-section, which enables performing the insertion piece 51 in a simple manner as a small rectangular block which can be glued into the recess 52. By means of the milling treatment, also the respective protruding parts, in this case, the protruding part 38, can be removed up to the distance A.

It is clear that the same techniques may be applied for the other panel-shaped element 2.

FIG. 21 represents a composed element 1, or at least a portion thereof, which is at least composed of two panel-shaped elements 2 and 3, which are coupled to each other at an angle, wherein the whole forms an example of said second as well as said third aspect of the invention. Herein, the panel-shaped elements 2 and 3 are composed in that they are coupled to each other, in this case, turned into each other, by means of profiled parts 8-9 in the form of a tongue 13 and a groove 14. The tongue 13 is situated at an edge zone 4 at a lateral end face of the panel-shaped element 2. The groove 14 is situated at one of the large surfaces of the panel-shaped element 3, however, in an edge zone 5 thereof, by which thus a zone has to be understood which is situated in the proximity of an edge. In the example, this relates to the zone extending in height over the distance E. In accordance with the second aspect of the invention, the panel-shaped elements 2-3 show end faces 10-11 extending perpendicular in respect to the respective edge zones 4-5; said profiled parts allowing that the panel-shaped elements can be coupled to each other in an interlocking manner; the panel-shaped elements 2-3 are provided on the end face with a covering in the form of a strip of covering material 21, 22, respectively; and the profiled parts are performed continuously through the aforementioned strips of covering material 21-22.

In accordance with the third aspect, in the embodiment of FIG. 21 also an additional element 53 is provided, more particularly a front panel, in this case, a door, for example a cupboard door, which, at least in a usage condition G, which in this case is the closed condition of the door, is situated in front of the contours, here generally indicated by reference 54, of the coupling means and substantially covers them and thereby hides them from view.

It is noted that the above-described panel-shaped elements according to the invention can be composed in various manners. According to a first possibility, for such panel-shaped element, a simple board of the same or substantially the same material is applied, for example, a simple MDF board (Medium Density Fiberboard) or HDF board (High Density Fiberboard), or a classical particle board, possibly with finer wood particles at the exterior surfaces. By a simple board is meant that only one essential structural material layer is applied, which does not exclude that other thin layers, such as coverings, may be present. As an alternative, the panel-shaped elements consist of a multi-layered board and then preferably will be realized in accordance with said fourth aspect of the invention.

In FIG. 14, a variant is shown by means of the dashed line 55, wherein the panel-shaped elements 2-3 consist of a board formed of at least two structural material layers, a first material layer 56 and a second material layer 57, respectively.

As discussed in the introduction, the multi-layered board, of which the panel-shaped elements consist, may be composed in various ways, amongst which, amongst others, the following important possibilities:
- the first material layer 56 is MDF (Medium Density Fiberboard) or HDF (High Density Fiberboard);
- the second material layer 57 is particle board;
- the second material layer 57 is a light-weight wood-based board, for example, particle board, in which synthetic foam material is incorporated;
- the first material layer 56 has a smaller thickness than the second material layer 57;
- the first material layer 56 has a thickness which is smaller than 0.7 times the thickness of the second material layer 57;
- the multi-layered board consists, for at least 90% of its total thickness, of said first material layer 56 and said second material layer 57;
- the first material layer 56 and the second material 57 layer consist of separate boards which are adhered to each other, more particularly glued to each other;
- the first material layer 56 and second material layer 57 form part of a unitary pressed structure, wherein the first material layer 56 preferably is based on wood fibers and the second material layer 57 on wood particles.

As represented in FIG. 14, the coupling means 6-7, or at least the locking elements 15-16, are situated in the first material layer 56.

FIG. 22 represents a composed element 1 according to the invention, which is composed of four panel-shaped elements 58, 59, 60 and 61, wherein this relates, for example, to a cupboard, more particularly a suspended cupboard, wherein the panel-shaped elements 58-60 form side walls, whereas the panel-shaped elements 59 and 61 form a top wall and bottom wall, respectively. The panel-shaped elements 58 and 60 substantially consist of a board material with only one structural material layer, preferably MDF or HDF. The panel-shaped elements 59 and 61 are composed of a composed board with two material layers 56 and 57, in this case, two board materials glued against each other. In this case, the material layer 56 consists of an MDF or HDF board, whereas the material layer 57 consists of particle board, wherein both material layers are glued against each other. As can be seen in the enlarged view of FIG. 23, the coupling means 6-7 preferably are performed exclusively in MDF or HDF, whereas the particle board material exclusively serves for creating a larger thickness at a lower cost.

FIGS. 24 and 25 represent a variant, wherein the first material layer 56 of the panel-shaped elements 59 and 61 is situated against the interior sides of the composed element 1, with the advantage that the coupling means formed therein become situated at a pronounced distance X from the extremities 62, thereby considerably reducing the risk of tearing off in the corners when the piece of furniture is subjected to a heavy load.

FIG. 26 represents that the end faces of the composed element 1 represented in FIG. 24 also, in accordance with the first aspect of the invention, may be provided with a covering formed by a strip-shaped covering material 63-64-65-66, by which the actual profiled parts of the coupling means 6-7 are hidden from view. An important aspect consists in that one may work with simple rectangular strips, whereas all four corners 67 of each strip in fact are connected to underlying board material and thus are attached thereto. It is clear that the panel-shaped elements 58-59-60-61, apart from the covering formed by the strip-shaped covering material 63-64-65-66, can be provided with a covering on other sides, too.

FIG. 27 represents a variant, wherein the panel-shaped elements 58, 59, 60 and 61 each are composed of two structural material layers 56 and 57, in this case, a first structural material layer 56 of MDF or HDF board and a second structural material layer 57 of particle board. Further, the whole is provided with the necessary laminate coverings 68. On the end faces of the whole, strips of covering material having a simple rectangular shape may be provided, analogous to FIG. 26, wherein it is clear that it is intended to apply the laminate coverings 68 and the strips of covering material during the manufacture of the panel-shaped elements, thus, prior to joining the panel-shaped elements.

It is noted that the construction represented in FIG. 27 allows composing the element 1 by turning the respective panel-shaped elements into each other at the location of three corners of the composed element 1, whereas exclusively the fourth corner has to be effected by means of a snap-connection. As a consequence, one may proceed as follows. First, the panel-shaped element 59 is connected to the panel-shaped element 58 by means of a turning movement W1. Then, the panel-shaped element 60 is coupled to the panel-shaped element 59 by means of a turning movement W2, wherein this element 60 at the same time is forced somewhat further up into the position P represented in dashed line, by which sufficient space is created for then coupling the panel-shaped element 61 to the panel-shaped element 58 by means of a turning movement W3. Finally, the element 1 then can be obtained in the completely assembled form by connecting the panel-shaped element 60 to the panel-shaped element 61 by means of a snap movement S. It is clear that in this manner, the panel-shaped elements easily can be coupled to each other by a user; for example, for composing a cupboard or the like in this manner.

FIGS. 28 and 29 represent that essentially only two designs need to be used for the panel-shaped elements to be applied.

For the coupling means, in this case, too, respectively a tongue 13 and a groove 14, as well as locking elements 15 and 16 are used.

As becomes clear from FIGS. 28 and 29, as well as from the enlarged view in FIG. 30, in this case coupling means are used showing the following features:

said locking elements 15-16 are only present at one side 69 of the tongue 13, whereas the other side 70 thus is free from locking elements;

the locking means consist of at least one locking part 15 at the tongue 13 and at least one cooperating-therewith locking part 16 in the groove 14, wherein the locking element 15 is provided on the tongue 13 at an elastically bendable part 71 of the tongue, which at the same time forms a side 69 of the tongue;

in distal direction, said elastically bendable part 71 of the tongue protrudes farther than the remainder of the tongue;

said elastic part 71 is separated from the remainder of the tongue 13 by means of a slot 72;

said locking elements are situated on only one side of the tongue, wherein this is the side 69 of the tongue which is situated closest to the inner side of the corner 73.

It is noted that coupling means with one or more of the above-listed characteristics may also be applied with panel-shaped elements which can be coupled to each other in the same plane, as well as with panel-shaped elements which as such are composed differently from the represented structure composed of two layers.

The embodiment of FIGS. 27 to 30 also illustrates that, when the panel-shaped elements consist of at least two structural material layers, a first material layer and a second material layer, respectively, then this composed element further may show any of the following characteristics:

the tongue has a side 69 which is situated in the first material layer 56, and an opposite side 70 which is situated in the second material layer 57;

the material of the first material layer 56 has a finer structure than the material of the second material layer 57, whereas at least one of said locking elements 15-16 is situated in the first material layer and more particularly is made in one piece therein;

the material layer of the first material layer 56 has a finer structure than the material of the second material layer 47, whereas the locking elements, both at the tongue and at the groove, comprise a locking element 15, 16, respectively, which both are situated in the first material layer of the respective panel-shaped element.

FIGS. 21 to 27 and 30 illustrate that according to the invention the panel-shaped elements adjoin each other in a flush manner at the exterior side of a corner formed thereby, such that the respective outer corner is straight and free from protruding panel portions.

FIG. 30 also illustrates once again that the coupling means, which are provided in a large flat side of a panel-shaped element, due to the specific construction can be realized at a proper distance from the edge. In other words, the groove in FIG. 30 is situated at a considerable distance from the upper edge of the panel-shaped element 57. In connection therewith, it is preferred that the distance Z, which is the distance from the exterior side up to the tongue, is more than ⅓ of the thickness TH of the panel-shaped elements.

As discussed in the introduction, the invention also relates to a multi-layered board as such, with the characteristic that it consists of at least two material layers, a first material layer and a second material layer, respectively, which both are performed as a wood composite and wherein the material of the first material layer shows a finer structure than the material of the second material layer. FIGS. 31 and 32 illustrate by means of two examples that various variants are possible.

For example, FIG. 31 represents a construction where the first material layer 56 is formed on the basis of wood fiber material and, for example, consists of MDF board or HDF board, whereas the second layer 57 is formed on the basis of wood particles and more particularly consists of particle board, wherein both boards are glued one onto the other. Further, the multi-layered board may be provided with a laminate covering 74 on one or both sides. Also, other layers may be provided. For example, one may start from two boards which each are provided with melamine on both sides, an MDF or HDF board and a particle board, respectively, which are glued to each other one upon the other.

FIG. 32 schematically represents a variant, wherein the first material layer 56 and the second material layer 57 form part of a unitary pressed structure. Such structure may be realized by forming, in a production process of particle board, not only a mat of particles to be pressed, however, in combination therewith also incorporating a layer of fibers into the mat, preferably at one side of the mat, and then consolidating the whole in a press. The whole may or may not be provided with a laminate covering 74.

FIGS. 33 and 34 represent still another composed element 1 illustrating a particular aspect of the invention. The composed element 1, only a portion of which is represented, herein forms a wall or furniture element and shows the particular characteristic that coupling means 6-7 are applied, which utilize a locking element, in this case 16, which is performed as an insertion piece provided in an edge in one of the panel-shaped elements, in this case, the panel-shaped element 3. More specifically, this insertion piece consists of a strip, which is provided with a movable locking portion 75, which latter can cooperate with a locking element 15 formed at the other panel-shaped element 2.

More specifically, this insertion piece is formed of a strip which, viewed in cross-section, is made of materials, preferably synthetic material, with different material characteristics. This offers the advantage that different characteristics may be imparted to the component parts thereof, depending on their function. More particularly, certain parts may be made suppler than others.

In the example, the strip, apart from the already mentioned locking portion 75, also is composed of an attachment portion 76, and a hinge portion 77 situated in between them. The locking portion 75 and the attachment portion 76 are made of a harder and more rigid synthetic material than the hinge portion 77, at the one hand, for having the locking portion 75 in coupled condition offer a good locking, and providing the attachment portion in a stable manner into a recess 78 provided for this purpose, and, on the other hand, for having the locking portion move in a supple manner by means of the hinge portion 77. It is noted that this hinge portion 77 does not only possess the function of an hinge, however, also functions as an elastic matter pushing the locking portion 75, in rest position, with its free extremity outward, up into the condition of FIG. 33.

In the most preferred embodiment, the insertion piece will be made from a strip formed by means of coextrusion.

The panel-shaped elements 1 and 2 can be coupled simply by, starting from the position in FIG. 33, pressing them into each other with their tongue 13 and groove 14, wherein the locking portion 75 then first is turned to the side in order to then be moved outward again and take place behind the locking element 15, wherein then the locked condition of FIG. 34 is obtained.

It is noted that possibly a recess 79 may be provided in the longitudinal direction of the profile concerned, which recess may be helpful during the possible uncoupling of the panel-shaped elements 2 and 3. Such recess allows pushing, in coupled condition, a small pin into it, which is sufficiently thick for pushing the locking portion 75 elastically inward, which undoes the locking. If the front side of the composed element 1 is provided with a finish, for example, by means of an adhered edge strip, care may be taken that the recess 79 is accessible exclusively along the back side of the composed element 1, for example, the back side of a cupboard, such that during normal use the recess is not visible.

Such coupling with an insertion piece is particularly suitable for being applied in corner connections for furniture, on the one hand, because a stable connection can be realized therewith, and, on the other hand, because during joining, the tongue simply can be pressed into the groove without exerting torsion forces or the like.

It is noted that such composed element 1 may possess still other components than the respective panel-shaped elements alone. Amongst these, there may also be components which reinforce the construction formed by the panel-shaped elements, and more particularly bring it into a rigid condition. In the case of, for example, a four-cornered construction, such as a small cupboard or the like, for example, as depicted in FIGS. 22, 24, 27 and 33-34, to this aim a rectangular back may be provided between the panel-shaped elements. This back simply may consist of a board which is provided between the panel-shaped elements, for example, during the joining thereof, and which takes place in a groove extending completely along the circumference.

It is evident that other components consist, for example, of shelves, intermediate posts, doors and the like, at least in the case of cupboards.

From the board according to the eleventh aspect of the invention, no specific embodiment is represented in the figures, as the construction thereof is sufficiently clear from the embodiments described in the introduction. However, FIG. 32 may be an example thereof, if the material layers 56 and 57 respectively were made of materials as is described in respect to the eleventh aspect.

FIGS. 35 to 37, in cross-section and for three conditions, represent a corner construction of still another composed element according to the invention, which, amongst others, meets the fifth aspect of the invention. The coupling means 6-7 and more particularly the tongue 13 and groove 14 and the locking elements 15 and 16 are made in one piece in the panel-shaped elements 2-3, for example, in the form of profiled parts 8 and 9 formed thereon by means of milling treatments.

The tongue 13 is situated at the outer end of the panel-shaped element 2, whereas the groove 14 is situated in the side wall of the panel-shaped element 3. Such arrangement and configuration offers sturdy coupling means when the panel-shaped elements consist of board material which is formed of a composite pressed to boards.

This embodiment illustrates that the groove 72 can extend deeper than up to the plane where the panel-shaped elements 2-3 adjoin each other, which is beneficial for the elasticity in the tongue.

The panel-shaped elements 2-3 of FIGS. 35-37 preferably consist of MDF or HDF.

FIGS. 38, 39 and 40 represent a number of composed elements, more particularly furniture elements, which apply corner constructions as shown in FIGS. 35 to 37.

FIG. 38 shows an arrangement wherein the horizontal panel-shaped elements 2 are provided between the vertical panel-shaped elements 3, whereas FIG. 39 represents a variant, wherein the horizontal panel-shaped elements 3 are provided on top, at the bottom, respectively, against the vertical panel-shaped elements 2. Depending on the application, the one or the other solution may be chosen. For example, the embodiment of FIG. 38 is suitable for hanging cupboards, where it is desired that the horizontal panel-shaped elements 2 at the side edges are not visible. The embodiment of FIG. 39 in its turn then is more suitable for standing cupboards, wherein the couplings with heavy loads from the top downward only can be pressed tighter into each other and the risk of tearing-off of coupling parts is excluded.

FIG. 40 illustrates that at the same edge zone of a panel-shaped element 3 a plurality of grooves 14 may be present, which allow a coupling in T-connection or crosswise connection of several panel-shaped elements 2-3.

FIGS. 41 to 43 relate to a composed element 1, in this case, a piece of furniture, which is realized in accordance with the twelfth aspect of the invention. This composed element 1 does comprise panel-shaped elements 80, which mutually are at an angle, as well as connecting pieces 81, which respectively cooperate with the two adjacent panel-shaped elements. At least one of the panel-shaped elements 80, and in this case even each of the panel-shaped elements 80, comprises edge zones 4 at which coupling means 6 are present in the form of a profiled part 8 extending in the longitudinal direction of the respective edge zone, whereas the connecting pieces 81 comprise at least one, and in this case respectively two, profiled parts 9 extending in the longitudinal direction thereof, in such a manner that the profiled parts 8 and 9 allow that the panel-shaped elements 80 and the connecting pieces 81 can be joined laterally into each other in an interlocking manner and in this manner the panel-shaped elements 80 can be coupled to each other by the intermediary of the connecting pieces 81.

The profiled parts 8 and 9 preferably are performed in the form of a tongue 13 and a groove 14. Preferably, a tongue 13 and groove 14 are applied which show one or more of the characteristics which are described in the introduction or in respect to the other embodiments. In particular the use of a split tongue 13, as described by means of FIGS. 35 to 37, is useful. Also, preferably profiled parts are applied which allow at least that the panel-shaped elements 80 can be provided in the connecting pieces by means of snap action, and still better can be realized such that they can be joined into each other by snapping as well as turning.

FIG. 43 clearly shows that the connecting pieces 81 can be made as laths.

Other possible characteristics of such composed element 1 making use of one or more connecting pieces 81, are described in the introduction and are not repeated here.

FIG. 44 illustrates how such composed element can be provided with a back part 82. For this purpose, such back part 82 can be provided in seats 83, more particularly grooves, in the panel-shaped elements 80. Possibly, also seats 84 can be provided in the connecting pieces 81. After assembly, the back part 82 automatically stays at its place. Moreover, in this manner it imparts stability to the whole. It is clear that applying a back part in this manner is also possible with all composed elements of the other aspects of the invention.

Also, connecting pieces can be applied which allow a further connection in the same plane, a T-connection or a crosswise connection, such that a plurality of furniture modules next to and on top of each other can be formed. Embodiments of such connecting pieces are represented in FIGS. 45 and 46 and indicated with 81A, 81B and 81C, respectively.

It is clear that the component parts of a composed element of the twelfth aspect also may be provided at the end faces with means, more particularly coverings, which hide the respective profiled parts from view, such in analogy to the first aspect of the invention. FIG. 47 represents an example of such covering 85 at the outer end of a connecting piece 81.

Analogous to the third aspect of the invention, the cooperating profiled parts of a panel-shaped element 80 and a connecting piece 81 also can be covered by a front panel, for example, by a door in closed condition.

FIG. 48 represents a variant, wherein the connecting piece 81 is rounded at the outer corner.

FIG. 49 schematically represents an embodiment of the thirteenth aspect of the invention. This relates to a composed element, which comprises at least two modules 86 situated next to each other, with side walls, upper walls and bottom walls, which are formed by panel-shaped elements, in this case 80 and 80D, characterized in that the side wall where the modules adjoin each other, is formed by a single common panel-shaped element, here 80D; that there is a first connecting construction 87 between this common panel-shaped element 80D and the upper walls of the modules 86; that there is a second connecting construction between this common panel-shaped element 80D and the bottom walls of the modules 86; and that at the location of at least one of said connecting constructions, one of the panel-shaped elements, via a profiled part formed at this panel-shaped element, is coupled directly or indirectly to the other panel-shaped elements. In consideration of the fact that in the example of FIG. 49, connecting pieces 81B are applied for the connecting constructions 87 and 88, as is known from FIG. 46, it is clear that all panel-shaped elements 80-80D adjoining thereto do possess profiled parts 8 performed therewith in one piece, as described by means of FIG. 42.

FIG. 49 also schematically represents how this can be applied in a piece of kitchen furniture, wherein the necessary legs 89 can be provided under such modules and a countertop 90 can be attached thereto, as well as not represented front parts and other accessories can be attached thereto.

It is noted that the composition of the composed element of FIG. 40 also meets the thirteenth aspect of the invention.

FIGS. 50 and 51 represent panel-shaped elements, which are made of boards 91, whereas FIGS. 52 and 53 represent portions of boards 91, which each are made in accordance with the fourteenth aspect of the invention and for this purpose are provided with a reinforcing layer 92 integrated into the board 91.

In FIG. 50, this relates to panel-shaped elements 2-3 for a piece of furniture or the like, whereas in FIG. 51 a panel-shaped element is represented in the form of a floor panel 93. In both cases, the reinforcing layer 92 is provided over a local thickness, thus, not the total thickness of the board 91, however, at the location of the coupling means, in this case at least such that the locking elements or locking parts 15-16 are situated in this layer 92 and thus are reinforced. Of course, variants are possible, depending where the manufacturer considers reinforcement necessary. In floor panels which are provided with a top layer 94, it also happens that due to continuous strain, tears may occur next to the edges, directly beneath this top layer 94, in particular with laminate. In such case, it may then be desirable to work with a local reinforcing layer 92A, which is situated directly or almost directly under the top layer 94.

FIG. 52 represents a board such as applied in FIG. 50. Possibly, the board 50 can be coated, for example, with laminate coverings 74. FIG. 53 represents a board wherein the reinforcing layer 92 is provided in the center.

Other characteristics of the fourteenth aspect, such as the materials of which the boards and the reinforcing layers may be composed, are described in the introduction and are not repeated here.

FIGS. 50 to 52 also form examples of the fifteenth aspect of the invention, at least when the materials of the board 91 and of the layer 92, which latter then does not necessarily has to be reinforcing, meet the material requirements of this fifteenth aspect described in the introduction.

It is clear that this fifteenth aspect thus shows its advantages in particular with floor panels wherein the layer 92A is situated directly underneath the top layer 94, as also is described in greater detail in the introduction.

FIGS. 54 to 65 represent a number of embodiments of the invention, wherein at least the aforementioned sixteenth aspect is applied.

FIG. 54 shows a composed element 1 in the form of a rack, which is composed of a plurality of panel-shaped elements, in this case, a back part 94, side walls 95-96, a bottom part 97, a top part 98 and shelves 99.

As is represented in the cross-section of FIG. 55, connections 100 are realized between the panel-shaped element functioning as back part 94 and the panel-shaped elements functioning as side walls 95-96, due to which the composed element 1 meets the aforementioned sixteenth aspect of the invention described in the introduction. The side walls 95-96 extend perpendicularly in respect to the back part 94, and both are provided with zones, in this case, edge zones 4-5 with profiled parts 8-9 allowing a connection.

For the profiled parts 8-9, which are applied in the sixteenth aspect, preferably use is made of a tongue and groove, too, at which locking elements are present. In all represented examples of the sixteenth aspect, profiled parts 8-9 are represented, which are similar to those of, for example, FIGS. 35 to 37, wherein use is made of a split tongue, which fits into a groove. It is clear that such embodiment of tongue and groove, or certain characteristics thereof, are also advantageous in combination with connections 100, which are made according to the sixteenth aspect. According to particular embodiments of the sixteenth aspect, such connection 100 thus is equipped with a tongue and groove which shows one or more of the characteristics which were described in respect to preceding tongue and groove connections. These characteristics have been sufficiently described heretofore and thus are not specifically repeated here.

It is noted that it is, however, not excluded to apply other forms of tongue and groove in embodiments according to the sixteenth aspect. Use may also be made of locking elements, which are made as an insertion piece, for example, as represented in FIGS. 33 and 34.

In the embodiment of FIGS. 54 and 55, the back part 94 is provided between the side walls 95 and 96.

FIGS. 56 and 57 represent a variant, wherein the back part 94 extends up to behind the rear edge of the side walls 95 and 96.

The connections 100 preferably are realized such that the side walls 95-96 can be coupled to the back part 94 at least by means of a turning movement, as is indicated in both embodiments by arrows 101. Herein, the connections 100 preferably are configured such that they do not allow or at least counteract a further turning than into the position in which the side walls 95-96 are standing perpendicular or almost perpendicular to the back part 94. By then providing the bottom part 97 and/or the top part 98 and/or the shelves 99 between the side walls 95-96, for example, by means of classical support means 102, which here are represented only schematically, the side walls 95-96 automatically are prevented from turning back inwards.

It is noted that, however, it is not excluded to realize, according to a not-represented variant, also couplings between the side walls 95-96 and one or more of said component parts 97-98-99, also in the form of profiled parts fitting into each other.

In top view and in exploded view, FIG. 58 represents a variant, wherein also an intermediate wall 103 is present, which can be coupled to the back part 94 by means of profiled parts 8 and 9 extending in the height. For clarity's sake, the shelves are not depicted.

Figure 61:
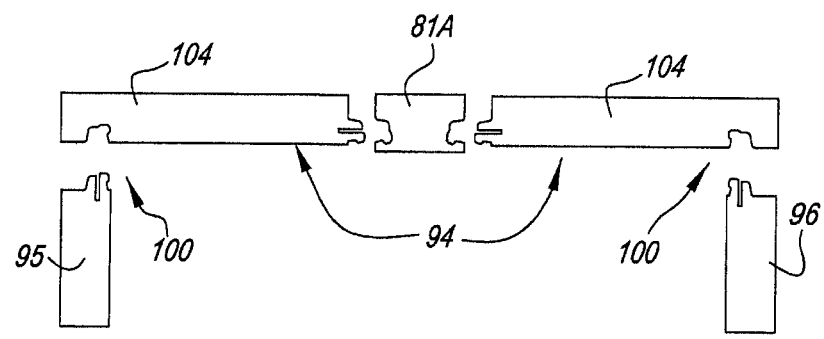
Figure 62:
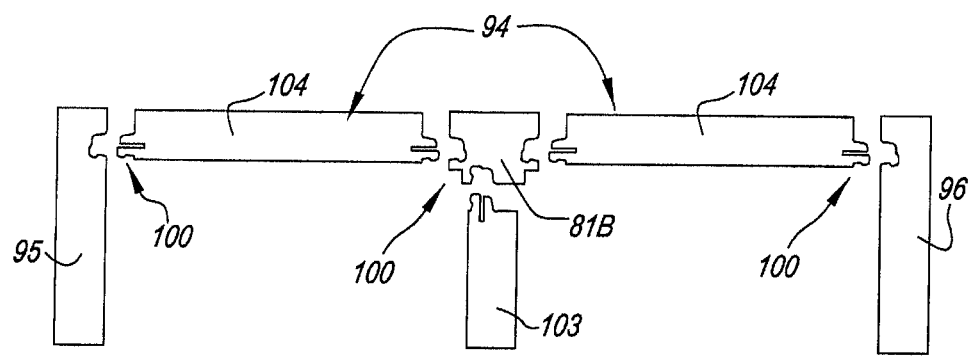
Figure 63:
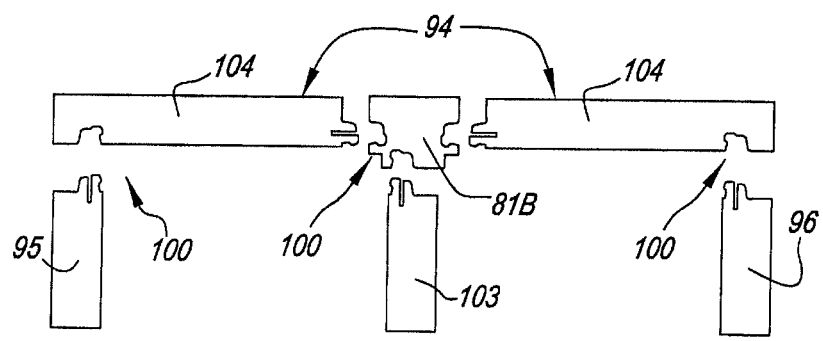
Figure 64:
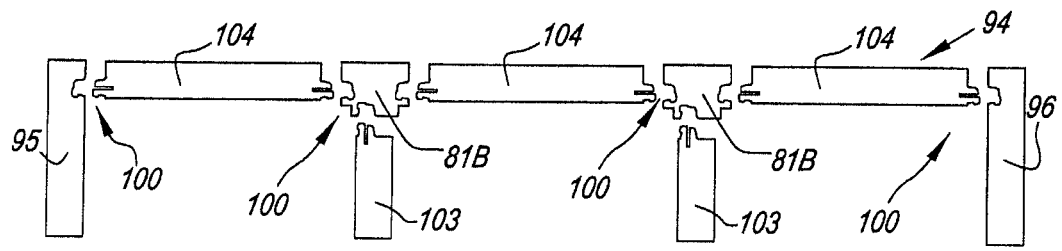
Figure 65:
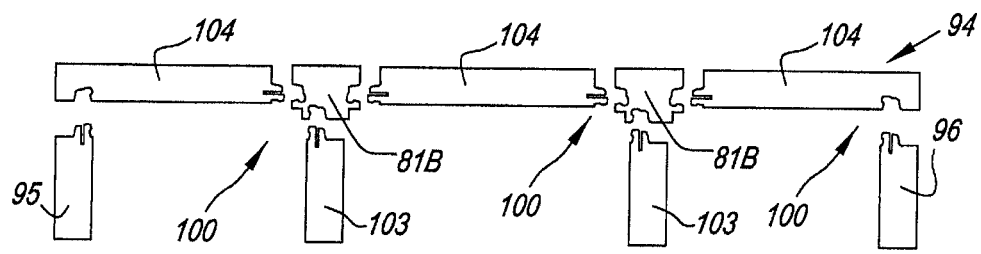

FIGS. 59 and 60 represent a further variant, wherein the panel-shaped element, which functions as a back part 94, is composed from a plurality of segments 104, which are coupled to each other by means of a connecting piece 81A. FIG. 61 represents a variant hereof. By dividing the back part 94 into segments, this can be packaged and transported more easily. Moreover, a modular construction with more or less segments is possible.

FIGS. 62 to 65 illustrate further variants with one and more connecting pieces 81B, which moreover provide for a coupling with each time an intermediate wall 103. The advantage of such connecting piece 81B is that the three panel-shaped elements coming together at their edges, thus, two segments 104 and an intermediate wall 103, can be coupled to each other in a smooth manner.

It is noted that according to a particular partial aspect, it may be worked with segments 104, which are all the same for one and the same piece of furniture, which makes it easier for the assembler. The embodiments of FIGS. 62 and 64 form examples hereof.

It is not excluded to also apply separate connecting pieces, for example, such as the earlier described connecting pieces 81, at the corners between the back part 94 and the side walls 95-96, however, for simplicity's sake as well as for esthetic purposes, the embodiments without connecting pieces at the corners are preferred.

It is noted that all embodiments which are depicted in the FIGS. 54 to 65, substantially also might be realized with coupling means which can be joined into each other exclusively by means of a turning movement, and thus not by a snap movement.

It is clear that the invention also relates to panel-shaped elements which are intended for realizing a composed element according to the sixteenth aspect.

Although the sixteenth aspect in the figures exclusively is represented by means of examples in the form of a rack, it is clear that it may also be applicable for other pieces of furniture and the like.

FIG. 66 represents another particular embodiment of a corner connection, which, amongst others, fulfills the fifth aspect of the invention. The particularity of the embodiment of FIG. 66 consists in that the panel-shaped elements 2-3 adjoin each other at least partially with a miter joint, whereas they still are connected to each other by means of profiled parts 8-9. By this, it is meant that the connection shows one or more of the following three characteristics, which here all are applicable:

the corner edges 105 and 106, as well as the corner edges 107 and 108 of the panel-shaped elements 2-3, adjoin each other at the height of the diagonal 109 of the miter;

at least a portion 110 of the contact surfaces between the panel-shaped elements 2-3 coincides with said diagonal 109;

the panel-shaped elements 2-3 each are finished with a strip of covering material at their end faces, wherein these strips adjoin each other in a miter joint according to a line 111.

A particularity of the represented embodiment consists in that the plane 112 in which the tongue and groove are situated, is not perpendicular to the diagonal 109, but coincides or approximately coincides with the plane of one of the panel-shaped elements, and, as represented, preferably the plane of the panel-shaped element 2, which is provided with the tongue. This allows that, by exerting a force perpendicularly to the flat side of the panel-shaped element 3, it will automatically be situated in the prolongation of the tongue and groove, and consequently the panel-shaped elements can be joined together in an optimum manner. According to variants, however, it is not excluded to realize the tongue and groove in another direction.

In FIGS. 67 to 69, a particular application of the invention is represented, wherein the composed element 1 is a drawer. The particularity herein is that at least two, and in this case even a plurality, of the component parts, more particularly the upright-standing walls, are performed as panel-shaped elements 2-3, which according to the invention are interconnected at an angle by means of coupling means 6-7 in the form of a tongue 13 and groove 14, wherein the coupling means 6-7 also comprise locking elements 15-16, which in coupled condition prevent moving the tongue and groove out of each other, i.e. at least prevent simply taking them apart.

More particularly, the drawer of the represented example is composed of two panel-shaped elements 2 forming the back wall 113 and the front wall 114, respectively, and two panel-shaped elements 3 forming the two side walls 115 and 116, respectively, of the drawer. Further, the drawer comprises a bottom 117, which, as represented in FIG. 69, preferably simply is provided in a groove 118 in the respective panel-shaped elements 2-3.

In the represented example, the drawer also is provided with a separate front panel 119, which is attached to the front wall 114, for example, by means of screws 120.

It is clear that the coupling means 6-7 in this case consist of profiled parts extending in vertical direction. The general configuration preferably is as depicted in FIG. 68. More particularly, the tongues 13 are located at the distal extremities of the back wall 113 and front wall 114, whereas the grooves 14 are situated at the inwardly directed surfaces of the side walls 115-116. In this manner, the advantage is obtained that, when using the drawer and when pulling it out, the force exerted therein then has a direction which is perpendicular to the coupling direction of the tongue and groove, and the force exerted when pulling out a drawer never results in a force forcing the coupling means out of each other.

For assembling the represented drawer, preferably a procedure is followed as described hereafter.

First, a side wall, for example, 116, is taken and the back wall 113 and the front wall 114 are attached thereto by respectively providing them, by means of a turning movement, with the pertaining tongue 13 in the respective groove 14 of the side wall 116. Subsequently, the bottom 117, from the side where the side wall 115 still has to be provided, can be slid into the grooves 118 of the back wall 113 and the front wall 114, such until the bottom also comes to sit with an edge in the groove 118 of the side wall 116. Then, the side wall 155 is fixed on the still free distal extremities of the back wall 113 and front wall 114 by bringing the respective tongues and grooves into each other by means of a snap effect. This can be performed, for example, by placing the drawer upright, with the side wall 116 at the bottom, and tapping in this position the side wall 115 down onto the then upwardly directed tongues 13 of the back wall 113 and front wall 114.

It is noted that the bottom 117 preferably has such dimensions that, when it is sitting at one edge 121 entirely in the groove 118 of the side wall 116, it will reach, at the opposite edge 122, to beyond the distal extremities of the tongues 13 which are present there. This excess length is indicated in FIG. 68 by the distance F. This results in the effect that, when the side wall 115 is provided on the extremities of the back wall 113 and front wall 114, this side wall 115 first must be positioned with the groove 118 provided therein over the protruding portion of the bottom 117 and only then the snap couplings can be performed, with the advantage that, before the whole is tapped into each other, the bottom 117 is sitting with certainty in the groove 118 of the side wall 115. Without this provision, it might happen that the bottom is not sitting properly in front of the respective groove 118 and the bottom then is damaged, when subsequently the side wall 115 is pressed, tapped, respectively, for fixing it on the distal extremities of the back wall 113 and the front wall 114. It is noted that in FIG. 68 in dashed line exclusively the perimeter of the bottom 117 is represented and, thus, not the grooves 118.

As an alternative for the screws 120, use may also be made of coupling means 123, with which the front panel 119 is fixed on the remainder of the drawer by snapping it on. These coupling means 123 are schematically represented as an alternative in FIG. 68. For these coupling means 123, use may also be made of mating profiled parts, for example, at the distal foremost extremities of the side walls 115 and 116 and in the back wall of the front panel 119.

Finally, FIG. 67 also shows that the edges of the panel-shaped elements, in particular the upper edges, can be taped with straight strips of covering material, such as laminate strips 124 or the like, such that in accordance with the first aspect of the invention, the profiled parts of the coupling means 6-7 are hidden from view.

It is noted that a drawer, as described above, also forms an application of the sixteenth aspect of the invention, as the back wall 113 then also forms a back part as required by this sixteenth aspect. However, this does not exclude that the invention also relates to drawers in which no coupling, such as aforementioned, with the back wall is applied, but yet couplings according to the invention are applied at other places in the drawer.

FIG. 70, at a larger scale, represents the portion indicated by F70 in FIG. 68. According to the invention, the coupling represented in this figure preferably fulfills a number of particular features. These features, which hereafter are summarized with reference to FIG. 70, the majority of which already has been mentioned above or has been represented in the figures, each have to be considered a separate aspect of the invention, however, applied in a corner connection. Thus, these aspects of the invention do not have to be mutually combined. However, all random combinations of two or more features are possible. Also, these aspects of the invention are not restricted to the represented application of the drawer, but can be used in any application of a corner connection between panel-shaped elements. Thus, the invention as such also relates to a composed element 1, which comprises at least two panel-shaped elements 2-3, which are connected to each other at an angle, characterized in that the panel-shaped elements 2-3 are connected by means of coupling means 6-7 comprising a tongue 13 and groove 14, which latter are substantially made as profiled parts, preferably in the board material itself, wherein said coupling means 6-7 further also comprise locking elements 15-16, which, in coupled condition, prevent the moving apart of tongue and groove, wherein the composed element and more particularly one of the coupling means show one or more of the following features:

- the tongue 13 is situated at the distal extremity of a panel-shaped element 2, whereas the groove 14 is situated in the side wall of the other panel-shaped element 3, in other words, in any of the large surfaces thereof;
- the tongue 13 is fitting, by means of a snap connection, in the groove 14, such by pressing the respective panel-shaped element 2 with the tongue 2 in its plane towards the groove 14, or vice versa;
- the tongue 13 fits into the groove 14 by means of a turning movement;
- the tongue 13 and groove 14 are configured such that they can be brought into each other by a turning movement as well as by a snap movement via a translation, and this at the assembler's choice;
- the locking element 15 at the tongue 13 is situated at the side of the tongue 13 which is directed towards the inner corner;
- the tongue 13 is split;
- the tongue 13 is split, and as a consequence shows two portions 125 and 126, and only one of these portions, in this case, the portion 125 which also serves as the elastically bendable part 71, is provided with a locking element 15;
- the tongue 13 is split and consequently comprises two portions 125 and 126, and only one of these portions is provided with a locking element 15, wherein the portion 125, which comprises the locking element 15, in distal direction extends farther than the other portion 126;
- the tongue 13 is split and the slot 72 extends up to a greater depth than the basic plane where the panel-shaped elements 2-3 adjoin each other;
- the tongue 13 is split and there is exclusively a locking element 15 present at that portion of the tongue 13 which is situated at the side of the slot directed towards the inner corner, with the advantage that the extremity of the panel-shaped element comprising the groove is not subjected to loads on weak places;
- the tongue 13 can be snapped into the groove 14 by means of a mutual translation movement, wherein the tongue is split and one of the two portions of the split tongue 13 is provided with a locking element, wherein this portion 125 is elastically bendable;
- the tongue 13 can be snapped into the groove 14 by means of a mutual translation movement, wherein the tongue 13 is split and one of the two portions of the split tongue is provided with a locking element 15, wherein this portion 125 is elastically bendable towards the slot and wherein the slot has a width B1, which is equal to or larger than the maximum lateral displacement B2 performed by the locking element 15 during the snapping-together;
- the tongue 13, split or not split, globally is situated off-center in respect to the panel-shaped element and is situated closer to the side which is situated against the inner corner than to the opposite side;
- the distance Z at which the tongue is situated from the side of the panel-shaped element which is located at the inner corner, is larger than ⅓ of the total thickness TH of the respective panel-shaped element 2;
- the depth DG of the groove 14 is a value situated between ⅓ and ⅔ of the thickness B3 of the panel-shaped element in which the groove is provided;
- the tongue 13, at the side of the respective panel-shaped element which is intended for being located at the inner corner, is provided with a locking element 15, wherein that portion of the locking element 15 which laterally protrudes the farthest is situated at a distance B4 from the aforementioned side of the panel, which distance is less than 2 mm and still better is less than 1 mm;
- the thickness of the panel-shaped element 2 at which the tongue 13 is provided, is larger than the thickness of the panel-shaped element 3 in which the groove is situated;
- the distal extremity 127 of the panel-shaped element 3 which comprises the groove 14, is lying in the prolongation or approximately in the prolongation of the side of the panel-shaped element 2 comprising the tongue 13 and which is situated at the outer corner;
- according to a variant, this distal extremity 127 protrudes up to beyond the panel-shaped element 2;
- the tongue 13 and/or groove 14 are provided in a panel-shaped element, which is realized of a board material formed by consolidating a mat of particles and/or fibers, provided with a binding agent, by means of pressing, wherein the tongue and groove connection comprises an elastically bendable part, i.e. in the example the portion 125 of the tongue 13 which comprises the locking element 15, and wherein this elastically bendable portion extends in a direction substantially parallel to the board; this has the advantage that the bendable portion is relatively bendable and will not tear off, due to the fact that such board in respect to resistance against tear-off forces shows a considerably higher stability in its plane than, for example, perpendicular to its plane;
- the coupling means are applied for realizing a corner connection between vertically extending panel-shaped elements;
- in the coupled condition, one or more spaces are present between the periphery of the tongue and the wall of the groove, with the advantage that possible interfering particles can be pushed away in these.

It is noted that the mentioned dimensions, as represented in the figures, preferably are determined by the basic board, which may or may not be composed, thus, without considering the thickness of a possibly present covering which is present on the basic board, such as the aforementioned laminate coverings 40-41, or the covering generally indicated with reference 128 in FIG. 70. According to a variant, these thicknesses indeed may be included into the dimensions. This latter preferably will be done when the coverings are thicker than 2 mm, as this covering then, so to speak, will serve as a structural component.

It is clear that the above listing substantially relates to coupling means 6-7 of the type which allows joining the respective composing panel-shaped elements 2-3 laterally into each other. By "laterally", as already discussed, it is meant that they can be presented with tongue and groove along each other and then can be interconnected by means of a mutual turning movement or translation and snap movement, or a movement in which turning and shifting are combined. This does not exclude that, in certain applications, apart therefrom they also allow connecting the respective panel-shaped elements in another not-lateral manner. By a not-lateral manner is understood, for example, that the profiled parts are slid into each other in longitudinal direction, analogous to a classic dovetail connection.

Further, it is clear that most of these characteristics also may be applied in embodiments wherein at least one of the coupling means is part of a separate connecting piece, for example, a connecting piece 81, as already described above, which in its turn then is connected to another portion of the composed element, preferably another panel-shaped element.

It is clear that all above-described coupling means preferably are performed such that the panel-shaped elements 2-3 match into each other with a pretension, which provides for that the panel-shaped elements 2-3 in coupled condition are drawn towards each other. In the embodiment of FIG. 70, this may be realized, for example, by providing for that the contours of the locking elements 15 and 16 somewhat overlap each other, such that the elastically bendable part 71 in the final coupled condition remains elastically bent. An elastic part 71 which is made in this manner is represented in FIG. 70 in dashed line as a variant. Herein, the bent-out elastic part is formed such that the force caused by the bending-out generates, via the locking elements 15-16, generates a force component pulling the panel-shaped element 2 with the tongue permanently into the groove of the panel-shaped element 3.

According to another particular aspect of the invention, the tongue and/or groove are at least partially reinforced. In FIG. 50, this is already represented by means of a layered structure. According to a variant, a local reinforcement may be provided, too. FIG. 71 represents an example thereof, with the particularity that the bendable portion 125 of the tongue 13 is impregnated with a reinforcing agent 129, as well as the material portion between the groove 14 and the end face, or thus the extremity 127, of the panel-shaped element 3 in which the groove is provided, as well as the zone of and around the locking element 16. It is clear that such reinforcement may occur at only one of these locations, as well as at possible other locations. All these reinforcements have the purpose of avoiding that the respective portions would tear or split off when the corner connection is subjected to excessive forces. Such reinforcement also can contribute to an increase of the elasticity in the portion 125.

Such reinforcement may be realized, for example, by means of an impregnation with a reinforcing agent, such as polyurethane, before or after the milling of the actual profiles.

It is clear that for economical reasons, the tongue 13 and groove 14 preferably are manufactured in one piece from the board material of the panel-shaped elements 2-3, for example, by means of the necessary milling treatments. However, this does not exclude that certain portions of the tongue and/or groove and/or of the edge zone in which they are situated, are realized of another material. A possibility thereof is represented in FIG. 72, wherein in the respective edge zone an insertion piece 130 is integrated, which consists of another material than the panel-shaped element 2 and of which the tongue 13 is formed. Such insertion piece 130 consists, for example, of synthetic material, such as PVC and the like, whereas the actual board material, for example, is wood-based and consists, for example, of particle board or HDF or MDF. Other possibilities are not excluded. For example, the insertion piece may consist of MDF or HDF, whereas the board material consists of particle board.

Such insertion piece 130 can be formed beforehand and be mounted at the edge of the panel-shaped element, however, it may also be realized, as schematically represented in FIG. 72, by laying on a material mass 131 along the respective edge, for example, by extrusion, and forming, after it has solidified, the respective coupling means, in this case the tongue 13, there from, for example, by means of a milling treatment. Therein, the material mass 131 can be held at the panel-shaped element by an adhesive effect and/or due to the fact that it gets stuck behind the edges of a groove 132.

According to still another important embodiment of the invention, qualitatively differing board materials are applied for the panel-shaped elements, which comprise the groove, on the one hand, and the tongue, on the other hand. The panel-shaped element which comprises the least critical coupling part, which mostly is the groove, then can be made from a board material of lower quality, which makes it possible to employ a less expensive material for this purpose. In practice, this means, for example, that the panel-shaped element with the groove is made, for example, from particle board, whereas the panel-shaped element comprising the tongue is made of MDF or HDF.

Unexpectedly, the inventor also has found that both the tongue and the groove can be made in one piece of particle board, even in the case of a classic particle board. Herein, it might be expected that, when both are manufactured of particle board, a brittle coupling might be created, wherein chips might come loose from the tongue and interfere with good coupling. Contrary thereto, the inventor has found that in corner connections still good results were obtained. Herein, a split tongue is extra advantageous, because both portions then are more movable when loosened portions get between the surfaces of tongue and groove, and/or because the slot forms a space in which loosened particles can be collected without having an interfering function.

In particular with embodiments in particle board, it may be useful to apply a reinforcing agent, for example, such as represented in FIG. 71.

According to another particular characteristic, a composed element according to the invention comprises one or more panels, wherein such panel as such comprises, at two opposite edge zones, a coupling means, as aforementioned, in the form of a tongue, and preferably further comprises no coupling means in the form of a groove. Also, it is preferred that other panels then comprise only coupling means in the form of a groove. By not applying tongue and groove at the same panel-shaped element, the panel-shaped elements can be optimized better and realized more simply. For example, then, as aforementioned, a panel-shaped element exclusively having grooves can be made of particle board, and, due to the absence of tongues at this element, there is no necessity of switching to a more expensive material, such as MDF or HDF.

It is clear that the embodiments represented in the figures always apply one or more of the aspects mentioned in the introduction, without each time explicitly referring thereto in the description of these figures.

It is also clear that all aforementioned profiled parts can be realized by means of any suitable technique. For the panel-shaped elements, this preferably takes place by means of milling treatments, for example, with milling cutters which are arranged at different angles. This is also possible with the connecting pieces, however, these may also be extruded and possibly additionally finished by means of machining treatments.

Although the invention, in respect to the aforementioned coupling techniques, is intended in particular for being applied when manufacturing furniture panels, it is clear that it can also be employed in other fields of application, such as wall panels, box-shaped elements, such as packaging and storage boxes, and so on.

It is noted that said corner connections are suitable in particular for realizing connections at 90 degrees, however, it is not excluded to apply them also for connections at angles differing from 90 degrees.

It is clear that the invention is not restricted to embodiments with panel-shaped elements, which are provided with a laminate covering, and may also be applied with any other panel-shaped elements, such as, for example, panels covered with veneer, multi-layered panels, panels made as so-called "engineered wood", panels provided with any covering, and so on.

Another general characteristic consists in that, when a composed element according to the invention comprises four panel-shaped panels all around, which respectively can be joined into each other by means of coupling means according to the invention, wherein thus four connections are realized in the corners, then at least one of the connections allows joining by means of a snap connection. More particularly, it is preferred that at least two of the other connections allow joining by turning. In the most preferred embodiment, at least two connections situated at the same panel-shaped element can be performed at least by turning, whereas the two opposite connections can be realized at least by a translation and snap movement.

The present invention is in no way limited to the embodiments described as an example and represented in the figures, on the contrary may such composed element, such as multi-layered board, as well as such panel-shaped elements be realized in various forms and dimensions, without leaving the scope of the invention.

The invention claimed is:

1. A composed element, the composed element being a wall covering having a front side, comprising at least two panel-shaped elements which are formed from a board material, wherein the panel-shaped elements are interconnectable in a plane by means of coupling means comprising a tongue and a groove made as profiled parts in the board material, wherein said coupling means also comprise locking elements including a tongue locking element and a groove locking element, which, in a coupled condition, prevent the moving apart of the tongue and groove and wherein the panel-shaped elements possess a covering at first and second opposed sides, said covering being performed in the form of a laminate, a foil or a lacquer layer wherein the panel-shaped elements have a front side and a rear side, the front side of the panel-shaped elements forming said front side of the wall covering;

wherein the coupling means and locking elements allow coupling the panel-shaped elements by means of a turning movement;

wherein the tongue locking element is only present at a first side of the tongue, whereas a second side of the tongue is free from the locking elements;

wherein the groove is bordered by first and second lips, the first lip protruding beyond the second lip;

wherein the tongue locking element at the first side of the tongue cooperates, in the coupled condition, with the groove locking element at the first lip, and wherein the second side of the tongue cooperates, in the coupled condition, with the second lip;

wherein said second lip has a distal end defining a theoretical closing plane in which the panel-shaped elements fit together, said closing plane being defined as a plane perpendicular to the front side of said wall covering and extending through said distal end of the second lip;

wherein the tongue locking element and the groove locking element have locking surfaces at which the tongue locking element and groove locking element contact each other when coupled;

wherein the locking surface of the groove locking element is positioned at a location distally beyond the distal end of the second lip;

wherein the locking surface of the groove locking element extends between a first contact point and a second contact point, the second contact point being closer to the front side of the panel-shaped elements than the first contact point;

wherein said second contact point defines a first distance between said second contact point and the closing plane, measured perpendicular to the closing plane;

wherein the tongue in the coupled condition defines a second distance as the distance between said closing plane and the most distal end of the tongue;

wherein said first distance is larger than said second distance;

wherein the tongue locking element is formed by a protrusion at said first side of the tongue, said protrusion comprising a proximal side surface, a distal side surface and a central portion, wherein the proximal side surface includes said locking surface of the tongue and wherein the central portion is formed by the portion of the protrusion that is located most distant from said front side of the wall covering, the central portion forming a portion of the tongue most distant from the front side;

wherein in the coupled condition a clearance is present distally in front of said distal side surface of the protrusion wherein said second lip has a first side bordering said groove and a second side opposite to the first side, the second side of the first lip comprising a portion that is spaced inward with respect to the rear side of the corresponding panel-shaped element, said spaced inward portion at extending up to the distal end of the first lip; wherein a portion of the rear side of the panel lacking the spaced inward portion extends up to the closing plane.

2. The composed element of claim 1, wherein the coupling means are configured such that the panel-shaped elements match into each other with a pretension, which provides for that the panel-shaped elements in coupled condition are drawn towards each other.

3. The composed element of claim 1, wherein the covering is performed in the form of a laminate of the HPL or DPL type.

4. The composed element of claim 1, wherein the panel-shaped elements are realized from board material of pressed and consolidated wood components.

5. The composed element of claim 4, wherein the panel-shaped elements are realized from particle board.

6. The composed element of claim 4, wherein the panel-shaped elements are realized from MDF or HDF.

7. The composed element of claim 1, wherein the tongue and groove as well as the locking elements are made in one piece as profiled parts in the board material.

* * * * *